(12) United States Patent
Kohl et al.

(10) Patent No.: US 11,015,156 B1
(45) Date of Patent: May 25, 2021

(54) PROTEIN CONCENTRATION METHODS

(71) Applicant: Franzenburg, Des Moines, IA (US)

(72) Inventors: Scott Kohl, Maize, KS (US); Craig Tracy, Des Moines, IA (US)

(73) Assignee: FRANZENBURG, Des Moines, IA (US)

( * ) Notice: Subject to any disclaimer, the term of this patent is extended or adjusted under 35 U.S.C. 154(b) by 0 days.

(21) Appl. No.: 16/885,202

(22) Filed: May 27, 2020

Related U.S. Application Data

(60) Provisional application No. 63/029,162, filed on May 22, 2020.

(51) Int. Cl.
| | |
|---|---|
| *C12F 3/10* | (2006.01) |
| *A23K 10/38* | (2016.01) |
| *B04B 1/20* | (2006.01) |
| *B01D 21/26* | (2006.01) |
| *B01D 36/04* | (2006.01) |

(Continued)

(52) U.S. Cl.
CPC .............. *C12F 3/10* (2013.01); *A23J 1/001* (2013.01); *A23K 10/38* (2016.05); *A23K 20/147* (2016.05); *B01D 21/262* (2013.01); *B01D 21/267* (2013.01); *B01D 36/045* (2013.01);

(Continued)

(58) Field of Classification Search
CPC ..... C12F 3/10; B04B 1/20; B04B 1/04; B04B 5/10; B04B 7/12; B04B 2001/2041; A23K 20/147; A23K 10/38; A23K 10/37; B01D 21/262; B01D 21/267; B01D 36/045; B01D 17/00; B01D 17/02; B01D 17/0208; B01D 17/0217; B01D 7/00; B01D 7/02; B01D 7/04; B01D 21/26; B01D 21/29; B01D 21/62; B01D 21/66; B01D 21/68; B01D 21/682; B01D 21/684; B01D 21/78; B01D 36/00; B01D 36/003; B01D 37/00; B01D 2221/06; A23J 1/001; A23J 1/005; A23J 1/006; A23J 1/16; B04C 3/04; B04C 5/24; B04C 5/28; B04C 7/00; B04C 9/00; B04C 11/00; B04C 2009/002; C02F 1/38;

(Continued)

(56) References Cited

U.S. PATENT DOCUMENTS 2,765,918 A * 10/1956 Fontein ..................... B04C 5/28
                                                        210/512.2
2,840,524 A *  6/1958 Fitch ......................... B04C 5/24
                                                        134/25.1

(Continued)

FOREIGN PATENT DOCUMENTS

WO   WO 2018/226343 A1   12/2018
WO   WO 2018/231371 A1   12/2018
(Continued)

OTHER PUBLICATIONS

U.S. Appl. No. 16/888,777, filed May 31, 2020, Inventors: Tracy et al.

(Continued)

*Primary Examiner* — Joseph W Drodge
(74) *Attorney, Agent, or Firm* — Fenwick & West LLP

(57) ABSTRACT

Aspects of the present disclosure include methods for fractionating whole stillage using one or more hydrocyclones and optional screening device. Aspects of the present disclosure include a stillage fractionation and/or clarification system for carrying out the methods described herein.

24 Claims, 44 Drawing Sheets

(51) Int. Cl.
*A23J 1/00* (2006.01)
*B04C 3/04* (2006.01)
*B04C 9/00* (2006.01)
*A23K 20/147* (2016.01)

(52) U.S. Cl.
CPC ............... B04B 1/20 (2013.01); B04C 3/04 (2013.01); B04C 9/00 (2013.01)

(58) Field of Classification Search
CPC . C02F 1/385; C02F 9/00; C11B 3/001; C11B 3/008; C11B 3/16
USPC .......... 210/258, 411, 413, 512.1, 512.2, 770, 210/787, 788, 791, 806; 209/12.1, 711, 209/715, 719, 727, 728; 127/24, 25, 55, 127/56; 554/175, 177
See application file for complete search history.

(56) References Cited

U.S. PATENT DOCUMENTS

| | | | | |
|---|---|---|---|---|
| 2,965,522 | A * | 12/1960 | Crespin | B04C 5/26 134/25.1 |
| 3,166,496 | A * | 1/1965 | Kelsall | B04C 5/00 209/209 |
| 3,971,718 | A * | 7/1976 | Reid | B04C 5/14 210/774 |
| 4,283,232 | A * | 8/1981 | Best | C08B 30/00 127/71 |
| 4,389,307 | A * | 6/1983 | Boadway | B04C 5/12 209/711 |
| 4,707,274 | A * | 11/1987 | Donhauser | C07C 51/43 210/774 |
| 4,960,525 | A * | 10/1990 | Dalby | B01D 9/004 210/788 |
| 7,601,858 | B2 | 10/2009 | Cantrell et al. | |
| 8,309,711 | B2 * | 11/2012 | Wiley | B01D 29/94 536/127 |
| 8,652,818 | B2 | 2/2014 | Lawton, Jr. et al. | |
| 8,679,353 | B2 | 3/2014 | Winsness | |
| 8,778,433 | B2 | 7/2014 | Lee | |
| 8,813,973 | B2 | 8/2014 | Lee et al. | |
| 8,986,551 | B2 | 3/2015 | Kohl et al. | |
| 9,012,191 | B2 | 4/2015 | Lee | |
| 9,029,126 | B2 | 5/2015 | Bleyer et al. | |
| 9,328,311 | B2 | 5/2016 | Jenkins et al. | |
| 9,376,504 | B2 | 6/2016 | Dieker et al. | |
| 9,714,267 | B2 | 7/2017 | Emanuele et al. | |
| 9,718,006 | B2 | 8/2017 | Lee et al. | |
| 9,896,643 | B2 | 2/2018 | Redford | |
| 10,059,966 | B2 | 8/2018 | Bootsma | |
| 10,160,932 | B2 | 12/2018 | Lee | |
| 10,190,076 | B2 | 1/2019 | Lee | |
| 10,233,404 | B2 | 3/2019 | Lee | |
| 10,260,031 | B2 | 4/2019 | Gallop et al. | |
| 10,266,790 | B2 | 4/2019 | Lee | |
| 10,443,017 | B1 * | 10/2019 | Bleyer | C11B 1/102 |
| 10,519,398 | B1 | 12/2019 | Lee | |
| 2003/0180415 | A1 * | 9/2003 | Stiefel | A23J 1/125 426/18 |
| 2007/0184541 | A1 * | 8/2007 | Karl | C12P 19/02 435/161 |
| 2008/0277264 | A1 * | 11/2008 | Sprague | C12M 45/20 204/157.9 |
| 2012/0064213 | A1 * | 3/2012 | Lee | C11B 13/00 426/472 |
| 2015/0191750 | A1 * | 7/2015 | Bleyer | C12P 5/023 435/71.1 |
| 2015/0231535 | A1 * | 8/2015 | Lee | B01D 29/908 210/767 |
| 2016/0207050 | A1 * | 7/2016 | Van Der Spek | B04C 11/00 |
| 2017/0253892 | A1 * | 9/2017 | Bootsma | C12P 7/10 |
| 2017/0268024 | A1 | 9/2017 | Bootsma et al. | |
| 2018/0044620 | A1 | 2/2018 | Bootsma | |
| 2018/0346831 | A1 * | 12/2018 | Sutterlin | C07C 67/08 |
| 2019/0017080 | A1 | 1/2019 | Bootsma | |
| 2019/0119711 | A1 | 4/2019 | Lee | |
| 2019/0160470 | A1 * | 5/2019 | Hora | C11B 13/00 |
| 2019/0241834 | A1 | 8/2019 | Lee | |
| 2019/0264148 | A1 | 8/2019 | Gallop et al. | |
| 2020/0113207 | A1 * | 4/2020 | Gallop | B01D 21/26 |
| 2020/0140899 | A1 * | 5/2020 | Bootsma | C12P 19/02 |
| 2020/0199062 | A1 * | 6/2020 | Franko | C07K 1/34 |
| 2020/0207807 | A1 * | 7/2020 | Jakel | C12F 3/10 |

FOREIGN PATENT DOCUMENTS

| | | |
|---|---|---|
| WO | WO 2018/236823 A1 | 12/2018 |
| WO | WO 2018/236826 A1 | 12/2018 |
| WO | WO 2018/236919 A2 | 12/2018 |
| WO | WO 2018/236920 A2 | 12/2018 |
| WO | WO 2019/079491 A1 | 4/2019 |

OTHER PUBLICATIONS

Yang, L. et al., "Physical and chemical properties of whole stillage, thin stillage and syrup," 2015 ASABE Annual International Meeting, Paper No. 52184612, Jul. 26-29, 2015, pp. 1-18, New Orleans, Louisiana, United States.

* cited by examiner

PROTEIN CONCENTRATION METHODS

CROSS-REFERENCE TO RELATED APPLICATIONS

This application claims the benefit of U.S. Provisional Application No. 63/029,162, filed May 22, 2020, which is hereby incorporated in its entirety by reference.

FIELD OF THE DISCLOSURE

The present disclosure relates generally to improved methods and systems for efficiently processing, recovering, and concentrating the protein laden co-products and oil co-products generated during the grain alcohol production process.

INTRODUCTION

The background description provided herein is for the purpose of generally presenting the context of the present disclosure. Work of the presently named inventors, to the extent the work is described in the present disclosure, as well as aspects of the description that may not otherwise qualify as prior art at the time of filing, are neither expressly nor impliedly admitted as prior art.

Ethanol is used as a fuel additive and the dry grind ethanol process is the most common ethanol production process in the United States. In the dry grind process, whole-ground grain is fermented to produce ethanol and distiller's dried grains with solubles. The generated distillers dried grains with solubles are primarily used to feed livestock. A majority of the distiller's grains are fed to ruminant animals because of their ability to more effectively digest the naturally high concentration of grain fiber present in distiller's grains. To reduce fossil demand derived from thermal inputs into the drying process and associated environment impacts, some of the distiller's grains are sold in a wet form. Drying can also damage certain nutrients in the feed giving a second advantage for wet distiller's products. Wet distillers has relatively high moisture content and the material sold commonly includes decanter underflow (wet cake), condensed grain solubles (syrup) and a mixture of these two components, Distiller Wet Grains plus Solubles (DWGS). If corn is the primary raw ingredient in the fermentation process the syrup is termed Condensed Corn Distiller's Solubles (CCDS). Other grains can be used for the fermentation feedstock and the terminology for the solubles should reflect the grain type used. For example, if grain sorghum is the primary raw ingredient in the fermentation process, the syrup is termed Condensed Sorghum Distiller's Solubles (CSDS) or, more commonly, just syrup.

For example, in a traditional whole stillage processing system, as shown in FIG. 1, whole stillage tank 10, stores whole stillage, 100 and is generally processed through a two phase decanting centrifuge 12, shown in FIG. 2. The underflow (decanter cake solids, solid discharge) 14 from the decanting centrifuge 12 generally has 32 to 38% dry solids content. The resulting product behaves like a solid and is often termed "cake". The aqueous phase (centrate, liquid outlet) leaving the decanting centrifuge 12 in the overflow (centrate, liquid outlet) 16 after the easily compacting suspended solids have been removed is called "centrate". The overflow 16 from the decanting centrifuge 12 is generally split into two fractions. The first fraction is used as backset 18 (FIG. 1) to the ethanol plant for mash bill incorporation and plant water balance considerations. The second fraction is used as evaporator feed 20 for thermal evaporative concentration and removal from the ethanol plant. Often the evaporator feed is called "thin stillage" and stored in a thin stillage tank 19 prior to evaporation. The evaporator feed 20 is commonly concentrated through a two-effect evaporator cascading into distillation, which routes the thermal energy via water vapor from the second effect to the distillation process. Sometimes more or fewer evaporation effects are used, particularly if the evaporative vapors from the final effect are not directed to energy recovery in the distillation process.

During the evaporation process, the condensed solubles (either partly concentrated 30 or fully concentrated 36) are commonly taken to an oil recovery process 32. The oil recovery process often contains one or more centrifuges 32 that are often of horizontal bowl three phase decanting design or a vertical stack three phase design, though other centrifuge designs might be used. Oil 34 is recovered from a concentrated thin stillage 30 including final syrup 36 and represents a saleable product. The syrup 38 is optionally combined with the compacting solids cake 14, recovered from the first two phase decanting centrifuge 12. The combination of the syrup with the decanter cake 14 creates a product called Distiller's Wet Grains plus Solubles (DWGS) 40. The DWGS 40 can alternately be processed through a dryer 42 to make Distiller's Dried Grains plus Solubles (DDGS). The energy required to dry the grains is significant, but monogastric animal species generally do not handle wet feeds, necessitating drying. For ruminant feeding many locations have insufficient market demand for DWGS 40 and are forced to expend the energy to dry the product for economies in shipping as well as shelf-life extension. At times facilities will sell syrup 38 as an animal feed into local feed markets.

The majority of ethanol plants today have more than one dryer unit. Common dryer types are drum dryers and ring dryers, though other dryers have been used. Steam tube drum dryers and direct fire drum dryers are common drum dryer variants. Drum dryer units are usually tied together in series of two or more drums per unit, though some small plants only have a single drum. Many larger plants have four or more drums in their facility constituting two dryer systems that can be operated largely independently of each other.

If oil is recovered and sold separately, the plant produces a reduced-fat distiller's grain compliment. If no oil is recovered, the plant produces a full-fat distiller's compliment. Market price of full-fat distiller's grains or reduced-fat distiller's grain is lower than desired. This low-price results partly from the high fiber content in the distiller's that limits the inclusion into monogastric animals, such as swine and poultry. Recent wet fractionation and dry fractionation processes have been developed to overcome this deficiency and produce a second distiller's product with protein concentrations in the new high protein fraction between 38% to 50%+ on a dry matter basis. These fractionation processes have yield expectations of between 1 (one) and 6 (six) pounds per bushel of higher protein material when the facility is operating on corn (*Zea maize*).

Example wet fractionation processes commercially available or in late stages of development fractionate whole stillage and/or thin stillage into two fractions for sale, one being a higher protein and the other a lower protein fraction.

These systems use extensive mechanical and/or chemical plus mechanical separations. Some non-limiting exemplary processes include:

1) FIG. 3, Fluid-Quip Technologies Maximized Stillage Co-Products (MSC) example process equipment: pressure screens, filtration decanters, clarifiers (high-speed disc centrifuges), paddle screens (paddle machines), ring dryers, blow-down decanters, and protein decanters;

2) FIG. 4, Valicor VFRAC example process equipment: hydrothermal treatment system, separation (high-speed disc centrifuges), dryer (ring dryer(s)); and 3) FIG. 5A and FIG. 5B, ICM Fiber Separation Technology, FST™ example process equipment: paddle machines, wet grinding/milling devices, and press(es).

The above processes lead to significant undesirable properties that have had limited the adoption of these processes and associated systems in the commercial realm. Some examples of commercial deficiencies and undesirable properties include: 1) high to very high capital cost for implementation (see e.g., FIG. 3, FIG. 5A, FIG. 5B); 2) new dryer(s) purchase requirement at facility (see e.g., FIG. 3, FIG. 4); 3) complex operations with multiple new unit operations (see e.g., FIG. 3, FIG. 4, FIG. 5A, FIG. 5B); 4) significant new electrical energy demand to run newly required equipment (see e.g., FIG. 3, FIG. 5A, FIG. 5B); and 5) long lead-time and specialized equipment requiring large periods of time between capital allocation and process startup (see e.g., FIG. 3, FIG. 5A, FIG. 5B).

Thus, there is a need in the art for providing a cheaper, quicker to build, and more efficient method to fractionate distiller's into protein enriched feeds and protein depleted feeds for animal markets.

SUMMARY

Aspects of the present disclosure include methods for fractionating whole stillage using one or more hydroclyclones without a grit pot. Aspects of the present disclosure include a stillage fractionation and/or clarification system for carrying out the methods described herein.

Aspects of the present disclosure include a process for fractionating whole stillage, including: using one or more hydrocyclones without a grit pot at high flow rate and high feed pressure to fractionate whole stillage into first and second fractions containing suspended solids, wherein the first fraction is enriched in protein and the second fraction is depleted in protein; and presenting the first (OF) and second (UF) fractions to centrifuges for mechanical dewatering, and recovering from the centrifuges suspended solid fractions including a first dewatered fraction including 40% to 60% protein on a dry weight basis.

Any convenient centrifuge(s) can be utilized in the subject methods and systems. In some aspects, the centrifuge(s) is a decanting centrifuge or disc-style centrifuge. In some aspects, the centrifuge(s) is a decanting centrifuge. In some aspects, the centrifuge(s) is a disc-style centrifuge.

Aspects of the present disclosure include a process for fractionating whole stillage, including: using one or more hydrocyclones without a grit pot at high flow rate and high feed pressure to fractionate whole stillage into first (OF) and second (UF) fractions containing suspended solids, wherein the first fraction is enriched in protein and the second fraction is depleted in protein; and presenting the first and second fractions to centrifuges for mechanical dewatering, and recovering from the centrifuges suspended solid fractions including: a first dewatered fraction including 40% to 60% protein on a dry weight basis; and a second dewatered fraction including 20 to 34% protein on a dry weight basis.

In some aspects, the centrifuge(s) is a decanting or disc-style centrifuge. In some aspects, the centrifuge(s) is a decanting centrifuge. In some aspects, the centrifuge(s) is a disc-style centrifuge.

In some aspects, the centrate from the second dewatered fraction is substantially depleted in suspended solids.

In some aspects, the centrate from the second fraction (UF) decanter is depleted in suspended solids; and a portion of the centrate, up to 100%, is directed to the evaporation process; and concentrate produced by the evaporation process is in excess of 50% solids on a dry matter basis.

In some aspects, the centrate from the UF decanter is depleted in suspended solids; and a portion of the centrate, up to 100%, is directed to mash bill as backset; and the backset is reduced in suspended solids.

Aspects of the present disclosure includes a process for fractionating whole stillage, including: using one or more hydrocyclones without a grit pot at high flow rate and high feed pressure to fractionate whole stillage into first and second fractions containing suspended solids, wherein the first fraction is enriched in protein and the second fraction is depleted in protein, and wherein the one or more hydrocyclones are operated at an overflow flow rate that is less than three times the underflow flow rate; and presenting the first and second fractions to centrifuges for mechanical dewatering and recovering from the centrifuges suspended solids fractions including: a first dewatered fraction including 40% to 60% protein on a dry weight basis; and a second dewatered fraction including 20 to 34% protein on a dry weight basis.

In some aspects, the centrifuge(s) is a decanting or disc-style centrifuge. In some aspects, the centrifuge(s) is a decanting centrifuge. In some aspects, the centrifuge(s) is a disc-style centrifuge. In some aspects, the centrate from the second dewatered fraction is substantially depleted in suspended solids.

In some aspects, the centrate from the UF decanter is depleted in suspended solids; and a portion of the centrate, up to 100%, is directed to the evaporation process; and concentrate produced by the evaporation process is in excess of 50% solids on a dry matter basis.

In some aspects, the centrate from the UF decanter is depleted in suspended solids; and a portion of the centrate, up to 100%, is directed to mash bill as backset; and the backset is reduced in suspended solids.

Aspects of the present disclosure include a process for fractionating whole stillage, including: using one or more hydrocyclones and at least one filtration device to fractionate whole stillage into first and second fractions containing suspended solids, wherein the first fraction is enriched in protein and the second fraction is depleted in protein; and presenting the first and second fractions to centrifuges for mechanical dewatering, said suspended solids fractions recovered by the decanter including: a first fraction including 40% to 60% protein on a dry weight basis a second fraction including 20 to 34% protein on a dry weight basis In some aspects, the centrifuge(s) is a decanting or disc-style centrifuge. In some aspects, the centrifuge(s) is a decanting centrifuge. In some aspects, the centrifuge(s) is a disc-style centrifuge.

In some aspects, the centrate from the second dewatered fraction is substantially depleted in suspended solids.

In some aspects, the centrate from the UF decanter is depleted in suspended solids; and a portion of the centrate, up to 100%, is directed to the evaporation process; and concentrate produced by the evaporation process is in excess of 50% solids on a dry matter basis.

In some aspects, the centrate from the UF decanter is depleted in suspended solids; and a portion of the centrate, up to 100%, is directed to mash bill as backset; and the backset is reduced in suspended solids.

Aspects of the present disclosure include a protein concentration process including: using one or more hydrocyclones and a washing filtration system to fractionate whole stillage into two fractions containing suspended solids enriched in protein and a second fraction depleted in protein; and using the washing filtration system to further enrich the high protein fraction in protein concentration and/or increase the yield of the high protein fraction; and presenting the two fractions to a plant's existing centrifuges for mechanical dewatering, said suspended solids fractions recovered by the decanter including: a first fraction including 40% to 60% protein on a dry weight basis a second fraction including 20 to 34% protein on a dry weight basis.

In some aspects, the centrifuge(s) is a decanting or disc-style centrifuge. In some aspects, the centrifuge(s) is a decanting centrifuge. In some aspects, the centrifuge(s) is a disc-style centrifuge.

In some aspects, the first protein fraction in protein is used in combination with the washing filtration system to further enrich the high protein fraction in protein concentration and/or increase the yield of the high protein fraction. This fraction can be processed using a disc centrifuge(s) for mechanical dewatering, where solids fractions are recovered by the disc centrifuge(s). In some aspects, the solid fraction is a first fraction including 40% to 60% protein on a dry weight basis.

In some aspects, the centrate from the second dewatered fraction is substantially depleted in suspended solids.

In some aspects, the centrate from the underflow decanter is depleted in suspended solids; and a portion of the centrate, up to 100%, is directed to the evaporation process; and concentrate produced by the evaporation process is in excess of 50% solids on a dry matter basis.

In some aspects, the centrate from the underflow decanter is depleted in suspended solids; and a portion of the centrate, up to 100%, is directed to mash bill as backset; and the backset is reduced in suspended solids.

In some aspects, a single pass hydrocyclone bank is used to fractionate the whole stillage into high and low protein fractions.

In some aspects, a first pass hydrocyclone conveys the overflow stream to a second hydrocyclone or subsequent hydrocyclones of equal or smaller diameter that further concentrates the smaller protein particles of the first fraction.

In some aspects, a first pass hydrocyclone conveys the underflow stream to a subsequent hydrocyclone or subsequent hydrocyclones of equal or smaller diameter that further concentrates the larger fiber particles of the second fraction.

In some aspects, the process further includes using a portion of a process evaporator condensate to remove, as a suspension or solution, water soluble components and/or water insoluble components from a high fiber feed.

In some aspects, removing the water soluble components and/or the small particle sized insoluble components produces an animal feed that is higher in fiber purity.

In some aspects, the water soluble components and/or the small particle sized insoluble components removed from the high fiber feed are recycled into the next fermentation cycle.

In some aspects, the water soluble components and/or the small particle sized insoluble components removed from the high fiber feed are moved into an oil recovery and high protein purity recovery process for capture as additional oil and/or additional protein volume fractions.

In some aspects, the process is a stillage clarification process that produces: between one and seven and one half pounds per bushel on a dry matter basis of a first fraction, elevated in protein concentration; between two and nine pounds per bushel on a dry matter basis of a second fraction, depleted in protein concentration; and/or between 74% and 100% concentration bio-oil and bio-oil degradation products in a third fraction, and a solubles fraction containing between one and five pounds per bushel on a dry matter basis.

In some aspects, the process is a stillage clarification process that produces: between one and seven and one half pounds per bushel on a dry matter basis of a first fraction, elevated in protein concentration; between two and eight and one half pounds per bushel on a dry matter basis of a second fraction, depleted in protein concentration; and/or between 74% and 100% concentration bio-oil and bio-oil degradation products in a third fraction, and a solubles fraction containing between one and five pounds per bushel on a dry matter basis.

Aspects of the present disclosure include a process for fractionating whole stillage, including: separating whole stillage using one or more modified hydrocyclones lacking a grit pot under conditions sufficient to produce a protein enriched overflow stream and a protein depleted underflow stream; dewatering the protein enriched overflow stream using a centrifuge to recover a first protein enriched fraction including 40% to 60% protein on a dry weight basis; and dewatering the protein depleted underflow stream using a centrifuge to recover a second protein depleted fraction 20 to 34% protein on a dry weight basis.

In some aspects, the centrifuge(s) is a decanting or disc-style centrifuge. In some aspects, the centrifuge(s) is a decanting centrifuge. In some aspects, the centrifuge(s) is a disc-style centrifuge.

In some aspects, the modified hydrocyclone is operated at an overflow flow rate that is less than three times the underflow flow rate.

In some aspects, the modified hydrocyclone is operated at an overflow flow rate that is greater than the underflow flow rate.

In some aspects, the modified hydrocyclone is operated at an overflow flow rate that is the same as the underflow flow rate.

In some aspects, the modified hydrocyclone is operated at an overflow flow rate that is less as the underflow flow rate.

In some aspects, the modified hydrocyclone is operated at a high feed flow rate and high feed pressure.

In some aspects, the feed pressure of the whole stillage to the modified hydrocyclone(s) is 12 psig or more (e.g., 16 psig or more, 20 psig or more, 25 psig or more, 30 psig or more, 35 psig or more, 40 psig or more, 45 psig or more, 50 psig or more, 55 psig or more, 60 psig or more, 65 psig or more, 70 psig or more, or 75 psig or more).

In some aspects, the protein enriched overflow stream and the protein depleted underflow stream each comprise suspended solid particles.

In some aspects, the one or more modified hydrocyclones is a single pass hydrocyclone bank.

In some aspects, the separating step using one or more modified hydrocyclones includes conveying a first protein enriched overflow stream from a first pass hydrocyclone to a second pass hydrocyclone of equal or smaller diameter to produce a second protein enriched overflow stream including concentrated smaller protein particles.

In some aspects, the separating step using one or more modified hydrocyclones includes conveying a first protein enriched overflow stream from a first pass hydrocyclone to a second pass hydrocyclone of equal or larger diameter to produce a second protein enriched overflow stream including concentrated smaller protein particles.

In some aspects, the separating step using one or more modified hydrocyclones includes conveying a first protein depleted underflow stream from a first pass hydrocyclone to one or more subsequent hydrocyclones of equal or smaller diameter to produce a second protein depleted underflow stream including concentrated larger fiber particles.

In some aspects, the separating step using one or more modified hydrocyclones includes conveying a first protein depleted underflow stream from a first pass hydrocyclone to one or more subsequent hydrocyclones of equal or larger diameter to produce a second protein depleted underflow stream including concentrated larger fiber particles. In some aspects, the separating step is performed using three modified hydrocyclones each lacking a grit pot and configured together to produce the protein enriched overflow stream and the protein depleted underflow stream.

In some aspects, the protein enriched overflow stream and the protein depleted underflow stream each comprise suspended solid particles.

In some aspects, the process further includes, after the separating step and before the dewatering steps, filtering the protein enriched overflow stream.

In some aspects, the filtering is performed under conditions sufficient to produce an at least partially clarified protein enriched overflow stream having an enriched protein concentration and/or increased protein yield relative to an unfiltered protein enriched overflow stream. In some aspects, the at least partially clarified protein enriched overflow stream is clarified. In some aspects, the at least partially clarified protein enriched overflow stream is clarified relative to a protein enriched overflow stream that has not been filtered (e.g., as described herein). The clarity of product stream can be assessed using any convenient methods.

In some aspects, the filtering is performed using a washing filtration system that washes the filtered material (e.g., mechanized screen, static screen, etc.).

In some aspects, decreasing the hydrocyclone overflow rate relative to the hydrocyclone underflow rate increases the protein content in the filtered material (i.e., material that does not pass through the screen) and increases the protein content of the first protein enriched fraction.

In some aspects, the filtering reduces the fat content of the first protein enriched fraction.

In some aspects, the method further includes using a portion, up to 100%, of a process evaporator condensate to remove, as a suspension or solution, water soluble components and/or water insoluble components from a high fiber feed stream.

In some aspects, removing the water soluble components and/or the water insoluble components (e.g., having small particle sizes) produces an animal feed that is higher in fiber purity.

In some aspects, the water soluble components and/or the water insoluble components (e.g., having small particle sizes) removed from the high fiber feed stream are recycled into a next fermentation cycle.

In some aspects, the water soluble components and/or the water insoluble components (e.g., having small particle sizes) removed from the high fiber feed are moved into an oil recovery and high purity protein recovery process to produce additional fractions of oil and/or additional protein volume.

In some aspects, the process is a stillage clarification process that produces: between one and seven and one half pounds per bushel on a dry matter basis of the first protein enriched fraction; between two and nine pounds per bushel of the second protein depleted fraction; and/or a third fraction of between 74% and 100% concentration of bio-oil and bio-oil degradation products and a fourth fraction enriched in solubles (e.g., thin stillage) between two and five pounds per bushel on a dry matter basis.

In some aspects, the process is a stillage clarification process that produces: between one and seven and one half pounds per bushel on a dry matter basis of the first protein enriched fraction; between two and eight and one half pounds per bushel of the second protein depleted fraction; and/or a third fraction of between 74% and 100% concentration of bio-oil and bio-oil degradation products and a fourth fraction enriched in solubles between two and five pounds per bushel on a dry matter basis.

Aspects of the present disclosure include a product produced according to the process described herein.

Aspects of the present disclosure include a stillage fractionation and/or clarification system, including: a grain ethanol plant producing stillage; one or more modified hydrocyclones each lacking a grit pot; and one or more decanting or disc-style centrifuges; wherein the system is configured to fractionate whole stillage into fractions including: a first protein enriched fraction including 40% to 60% protein on a dry weight basis; and a second protein depleted fraction including 20 to 34% protein on a dry weight basis.

In some aspects, the process further includes a washing filtration system configured to filter, with washing of the filtered material, a protein enriched overflow stream of the one or more modified hydrocyclones to produce a clarified protein enriched overflow stream.

In some aspects, the system further includes a whole stillage storage tank.

In some aspects, the system further includes an evaporator.

In some aspects, the system further includes a means for recycling water.

In some aspects, the system further includes a thin stillage storage tank.

Aspects of the present disclosure include a process for fractionating whole stillage, comprising using one or more hydrocyclones without a grit pot at high flow rate and high feed pressure to fractionate whole stillage into first and second fractions containing suspended solids, wherein the first fraction is enriched in protein and the second fraction is depleted in protein; and presenting the first and second fractions to centrifuges for mechanical dewatering, and recovering from the centrifuges suspended solid fractions comprising: a first dewatered fraction comprising 40% to 60% protein on a dry weight basis.

In some aspects, the centrifuge(s) is a decanting or disc-style centrifuge. In some aspects, the centrifuge(s) is a decanting centrifuge. In some aspects, the centrifuge(s) is a disc-style centrifuge.

Aspects of the present disclosure include a process for fractionating whole stillage, comprising: using one or more hydrocyclones without a grit pot at high flow rate and high feed pressure to fractionate whole stillage into first and second fractions containing suspended solids, wherein the first fraction is enriched in protein and the second fraction is depleted in protein; and presenting the first and second fractions to centrifuges for mechanical dewatering, and recovering from the centrifuges suspended solid fractions comprising: a first dewatered fraction comprising 40% to 60% protein on a dry weight basis; and a second dewatered fraction comprising 20 to 34% protein on a dry weight basis, wherein the centrate from the second dewatered fraction is substantially depleted in suspended solids.

In some aspects, the centrifuge(s) is a decanting or disc-style centrifuge. In some aspects, the centrifuge(s) is a decanting centrifuge. In some aspects, the centrifuge(s) is a disc-style centrifuge.

Aspects of the present disclosure include a process for fractionating whole stillage, comprising: using one or more hydrocyclones without a grit pot at high flow rate and high feed pressure to fractionate whole stillage into first and second fractions containing suspended solids, wherein the first fraction is enriched in protein and the second fraction is depleted in protein, and wherein the one or more hydrocyclones are operated at an overflow flow rate that is less than three times the underflow flow rate; and presenting the first and second fractions to centrifuges for mechanical dewatering and recovering from the centrifuges suspended solids fractions comprising: a first dewatered fraction comprising 40% to 60% protein on a dry weight basis.

In some aspects, the centrifuge(s) is a decanting or disc-style centrifuge. In some aspects, the centrifuge(s) is a decanting centrifuge. In some aspects, the centrifuge(s) is a disc-style centrifuge.

Aspects of the present disclosure include a process for fractionating whole stillage, comprising: using one or more hydrocyclones without a grit pot at high flow rate and high feed pressure to fractionate whole stillage into first and second fractions containing suspended solids, wherein the first fraction is enriched in protein and the second fraction is depleted in protein, and wherein the one or more hydrocyclones are operated at an overflow flow rate that is less than three times the underflow flow rate; and presenting the first and second fractions to centrifuges for mechanical dewatering and recovering from the centrifuges suspended solids fractions comprising: a first dewatered fraction comprising 40% to 60% protein on a dry weight basis; and a second dewatered fraction comprising 20 to 34% protein on a dry weight basis, wherein the centrate from the second dewatered fraction is substantially depleted in suspended solids.

In some aspects, the centrifuge(s) is a decanting or disc-style centrifuge. In some aspects, the centrifuge(s) is a decanting centrifuge. In some aspects, the centrifuge(s) is a disc-style centrifuge.

Aspects of the present disclosure include a process for fractionating whole stillage, comprising: using one or more hydrocyclones and at least one filtration device to fractionate whole stillage into first and second fractions containing suspended solids, wherein the first fraction is enriched in protein and the second fraction is depleted in protein; and presenting the first and second fractions to centrifuges for mechanical dewatering, said suspended solids fractions recovered by the decanter comprising: a first fraction comprising 40% to 60% protein on a dry weight basis.

In some aspects, the centrifuge(s) is a decanting or disc-style centrifuge. In some aspects, the centrifuge(s) is a decanting centrifuge. In some aspects, the centrifuge(s) is a disc-style centrifuge.

Aspects of the present disclosure include a process for fractionating whole stillage, comprising: using one or more hydrocyclones and at least one filtration device to fractionate whole stillage into first and second fractions containing suspended solids, wherein the first fraction is enriched in protein and the second fraction is depleted in protein; and presenting the first and second fractions to centrifuges for mechanical dewatering, said suspended solids fractions recovered by the decanter comprising: a first fraction comprising 40% to 60% protein on a dry weight; and a second dewatered fraction comprising 20 to 34% protein on a dry weight basis, wherein the centrate from the second dewatered fraction is substantially depleted in suspended solids.

In some aspects, the centrifuge(s) is a decanting or disc-style centrifuge. In some aspects, the centrifuge(s) is a decanting centrifuge. In some aspects, the centrifuge(s) is a disc-style centrifuge.

Aspects of the present disclosure include a protein concentration process comprising: using one or more hydrocyclones and a washing filtration system to fractionate whole stillage into two fractions containing suspended solids enriched in protein and a second fraction depleted in protein; and using the washing filtration system to further enrich the high protein fraction in protein concentration and/or increase the yield of the high protein fraction; and presenting the two fractions to a plant's existing decanting centrifuges for mechanical dewatering, said suspended solids fractions recovered by the decanter comprising: a first fraction comprising 40% to 60% protein on a dry weight basis.

Aspects of the present disclosure include a protein concentration process comprising: using one or more hydrocyclones and a washing filtration system to fractionate whole stillage into two fractions containing suspended solids enriched in protein and a second fraction depleted in protein; and using the washing filtration system to further enrich the high protein fraction in protein concentration and/or increase the yield of the high protein fraction; and presenting the two fractions to a plant's existing decanting centrifuges for mechanical dewatering, said suspended solids fractions recovered by the decanter comprising: a first fraction comprising 40% to 60% protein on a dry weight basis; and a second dewatered fraction comprising 20 to 34% protein on a dry weight basis, wherein the centrate from the second dewatered fraction is substantially depleted in suspended solids.

In some aspects, the centrate from the underflow decanter is depleted in suspended solids compared to traditional thin stillage; and a portion of the centrate, up to 100%, is directed to the evaporation process; and concentrate produced by the evaporation process is in excess of 50% solids on a dry matter basis.

In some aspects, the centrate from the underflow decanter is depleted in suspended solids compared to traditional thin stillage; and a portion of the centrate, up to 100%, is directed to mash bill as backset; and the backset is reduced in suspended solids.

Decanter UF centrate is the centrate from a decanting centrifuge processing UF from a modified hydrocyclone processing the plant whole stillage, HC (UF) Underflow is the underflow from a modified hydrocyclone processing the plant whole stillage, Whole Stillage is the plant whole stillage, HC (OF) Overflow is the overflow from a modified hydrocyclone processing the plant whole stillage, Decanter OF centrate is the centrate from a decanter processing overflow from a modified hydrocyclone processing the plant whole stillage, and Plant Thin Stillage is the thin stillage from the traditional plant operation produced by a decanter processing the plant whole stillage.

The top layer of material in each test tube depiction is a watery rich layer with few fine suspended solids, the next layer, dark in color, is a soft compacting solid, and the bottom layer with distorted circles and oval shapes is a heavy compacting solid. The distorted circles and ovals represent larger particles in the heavy compacting solid. There was no visible evidence that heavy compacting layer exists in the Decanter OF centrate or the Plant Thin Stillage.

Figures 14A, 14B:
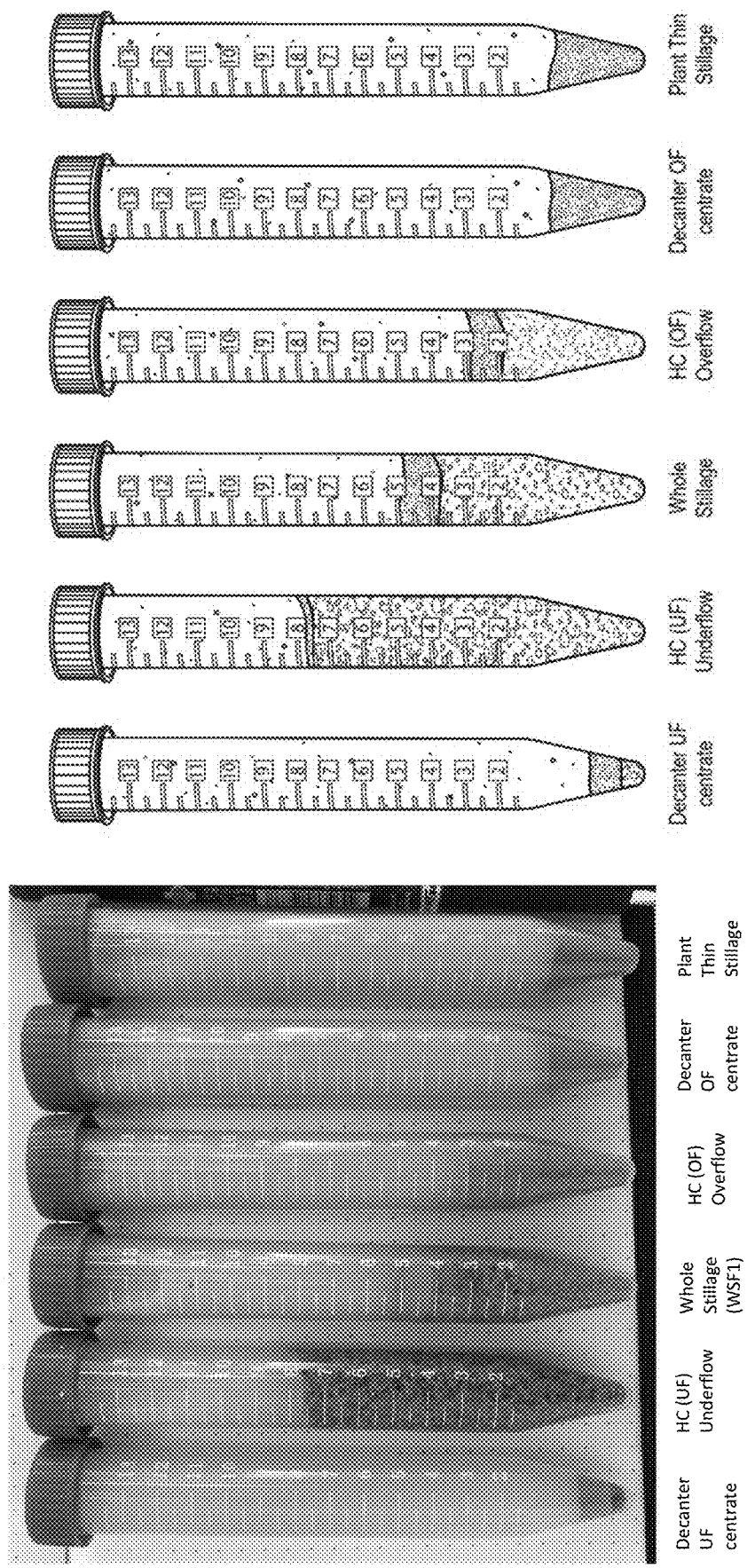
FIG. 14A shows centrifuge spin tubes demonstrating the compaction/setting of each sample of spinnable solids processed by a plant running 100% grain sorghum by a lab centrifuge operated at 3000 g and 5 minutes spin time, where.

FIG. 14B shows a schematic of the compacting/setting pattern of each sample of spinnable solids as shown in FIG. 14A.

Figure 14C:
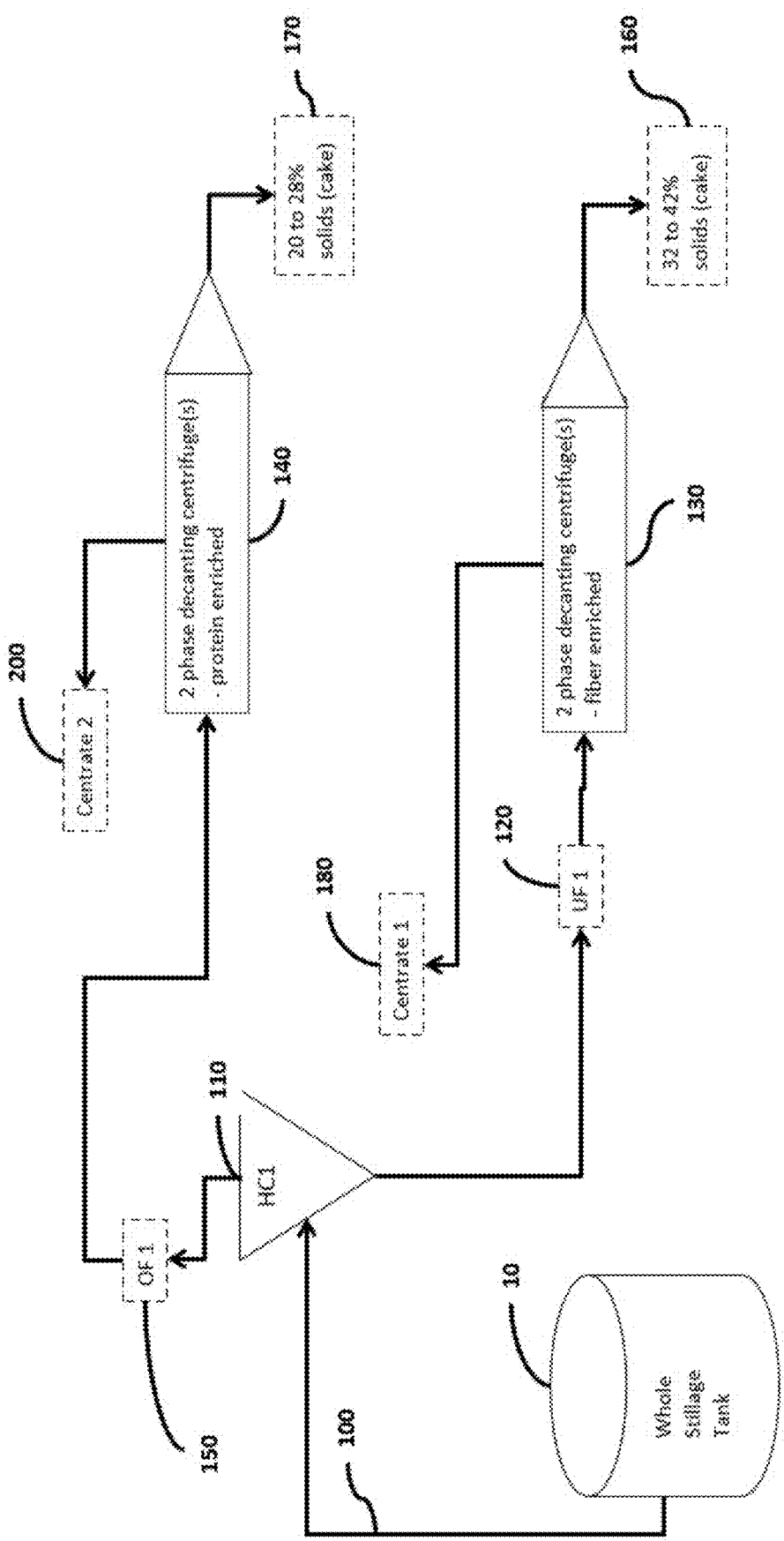

FIG. 14C shows an example schematic view of a stillage fractionation system.

Figure 15:
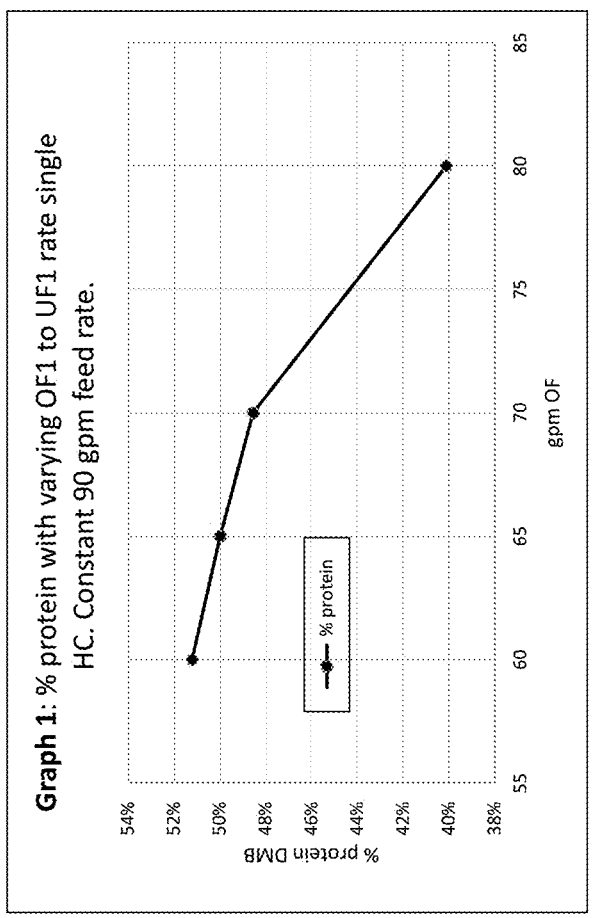

FIG. 15 shows a plot of % protein in a product composition when varying overflow OF1 to underflow UF1 rate for single hydrocyclone process at constant feed rate of 90 gallons per minute (gpm). See Example 4.

Figure 16:
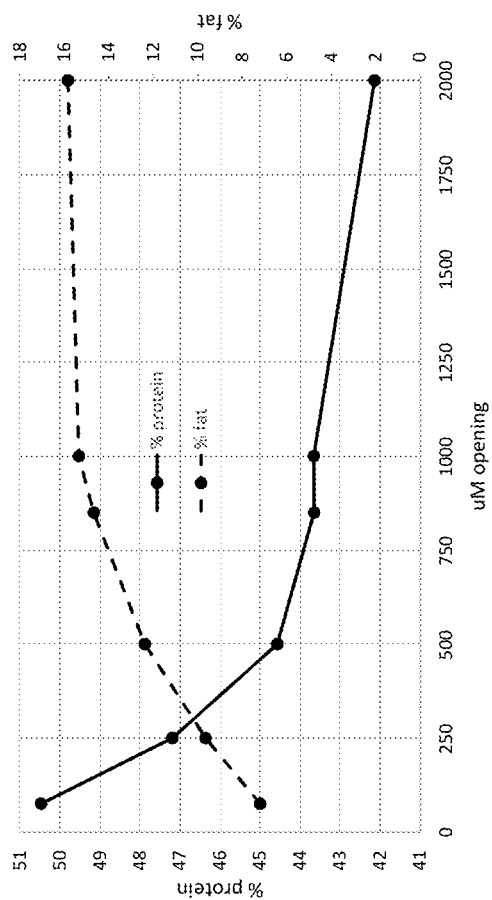

FIG. 16 shows a graph of the % protein and % fat content of materials that passed though a screen, and the suspended solids recovered by lab centrifuge and analyzed. See Table 12, Example 6.

Figure 17:
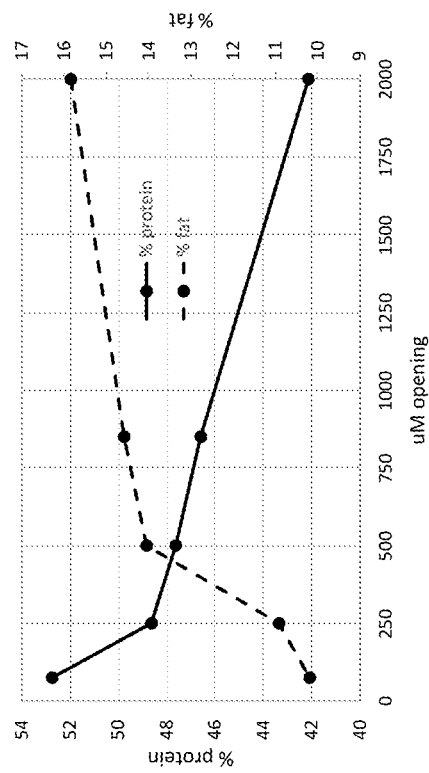

FIG. 17 shows a graph of the % protein and % fat content of materials that passed though a screen, and the material on top of the screen washed with 3 volumes of water and the suspended solids recovered by lab centrifuge and analyzed. See Table 13, Example 6.

Figure 18:
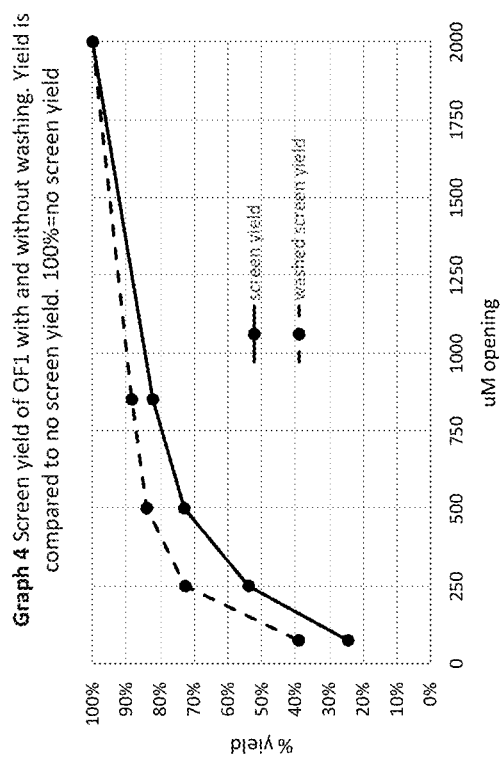

FIG. 18 shows a comparision of the yield of suspended solids material that passes through the screen from screening the overflow OF1, with or without washing on the screen. The graph shows that washing on the screen increases the yield per bushel. See Table 14, Example 6.

Figure 19:
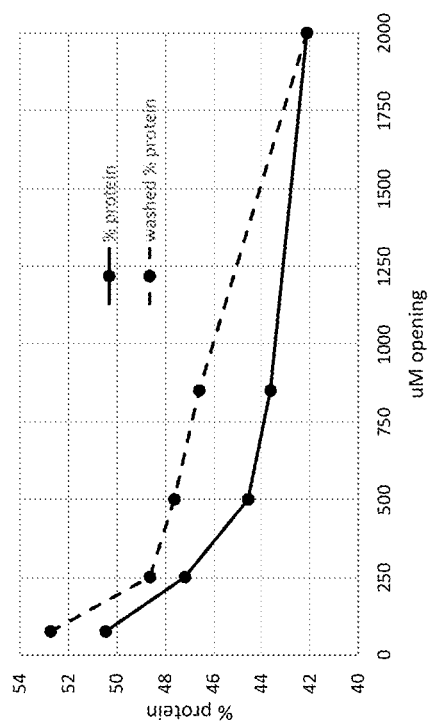

FIG. 19 shows a comparision of the protein purity of material produced with screening the overflow OF1, with or without washing on the screen. The graph shows that washing on the screen increases the protein purity of OF1 material suspended solids material directed to the decanter for recovery. See Table 15, Example 6.

Figure 20:
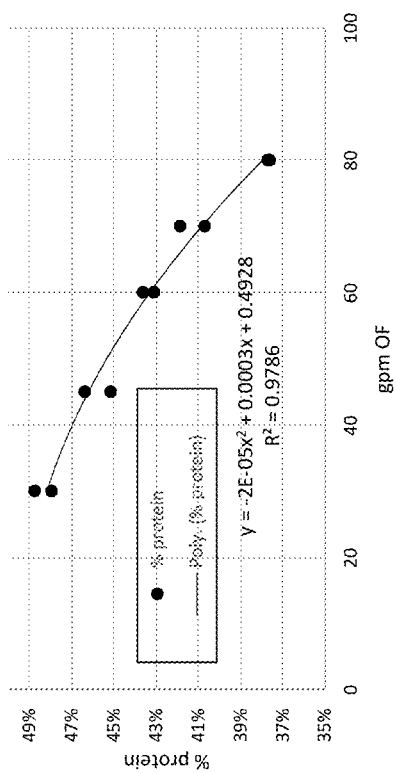

FIG. 20 shows a graph of protein concentration of 70% corn 30% sorghum OF recovered decanter cake as overflow OF rate is varied at constant 90 gpm hydrocyclone feed rate. See Table 18, Example 8.

Figure 21:
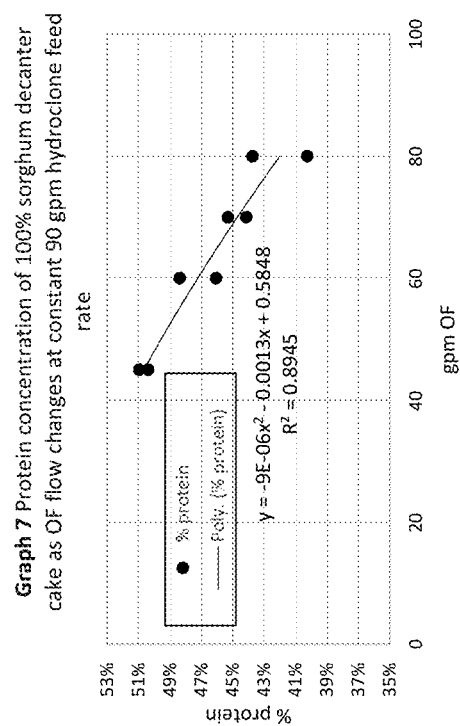

FIG. 21 shows a graph of protein concentration of 100% sorghum OF recovered decanter cake as overflow OF rate is varied at constant 90 gpm hydrocyclone feed rate. See Table 19, Example 9.

Figure 22:
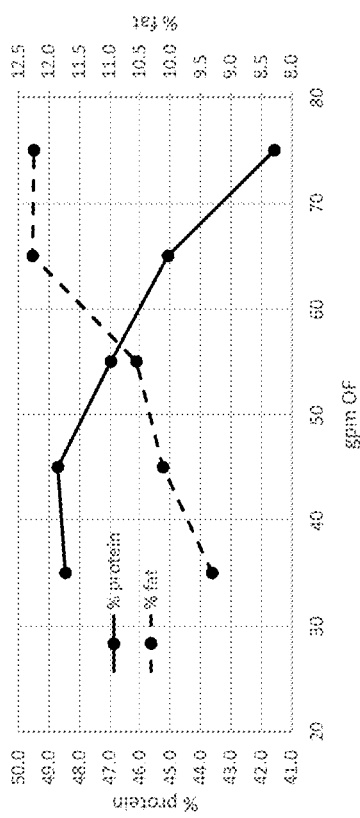

FIG. 22 shows a graph of protein and oil concentration of 100% corn whole stillage as overflow OF1 rate is varied at constant 95 gpm hydrocyclone feed rate. See Table 20, Example 10.

Figure 23:
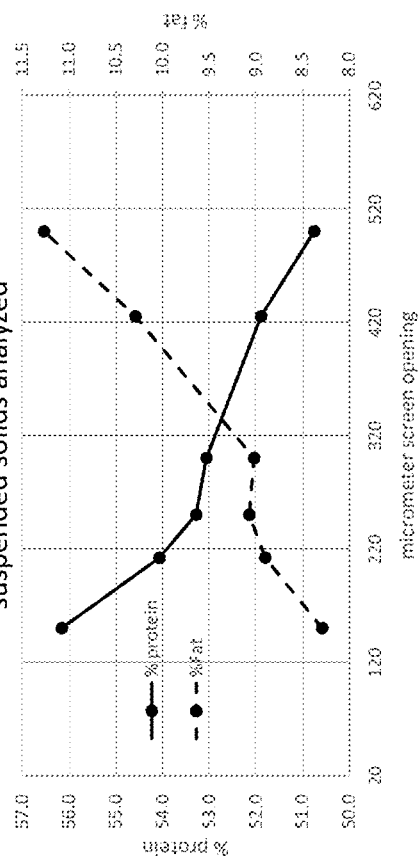

FIG. 23 shows a graph of protein and oil concentration of 100% corn whole stillage os overflow OF1 at 65 gpm OF and 90 gpm feed. Material passed through a screen and the material on top of the screen washed with 3 volumes of water. All materials that passed through screen were processed with a laboratory centrifuge and the recovered suspended solids analyzed. See Table 21, Example 10.

Figure 24:
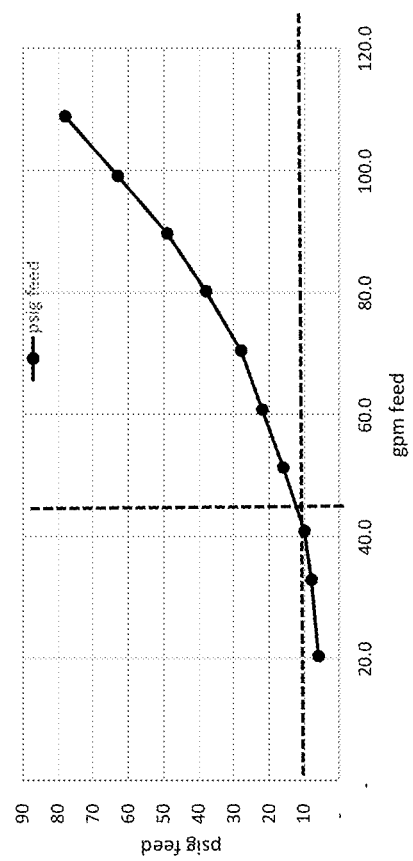

FIG. 24 shows a graph of overflow:underflow 1OF:1UF feed rate vs feed pressure. For example, at the 60 gpm feed rate the OF rate is 30 gpm and the UF rate is 30 gpm. Dashed line at 45 gpm feed rate is manufacturer's recommended rate. Dashed line at 10 psig is the manufacturer's recommended pressure. See Table 22, Example 11.

Figure 25:
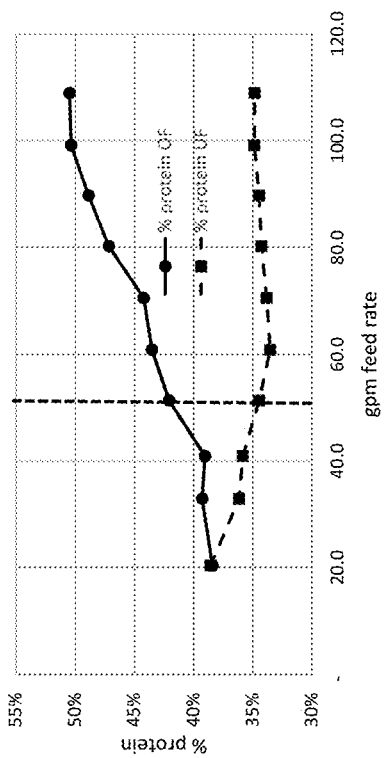

FIG. 25 shows a graph of % protein in overflow versus underflow (1OF:1UF) at various feed rate vs feed pressure. For example, at the 60 gpm feed rate the OF rate is 30 gpm and the UF rate is 30 gpm. The dashed line at 45 gpm is the manufacturer's recommended feed rate. See Table 22, Example 11.

Figure 26:
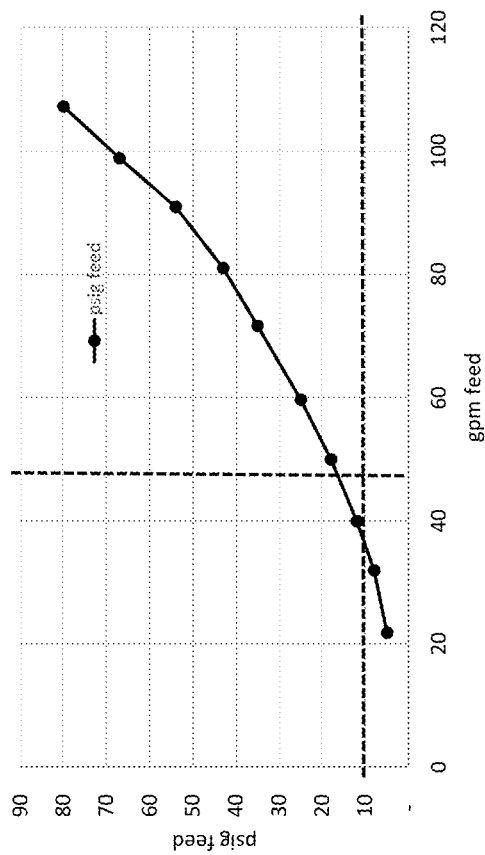

FIG. 26 shows a graph of psig feed vs feed flow rate for 2 parts overflow OF to 1 part underflow UF flow rate. Dashed line at 45 gpm feed rate is manufacturer's recommended rate. Dashed line at 10 psig is the manufacturer's recommended pressure. See Table 23, Example 11.

Figure 27:
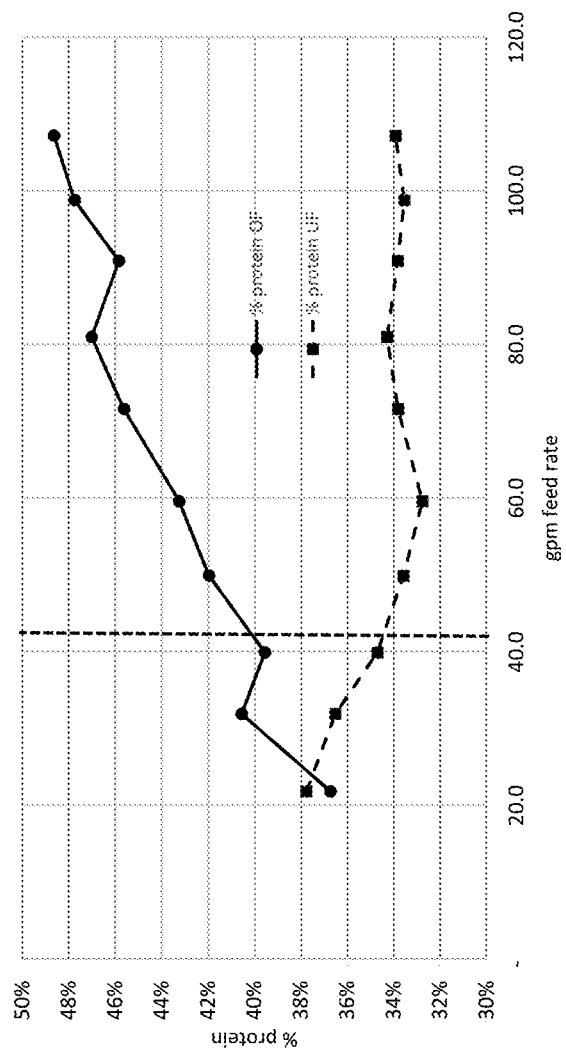

FIG. 27 shows a graph demonstrating the protein content in the overflow OF continued to rise as the feed rate to the system increased. The dashed line at 45 gpm is the manufacturer's recommended feed rate. See Table 23, Example 11.

Figure 28:
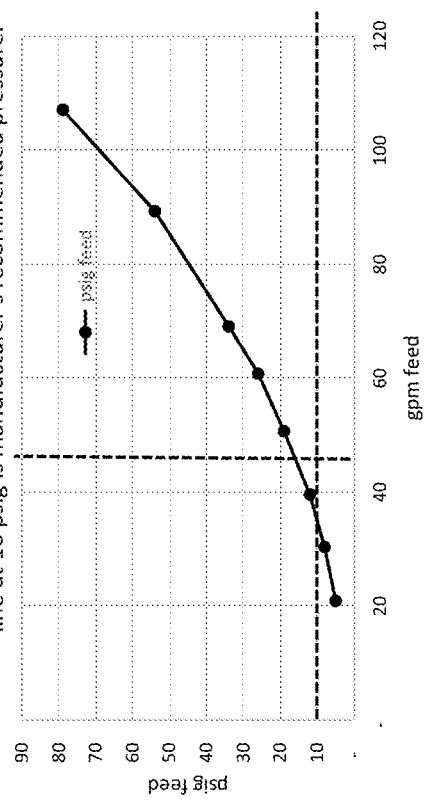

FIG. 28. shows a graph of feed rate vs feed pressure for 3 parts overflow OF to 1 part underflow UF flow rate. Dashed line at 45 gpm feed rate is manufacturer's recommended rate. Dashed line at 10 psig is the manufacturer's recommended pressure. See Table 24, Example 11.

Figure 29:
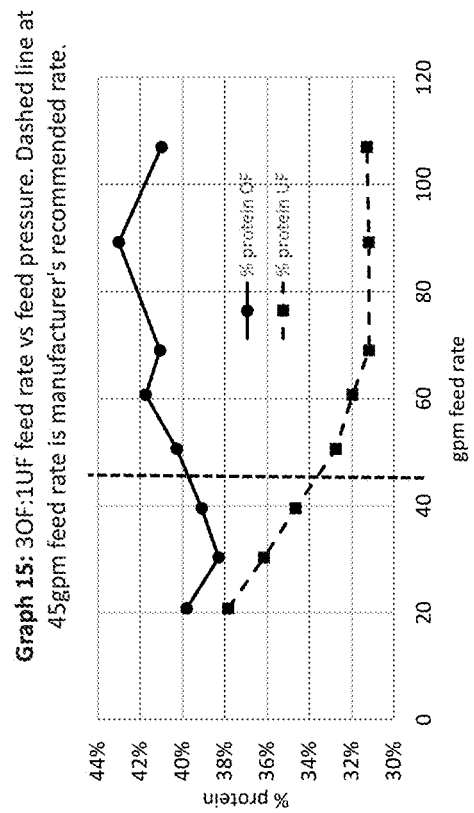

FIG. 29 shows protein content in the overflow OF continued to rise as the feed rate to the system increased. Dashed line at 45 gpm feed rate is manufacturer's recommended rate. See Table 24, Example 11.

Figure 30:
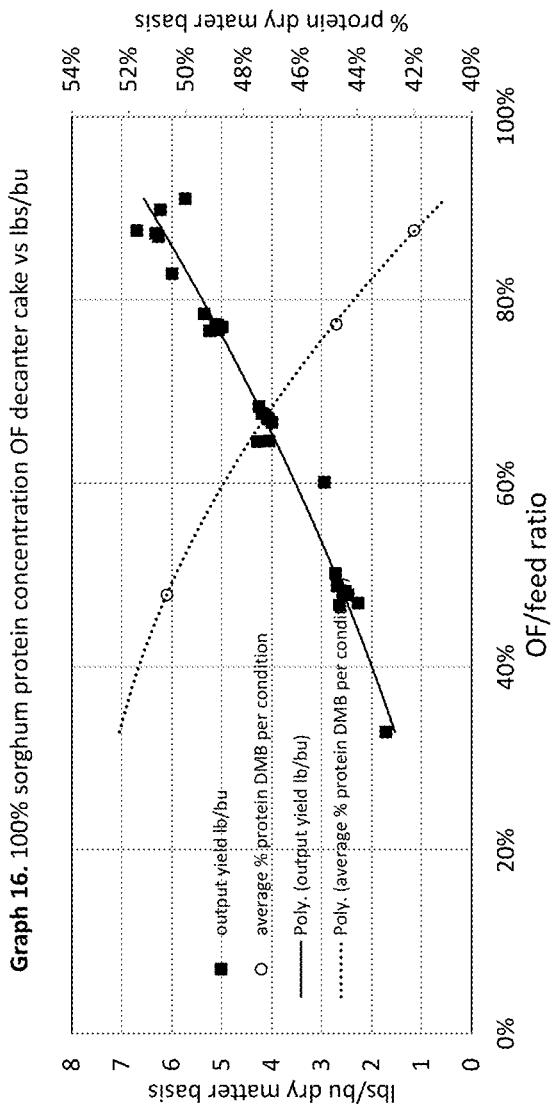

FIG. 30 shows protein concentration and pounds per bushel dry matter basis yield of OF1 recovered by decanter. This is at a 100% grain sorghum ethanol plant processing whole stillage at different OF to UF splits. The OF1 was recovered with a decanter centrifuge and the recovered protein analyzed for protein concentration. See Table 25 and 26, Example 12.

Figure 31:
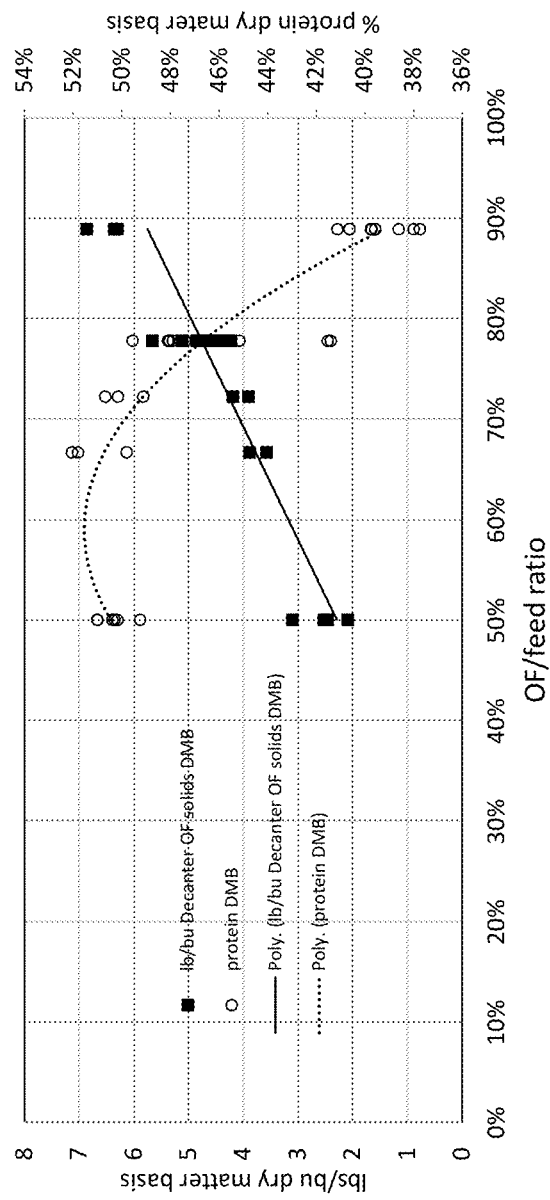

FIG. 31 shows protein concentration and pounds per bushel dry matter basis yield of OF1 recovered by decanter. This is at a 100% corn (Zea maize) ethanol plant processing whole stillage at different OF to UF splits. The OF1 was recovered with a decanter centrifuge and the recovered protein analyzed for protein concentration. See Table 27, Example 13.

Figure 32:
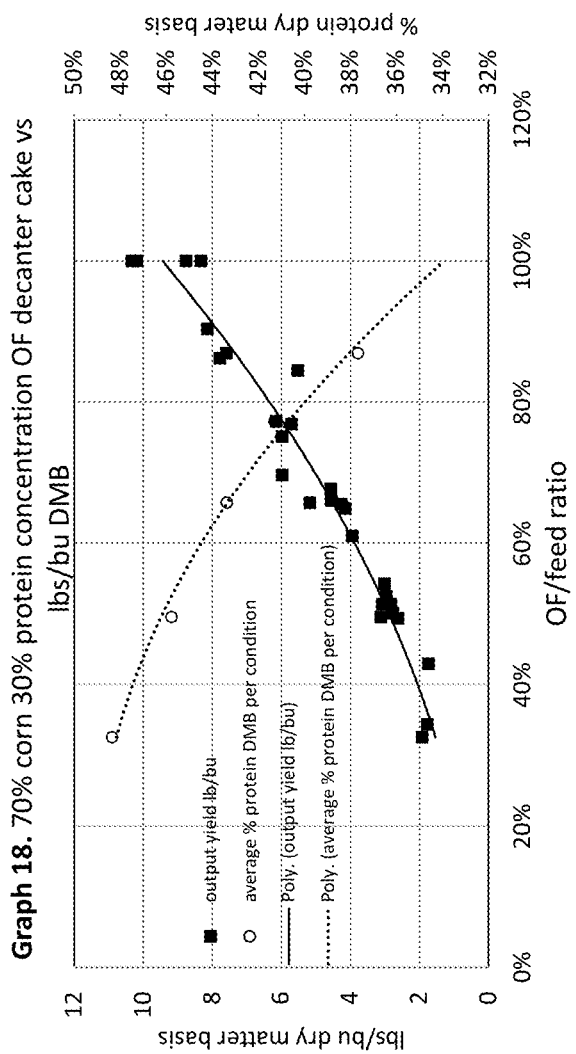

FIG. 32 shows protein concentration and pounds per bushel dry matter basis yield of OF1 recovered by decanter. This is at a 70% corn (Zea maize) and 30% sorghum ethanol plant processing whole stillage at different OF to UF splits. The OF1 was recovered with a decanter centrifuge and the recovered protein analyzed for protein concentration. See Table 28, Example 14.

Figure 33:
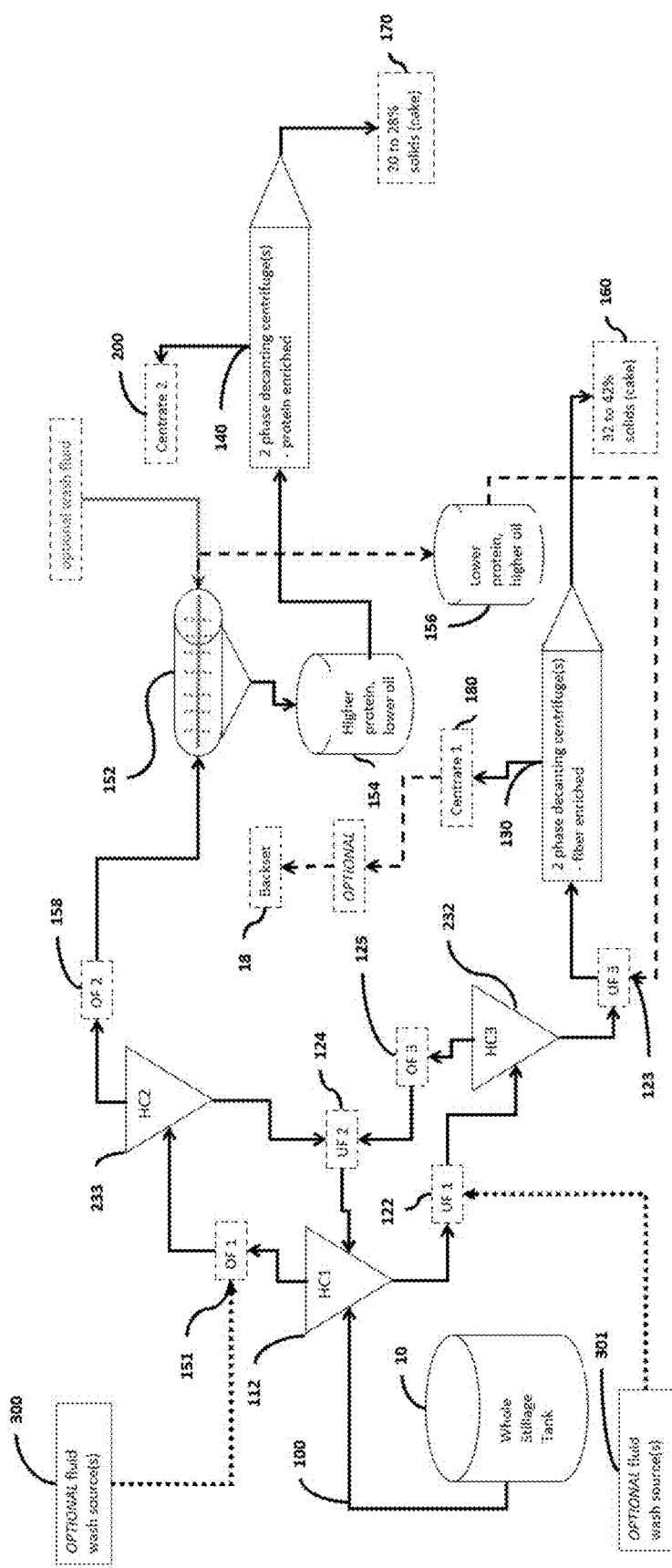

FIG. 33 shows a three hydrocyclone cascading system for recycling OF and UF flows from a subsequent hydrocyclone back to a previous hydrocyclone for additional protein and fiber purity and yield. See examples 17 and 19.

Figure 34:
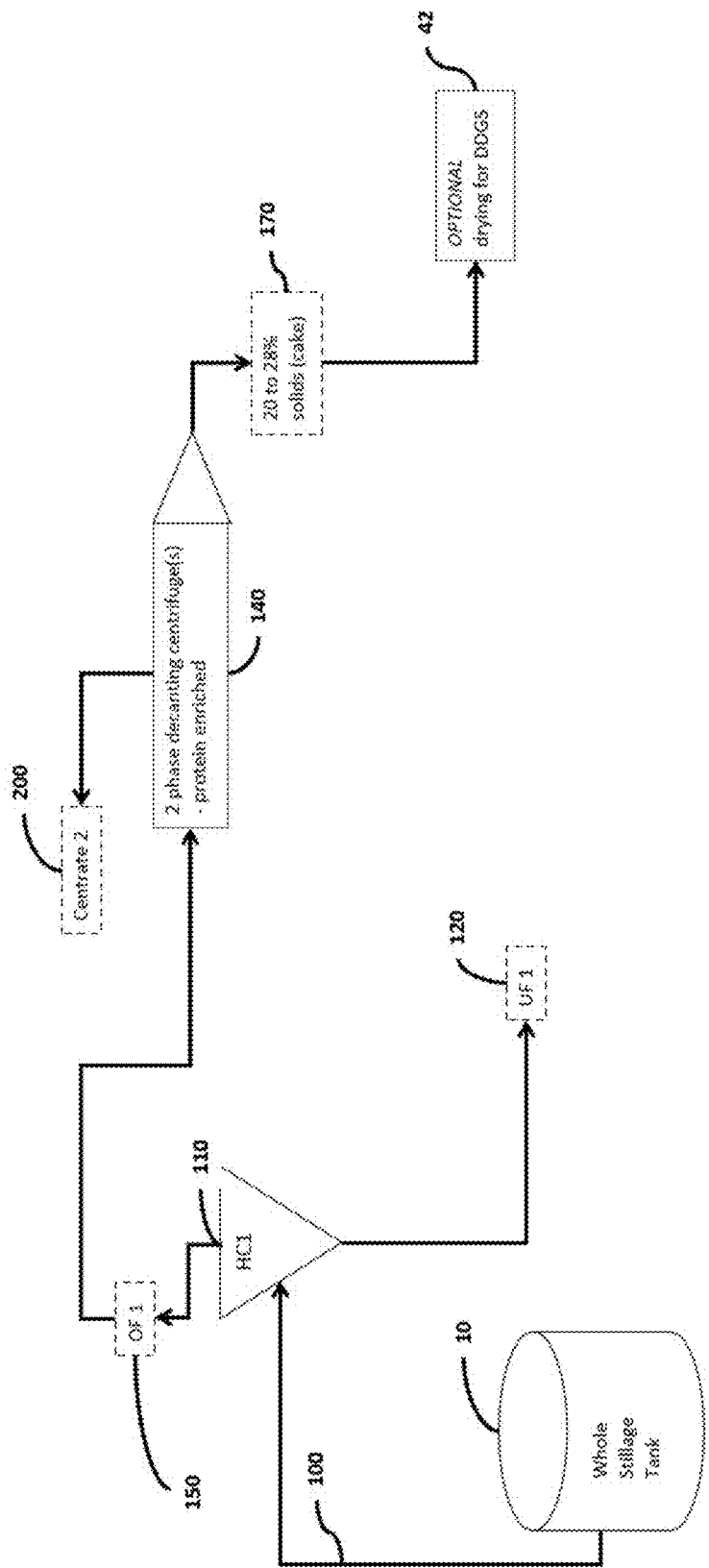

FIG. 34 shows the flow diagram for fractionating the whole stillage into an OF, recovering the protein product with a decanting centrifuge and drying the recovery protein enriched product in a drum dryer. See Example 20.

Various embodiments of the present disclosure illustrate several ways in which the present disclosure may be practiced. These embodiments will be described in detail with reference to the drawings, wherein like reference numerals represent like parts throughout the several views. Reference to specific embodiments does not limit the scope of the present disclosure and the drawings represented herein are presented for exemplary purposes.

DEFINITIONS

The following definitions and introductory matters are provided to facilitate an understanding of the present disclosure. Unless defined otherwise, all technical and scientific terms used herein have the same meaning as commonly understood by one of ordinary skill in the art to which embodiments of the present disclosure pertain.

The terms "a," "an," and "the" include plural referents unless context clearly indicates otherwise. Similarly, the word "or" is intended to include "and" unless context clearly indicate otherwise. The word "or" means any one member of a particular list and also includes any combination of members of that list.

It is further noted that the claims may be drafted to exclude any element which may be optional. As such, this statement is intended to serve as antecedent basis for use of such exclusive terminology as "solely", "only" and the like in connection with the recitation of claim elements, or the use of a "negative" limitation.

The terms "disclosure" or "present disclosure" as used herein are not intended to refer to any single embodiment of the particular disclosure but encompass all possible embodiments as described in the specification and the claims.

The term "about", "approximately", or "substantially" as used herein refers to variation in the numerical quantities that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Numerical adjectives and adverbs (e.g., first, second, etc.), positional adjectives and adverbs (e.g., vertical, horizontal, forward, aft, etc.), nouns describing orientation of an object (e.g., top, bottom, sides, etc.), and the like are referenced according to the views presented. These terms are used only for purposes of description and are not limiting unless these terms are expressly included in the claims. The physical configuration of an object or a combination of objects may change without departing from the scope of the present disclosure.

The terms "weight percent," "wt. %," "percent by weight," "% by weight," and variations thereof, as used herein refer to the concentration of a substance as the weight of that substance divided by the total weight of the composition and multiplied by 100.

The terms "fat" and "oil" are used interchangeably and refer generically to lipid material derived from plant sources. The terms "oil" and "fat" can include, without limitation, free fatty acids, monoacyl glycerides, diacylglycerids, triacylglycerides, waxes and gums, emulsions of each and any of these compounds, and the like. The term "fat content" is commonly used to describe the quantity of fat present in animal feed(s). Fat content may be expressed in terms of weight percent or any other suitable unit of measurement.

The term "HC" refers to a static density classification device, such as a hydrocyclone.

A centrifuge is a piece of equipment that puts an object in rotation around a fixed axis (spins it in a circle), applying a force perpendicular to the axis of spin (outward) that can be very strong.

A "decanter" is a vessel that is used to hold the decantation of a liquid which may contain solids. A decanting centrifuge has properties of both a decanter and a centrifuge.

A "disc centrifuge" is a vessel that is used to separate solid and liquid mixtures which may contain solids. The "disc centrifuge" is used interchangeably herein as "disc-style centrifuge" and "disc stack centrifuge". A non-limiting example of a disc-style centrifuge includes, but is not limited to, a centrifuge that contains a stack (e.g. vertical stack) of discs of a particular thickness in the shape of cones. Any type of disc-style centrifuge may be used in the methods and devices of the present disclosure.

The term "UF" refers to the high suspended solids stream from a solid/liquid separation device. Classically, "UF" is used for the underflow stream from a hydrocyclone and the underflow stream from a disc stack centrifuge. The term "UF" has the classical meaning for those two devices as well as referring to the high suspended solids stream from any solid/liquid separation device.

The term "OF" refers to the low suspended solids stream from a solid/liquid separation device. Classically, "OF" is used to refer to the overflow stream from a hydrocyclone and the overflow stream from a disc stack centrifuge. The term "OF" has the classical meaning for those two devices as well as referring to the low suspended solids stream from any solid/liquid separation device.

The term "syrup" is synonymous with "condensed corn distiller's solubles" or CCDS. Syrup is produced by the evaporative concentration of the non-water materials found in traditional thin stillage. Syrup is produced by the evaporative concentration of the non-water materials found in the reduced solids thin stillage as taught herein.

The term "DMB" refers to dry matter basis. For calculations of concentration of a material the DMB refers to the concentration of the analyte in question after all of the water has been removed from the material, generally by laboratory gravity oven. After all moisture has been removed the analysis of the material is performed and the concentration of the desired analyte is reported on a dry matter basis (DMB).

The apparatuses, systems, and methods of the present disclosure may comprise, consist essentially of, or consist of the components of the present disclosure described herein. The term "consisting essentially of" means that the apparatuses, systems, and methods may include additional components or steps, but only if the additional components or steps do not materially alter the basic and novel characteristics of the claimed apparatuses, systems, and methods.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

DETAILED DESCRIPTION

Overview

The following embodiments are described in sufficient detail to enable those skilled in the art to practice the disclosure however other embodiments may be utilized. Mechanical, procedural, and other changes may be made without departing from the spirit and scope of the disclosure. Accordingly, the scope of the disclosure is defined only by the appended claims, along with the full scope of equivalents to which such claims are entitled.

Aspects of the present disclosure include methods and systems for efficiently processing, recovering, and concentrating protein laden co-products and oil co-products generated from a stillage fractionation and/or clarification process.

The protein concentration process specifically separates a liquid flow containing grain particles into two flows. One flow is enriched in materials that have higher inertial forces in a rotating fluid. These materials, particularly the larger suspended particles, have been determined by the inventor to be higher in fiber content than the smaller suspended particles. After this split, the high fiber flow stream can be additionally refined to further enrich in fiber concentration and deplete in protein concentration.

The second flow is enriched materials that have lower inertial forces in a rotating fluid, these materials, particularly the smaller suspended particles, have been determined by the inventor to be higher in protein content. After this split the high protein flow stream can be passed through a filtration device, for example a washing paddle machine FIG. 8 (see e.g., U.S. Pat. No. 9,718,006), to remove particles above a specific size. The terms "filter", "filtration" and "screen" are used interchangeable herein to refer to various aspects of such a filtration step. The larger particles removed in such a filtration step have been determined by the inventor to be higher in fiber content and higher in oil content. The particles removed by the screen can be combined with the higher fiber flow. Independent mechanical dewatering of the fiber enriched stream and the protein enriched stream results in two products that can be marketed as differentiated products due to their different nutritional and digestible properties. It is advantageous to use wash fluid, particularly counter-current wash fluid, during the filtration process. The inventor has determined that using wash fluid during such a step increases the concentration of protein and yield in the high protein fraction that is produced.

The process of the present disclosure provides a protein concentration system that may be used in a wide variety of applications and is cost-effective. The process of the present disclosure provides a protein concentration system that is quick to build without undue reliance on highly specialized equipment or long-lead time equipment.

The present inventors have determined that the screen described in the present disclosure can reduce the fat content in the high protein stream. The present inventors also found that washing on the screen (e.g., washing the particulate residue separated from the protein enriched stream in the filtration step) increases the protein concentration in the resulting high protein stream, and increases yield in the high protein fraction produced using the method.

The present inventors have found that removal of grit pot from the hydrocyclone device used in the subject method increases system performance. The removal of this part of the hydrocyclone system substantially reduced plugging in whole stillage separation. Removal of the grit pot resulted in higher uptime due to reduced plugging. Removal of the grit pot resulted in easier startup of the system due to reduced plugging on initial startup. Removal of the grit pot resulted in easier shutdown of the system due to reduced plugging. Highly efficient separation of small particles containing higher protein concentration from larger particles containing lower protein concentrations are demonstrated with a hydrocyclone system without grit pot. In addition to the operational advantages, the cost of installation is reduced. This reduction is realized both because less hardware needs to be purchased. Additionally, the overall height of the hydrocyclone unit is shorter with the grit pot removed reducing the size of the overhead height of building construction necessary for housing the hydrocyclone without grit pot.

The present inventors have found that increasing the OF flow at the expense of the UF flow from the hydrocyclone decreases the protein content in the high protein screen increases the protein in the high protein fraction.

The following provides a list of aspects or embodiments disclosed herein and does not limit the overall disclosure. It is contemplated that any of the embodiments disclosed herein can be combined with other embodiments, either in full or partially, as would be understood from reading the disclosure.

Aspects of the present disclosure includes a protein concentration system for use in performing the subject methods that does not leave significant stranded assets at existing production facilities but seeks to reuse and/or repurpose equipment already owned by the facility. The protein concentration system is easily operated and is easily assembled or installed, disassembled or uninstalled, repaired, and cleaned.

In some embodiments, the protein concentration system produces at least one fraction of stillage material that is enriched in protein content. In some embodiments, the protein concentration system produces at least one fraction of stillage material that is enriched in fiber content. In some embodiments, the protein concentration system produces one or more material products or stillage fractions that are depleted in oil content.

Aspects of the present disclosure include a process for fractionating whole stillage. The stillage fractionation process of the present disclosure can include use of static density classification devices and filtration devices, e.g., hydrocyclone(s) and paddle machine(s). The subject processes can use a facility's existing centrifuges, e.g. decanting centrifuges or disc-style centrifuges, with or without internal modification, for recovery of the stillage fractions created with the hydrocyclone(s) and filtration device(s) at a grain ethanol plant. The existing centrifuges of a facility can be decoupled such that one or more centrifuges are configured to process a protein enriched, fiber depleted fraction and one or more centrifuges are configured to process a protein depleted, fiber enrich fraction. The combination of the hydrocyclone(s) and filtration device(s) with the existing centrifuges of such a facility can be configured to produce two stillage fractions having attributes (e.g., feed attributes) that are more desirable than DDGS (or WDGS) as a whole.

A protein concentration process for fuel ethanol spent distillation bottoms is also described using a hydrocyclone(s) and screen(s) that can specifically separate a stillage liquid material into two flows or streams. In some embodiments, the process includes separating whole stillage using one or more hydrocyclones, e.g., modified hydrocyclones lacking a grit pot, under conditions sufficient to produce a protein enriched overflow stream and a protein depleted underflow stream.

Modified Hydrocyclone

Aspects of the present disclosure include a hydrocyclone or modified hydrocyclone used in the process for fractionating whole stillage. In some embodiments, the term "modified hydrocyclone" refers to a hydrocyclone device that lacks any grit pot, or a hydrocyclone device that is operated without use of its grit pot in processing a stream.

In some embodiments, the static density device underflow is easier to dewater due to removal of fine protein particles relative to the feed flow. The natural interaction of the fine protein particles intermingled with the coarse fiber particles as is present in standard whole stillage, makes such materials hard to dewater. Separating higher protein particles with a static density device and filtration device according to embodiments of the subject methods can provide more effective dewatering of the coarse fiber particles. This easier separation allows new options for dewatering the new coarse fiber concentrate products of the subject methods with lower cost and use of lower maintenance devices than the traditional decanter. Non-limiting example devices that can be used in the subject methods include paddle machine, filter cloth, rotary vacuum filter, and press of many different types.

In some embodiments, the one or more modified hydrocyclones is a single pass hydrocyclone bank.

In some embodiments, the modified hydrocyclone is operated at an overflow flow rate that is less than three times the underflow flow rate. In some embodiments, the modified hydrocyclone is operated at an overflow flow rate that is greater than the underflow flow rate. In some embodiments, the modified hydrocyclone is operated at an overflow flow rate that is less than the underflow flow rate.

In some embodiments, the modified hydrocyclone is operated at a high feed flow rate and a high feed pressure. In certain embodiments, the feed flow rate of the whole stillage is 50% higher than manufacturers recommendation or more (e.g., 60% higher or more, 70% higher or more, 80% higher or more, 90% higher or more, and/or 100% higher or more). In certain embodiments, the feed pressure of the whole stillage is 12 psig or more than the manufacturers recommendation (e.g., 16 psig or more, 20 psig or more, 25 psig or more, 30 psig or more, 35 psig or more, 40 psig or more, 45 psig or more, 50 psig or more, 55 psig or more, 60 psig or more, 65 psig or more, 70 psig or more, or 75 psig or more).

In some embodiments, decreasing the hydrocyclone overflow rate relative to the hydrocyclone underflow rate increases the protein content in the overflow. Filtering the overflow material (e.g., with a screen) increases the protein content of the first protein enriched fraction, i.e. the overflow fraction.

Separating Whole Stillage

Aspects of the present disclosure include separating whole stillage using one or more modified hydrocyclones lacking a grit pot under conditions sufficient to produce a protein enriched overflow stream and a protein depleted underflow stream.

In some embodiments, separating whole stillage using one or more modified hydrocyclones includes conveying a first protein enriched overflow stream from a first pass hydrocyclone to a second pass hydrocyclone of equal or smaller diameter to produce a second protein enriched overflow stream. In certain embodiments, the second protein enriched overflow stream includes concentrated smaller protein particles. In some embodiments, the protein enriched overflow stream is enriched in smaller particle size materials, the aggregate of which are known to the inventor to be higher in protein content.

In some embodiments, separating whole stillage using one or more modified hydrocyclones includes conveying a first protein depleted underflow stream from a first pass hydrocyclone to one or more subsequent hydrocyclones of equal or smaller diameter to produce a second protein depleted underflow stream.

In certain embodiments, the second protein depleted underflow stream includes concentrated larger fiber particles. In some embodiments, the protein depleted underflow stream is enriched in large particle size materials, the aggregate of which are known to the inventor to be higher in fiber.

In some embodiments, separating whole stillage using one or more modified hydrocyclones is performed using two modified hydrocyclones each lacking a grit pot and configured together to produce the protein enriched overflow stream and the protein depleted underflow stream.

In some embodiments, separating whole stillage using one or more modified hydrocyclones is performed using three modified hydrocyclones each lacking a grit pot and configured together to produce the protein enriched overflow stream and the protein depleted underflow stream.

In some embodiments, separating whole stillage using one or more modified hydrocyclones is performed using three modified hydrocyclones each lacking a grit pot and configured together to produce the protein enriched overflow stream and the protein depleted underflow stream.

In some embodiments, separating whole stillage using one or more modified hydrocyclones is performed using more than three modified hydrocyclones each lacking a grit pot and configured together to produce the protein enriched overflow stream and the protein depleted underflow stream.

Solid Particles

Aspects of the present disclosure include a process that produces a protein depleted underflow stream and a protein enriched overflow stream.

In some embodiments, the protein enriched overflow stream and the protein depleted underflow stream each include suspended solid particles.

In some embodiments, a protein depleted underflow stream includes concentrated larger fiber particles.

In some embodiments, a protein enriched overflow stream includes concentrated smaller protein particles.

Filtering Protein Enriched Overflow System

As described in the present disclosure, after separating the protein enriched overflow stream and the protein depleted underflow stream, the fiber enriched stream can be additionally refined to further enrich in fiber and further deplete in protein.

Aspects of the present disclosure include, after separating the whole stillage using one or more modified hydrocyclones and before dewatering the protein enriched overflow stream and the protein depleted underflow stream, filtering the protein enriched overflow stream.

After this split, the protein enriched stream can be further refined to further enrich in protein and further deplete in fiber, such as with a particle size screening device and/or washing fluid.

In some embodiments, filtering reduces the fat content of the first protein enriched fraction.

In some embodiments, filtering is performed under conditions sufficient to produce a further clarified protein enriched overflow stream having an enriched protein concentration relative to an unfiltered protein enriched overflow stream.

In some embodiments, filtering is performed using an optional washing filtration system. The optional washing filtration system washes the filtered material. Washing moves small particles associated with the particles through the screen where they add to the quantity of materials (yield) recovered by the dewatering device, such as a decanting centrifuge or a disc-style centrifuge.

In certain embodiments, the process further includes using a portion of wash water. In certain embodiments, the wash water can be used on the higher protein fraction during, before or after the filter process. In certain embodiments, the wash water can also be used on the higher fiber fraction. Suitable wash fluid sources include, but are not limited to: thin stillage, backset, $CO_2$ scrubber bottoms, process evaporator condensate, methanator effluent, fresh feed water, other fluid(s) available and/or any combination of these streams in any proportion. In certain embodiments, available wash fluid is used to remove, by washing, as a suspension or solution, valuable components, such as water soluble components, e.g. salts, sugars, yeast and bacterial metabolites, small particle sized insoluble components smaller than the filtration pore openings, spent yeast bodies, spent bacterial bodies, bio-oils, and breakdown components of bio-oils, from a fiber enriched feed. In certain embodiments, the amount of wash fluid used and location(s) the wash fluid is used can comprise any amount desired based on plant water balance considerations and the quantity and quality of wash fluid sources available and quality of feed product desired. The removal (washing) of valuable components from the higher fiber fraction produces an animal feed higher in fiber purity. The removal of diluting components (washing) from the higher protein fraction produces an animal feed higher in protein purity. In certain embodiments, the components removed from the high fiber feed can be recycled into the next fermentation cycle and/or moved into the protein enriched purity recovery part of the process for capture as additional enriched protein volume. In certain embodiments, the components removed from the higher protein feed can be recycled into the next fermentation cycle and/or moved into the evaporation process. The use of the additional wash fluid(s) results in the recovery of a protein enriched feed of, for example, 42% to 60% protein on a dry matter basis; 44% to 56% protein on a dry matter basis; or 46% to 50% protein on a dry matter basis. In some embodiments, the use of the additional wash fluid(s) results in the recovery of a protein enriched feed of 42% to 60% protein on a dry matter basis. In some embodiments, the use of the additional wash fluid(s) results in the recovery of a protein enriched feed of 45% to 56% protein on a dry matter basis. In some embodiments, the use of the additional wash fluid(s) results in the recovery of a protein enriched feed of 46% to 50% protein on a dry matter basis.

In some embodiments, a protein enriched fraction with 42%-66% protein on a dry matter basis is collected. In some embodiments, a protein enriched fraction with approximately 50% protein on a dry matter basis is collected. In some embodiments, a fiber enriched fraction with 35%-70% neutral detergent fiber (NDF) on a dry matter basis is collected. In some embodiments, a fiber enriched fraction with 40%-50% NDF on a dry mater basis is collected.

Dewatering

Aspects of the present process further includes dewatering the protein enriched overflow stream using a decanting or disc-style centrifuge to recover a first protein enriched fraction including 40% to 60% protein on a dry weight basis. In certain embodiments, a first fraction of the separation includes 42% to 60% protein on a dry matter basis. In certain embodiments, first fraction of the separation includes 44% to 56% protein on a dry matter basis. In certain embodiments, the first fraction of the separation includes 46% to 50% protein on a dry matter basis.

In some embodiments, the process includes dewatering the protein enriched overflow stream using a decanting centrifuge. In some embodiments, the process includes dewatering the protein enriched overflow stream using a disc-style centrifuge. A non-limiting example of a disc-style centrifuge includes a disc-stack centrifuge.

In some embodiments, the process further includes dewatering the protein depleted underflow stream using a decanting centrifuge or a disc-style centrifuge to recover a second protein depleted fraction 12 to 34% protein on a dry weight basis. In certain embodiments, a second fraction of the separation is enriched in fiber and includes 20 to 28% protein on a dry matter basis. In certain embodiments, a second fraction of the separation is enriched in fiber and includes 20 to 34% protein on a dry matter basis. In certain embodiments, a second fraction of the separation is enriched in fiber and includes 20 to 26% protein on a dry matter basis. In certain embodiments, a second fraction of the separation is enriched in fiber and includes 20 to 25% protein on a dry matter basis. In certain embodiments, a second fraction of the separation is enriched in fiber and includes 23 to 24% protein on a dry matter basis. In certain embodiments, a second fraction of the separation is enriched in fiber and includes 25 to 28% protein on a dry matter basis. In certain embodiments, a second fraction of the separation is enriched in fiber and includes 28 to 34% protein on a dry matter basis. In certain embodiments, a second fraction of the separation is enriched in fiber and includes 28 to 32% protein on a dry matter basis. In certain embodiments, a second fraction of the separation is enriched in fiber and includes 28 to 34% protein on a dry matter basis. In certain embodiments, a second fraction of the separation is enriched in fiber and includes 32 to 34% protein on a dry matter basis. In certain embodiments, a second fraction of the separation is enriched in fiber and includes 28 to 34% protein on a dry matter basis.

Independent mechanical dewatering of the fiber enriched and protein enriched streams results in two products that can be marketed as differentiated products due to their different nutritional and digestible properties. In some embodiments, the two products are primarily differentiated on their protein and fiber content. In some embodiments, the fiber enriched material can be created with less than 27% protein and greater than 45% neutral detergent fiber. The high protein material can be created with greater than 40% protein and less than 35% neutral detergent fiber.

Aspects of the present process includes using a portion of the evaporator condensate to remove, as a suspension or solution, water soluble components and/or water insoluble components from a high fiber feed stream. In certain embodiments, removing the water-soluble components and/or the water insoluble components (e.g., having small particle sizes) produces an animal feed that is higher in fiber purity. In certain embodiments, the water-soluble components and/or the water insoluble components (e.g., having small particle sizes) removed from the high fiber feed stream are recycled into a next fermentation cycle.

In some embodiments, the water-soluble components and/or the water insoluble components (e.g., having small particle sizes) removed from the high fiber feed are moved into an oil recovery and high purity protein recovery process to produce additional fractions of oil and/or additional protein volume. In some embodiments, the fractions may be collected with a saleable oil.

By-Product of the Process

Aspects of the present disclosure includes a stillage clarification process that produces a by-product. In some embodiments, the fractions may be collected with a saleable oil as one of the fractions.

In some embodiments, one by-product is between one and seven- and one-half pounds per bushel on a dry matter basis of the first protein enriched fraction. In some embodiments, a first protein enriched fraction is enriched in protein and depleted in fiber. In some embodiments, of the first co-product produced as a result of the stillage fractionation process, there is between 1.0 (one) and 8.0 (eight) pounds per bushel. In some embodiments, there is between 2.0 (two) and 6.0 (six) pounds per bushel. In some embodiments, there is between 4 (four) and 5 (five) pounds per bushel. In some embodiments, there is between 1 (one) and 9 (nine) pounds per bushel. In some embodiments, there is between 1 (one) and 8.5 (eight and one half) pounds per bushel. In some embodiments, there is between 1 (one) and 7.5 (seven and one half) pounds per bushel.

In some embodiments, a second by-product is between two and nine pounds per bushel on a dry matter basis of the second protein depleted fraction. In some embodiments, a second fraction is depleted in protein and enriched in fiber. This product has the option of having a portion of between 0 and 100% of the condensed solubles added to the enriched fiber fraction. In some embodiments, the second by-product produced as a result of the stillage fractionation process, there is between 4 (four) and 9 (nine) pounds per bushel. In some embodiments, the second by-product produced as a result of the stillage fractionation process, there is between 5 (five) and 8 (eight) pounds per bushel. In some embodiments, the second by-product produced as a result of the stillage fractionation process, there is between 6 (six) and 7 (seven) pounds per bushel. In some embodiments, the second by-product produced as a result of the stillage fractionation process, there is between 1.5 (one and one half) and 10

(ten) pounds per bushel. In some embodiments, the second by-product produced as a result of the stillage fractionation process, there is between 1.5 (one and one and a half) and 9.5 (nine and one half) pounds per bushel. In some embodiments, the second by-product produced as a result of the stillage fractionation process, there is between 1 (one) and 10 (ten) pounds per bushel. In some embodiments, the second by-product produced as a result of the stillage fractionation process, there is between 2 (two) and 9 (nine) pounds per bushel. In some embodiments, the second by-product produced as a result of the stillage fractionation process, there is between 2 (two) and 8.5 (eight and one half) pounds per bushel.

In some embodiments a fraction, between 0 and 100%, of the first by-product enriched in protein can be mixed with the second, fiber enriched product to help absorb solubles addition or alter the nutrient quality of the fiber enriched product or manage plant sales inventory or as desired by plant operations.

In some embodiments a fraction, between 0 and 100%, of the second by-product enriched in fiber can be macerated as with an impact device or grinding device or a crushing device to better allow the fiber rich fraction to absorb solubles. Devices suitable to increase solubles uptake include, but are not limited to, disc mill, roller mill, impact mill, collider mill, pin mill, and the like.

In some embodiments, a third protein depleted fraction is greatly enriched in bio-oil and bio-oil degradation products. In some embodiments, the third protein depleted fraction is between 73% and 100% bio-oil and bio-oil degradation products. In some embodiments, the third protein depleted fraction is between 79% and 99% bio-oil and bio-oil degradation products. In some embodiments, the third protein depleted fraction is between 91% and 97% bio-oil and bio-oil degradation products. In some embodiments, this product is recovered during evaporative concentration of thin stillage.

According to some aspects of the present disclosure, the process further includes initially storing the stillage in a whole stillage tank.

Aspects of the present disclosure include a product produced according to the process of the present disclosure. In some embodiments, the product is produced from by-product of the clarification process.

Stillage Fractionation and/or Clarification System

Aspects of the present disclosure include a stillage fractionation system. The stillage fractionation system includes a grain ethanol plant producing stillage, one or more modified hydrocyclones each lacking a grit pot; and one or more decanting or disc-style centrifuges.

Aspects of the present disclosure include a stillage fractionation system. The stillage fractionation system includes a grain ethanol plant producing stillage, one or more modified hydrocyclones each lacking a grit pot; one or more screening devices with optional washing ability and one or more decanting or disc-style centrifuges.

In some embodiments, the centrifuge is a decanting centrifuge. In some embodiments, the centrifuge is a disc-like centrifuge.

In some embodiments, the system is configured to fractionate whole stillage into fractions. For example, the stillage can be split into fractions with mass and compositional assays per bushel of grain processed according to any of the aspects previously described above.

Figure 9:
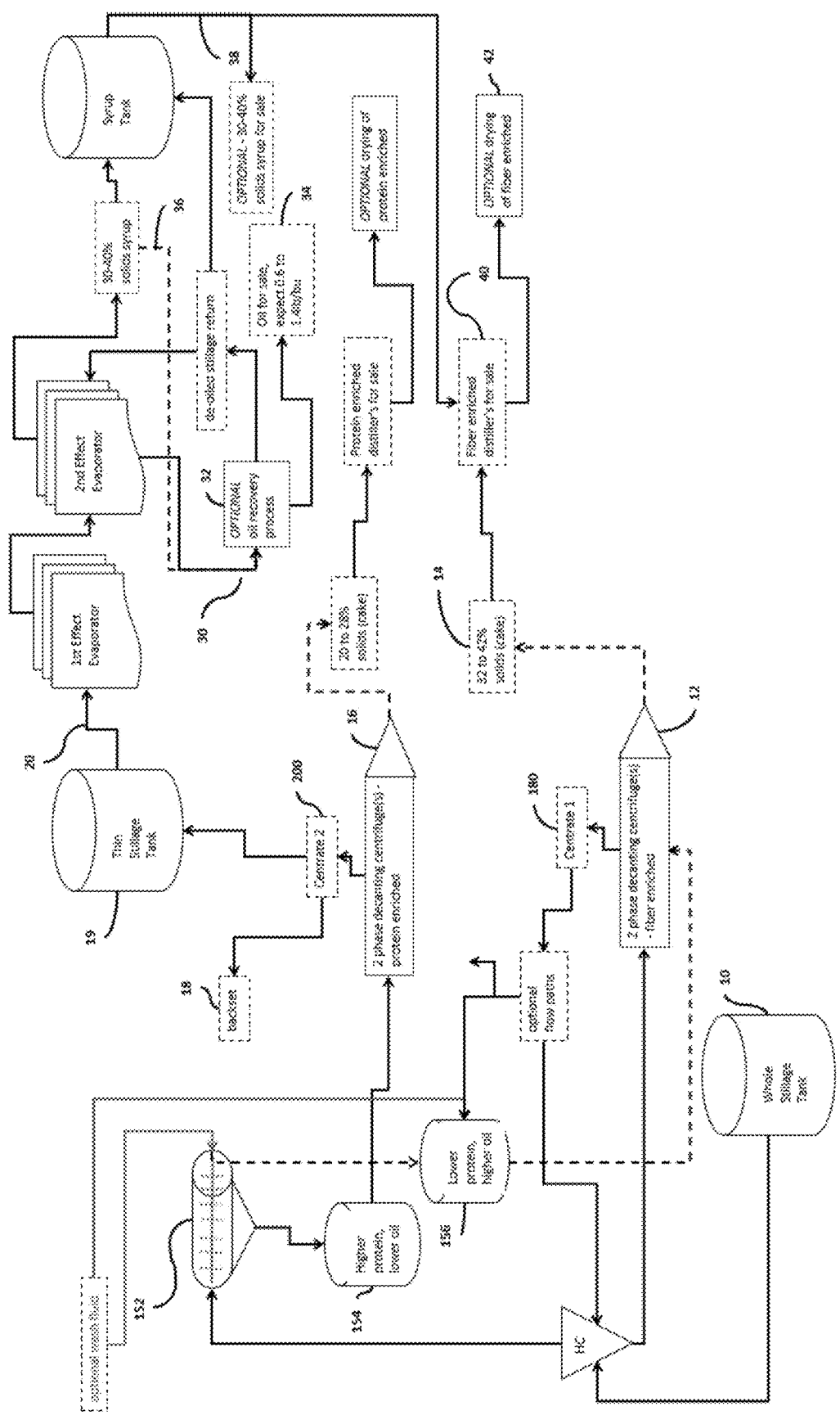
FIG. 9 shows a schematic view of an improved protein fraction system including a single hydrocyclone bank and an optional filtration device incorporated into an ethanol facility, according to some aspects of the present disclosure. It is understood that the present disclosure also includes a protein fraction system where the optional washing filtration device (152) depicted in FIG. 9 is not present.

A non-limiting example of a stillage fractionation and/or clarification system with a single hydrocyclone bank and paddle screening device is shown in FIG. 9. This non-limiting example system uses a single bank of hydrocyclone(s) to affect the separation of higher fiber particles from higher protein particles. Information that teaches the user to have the proper selection of hydrocyclone type, operational feed flow rate, feed pressure and OF to UF split ratios are shown in Examples 4, 8, 9, 10, 11, 12, 13, 14. Information that teaches the user for the proper selection of screen size and washing are shown in Examples 6 and 10.

In certain embodiments, the fractions include a first protein enriched fraction including 40% to 60% protein on a dry weight basis. In some embodiments, the fractions further include a second protein depleted fraction including 20 to 34% protein on a dry weight basis.

Figure 10A:
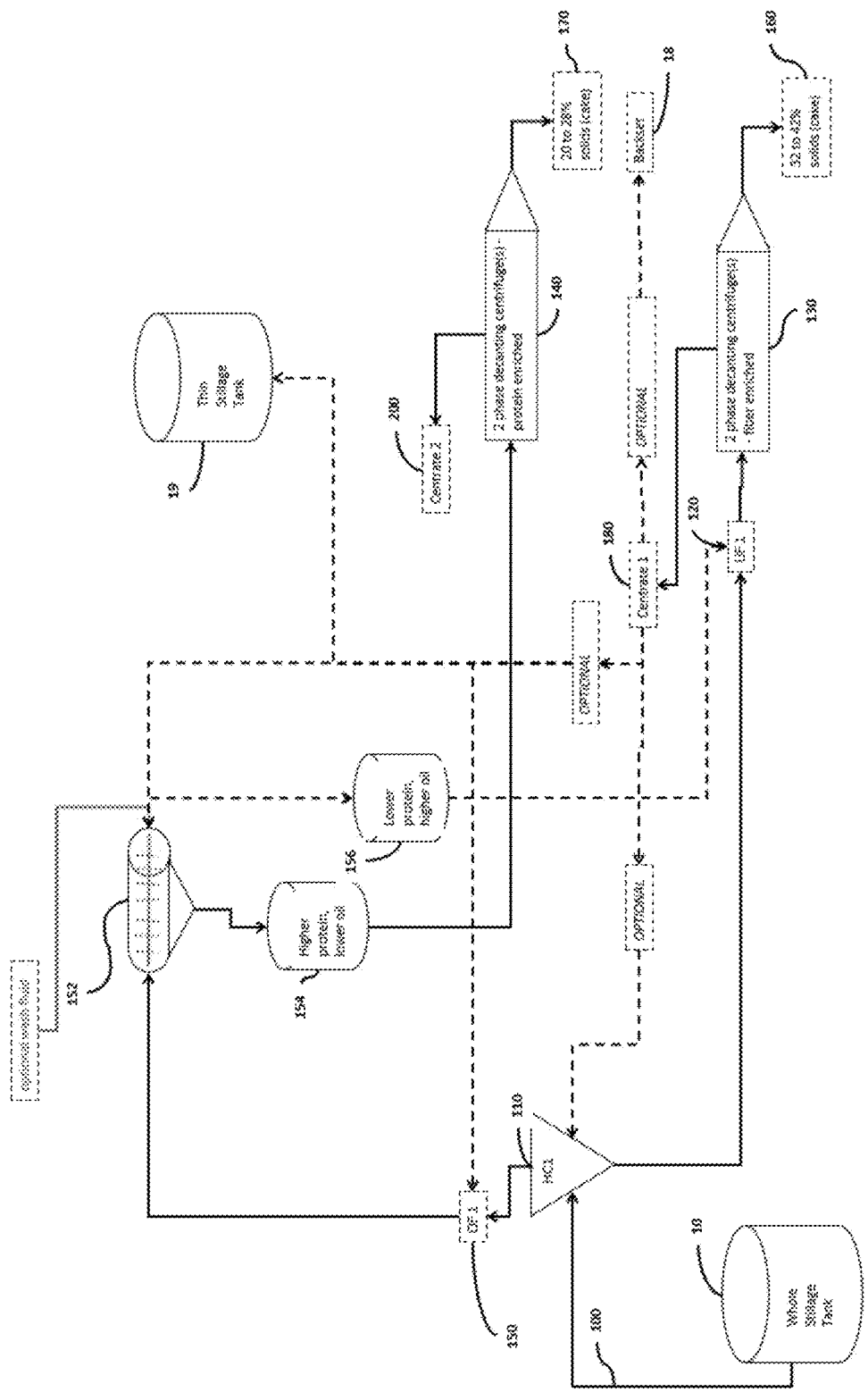
FIG. 10A shows a schematic view of a single hydrocyclone bank and filtration device with example recycle streams in an ethanol facility, according to some aspects of the present disclosure.

FIG. 10A shows a non-limiting example protein concentration system with a single hydrocyclone bank.

Figure 6:
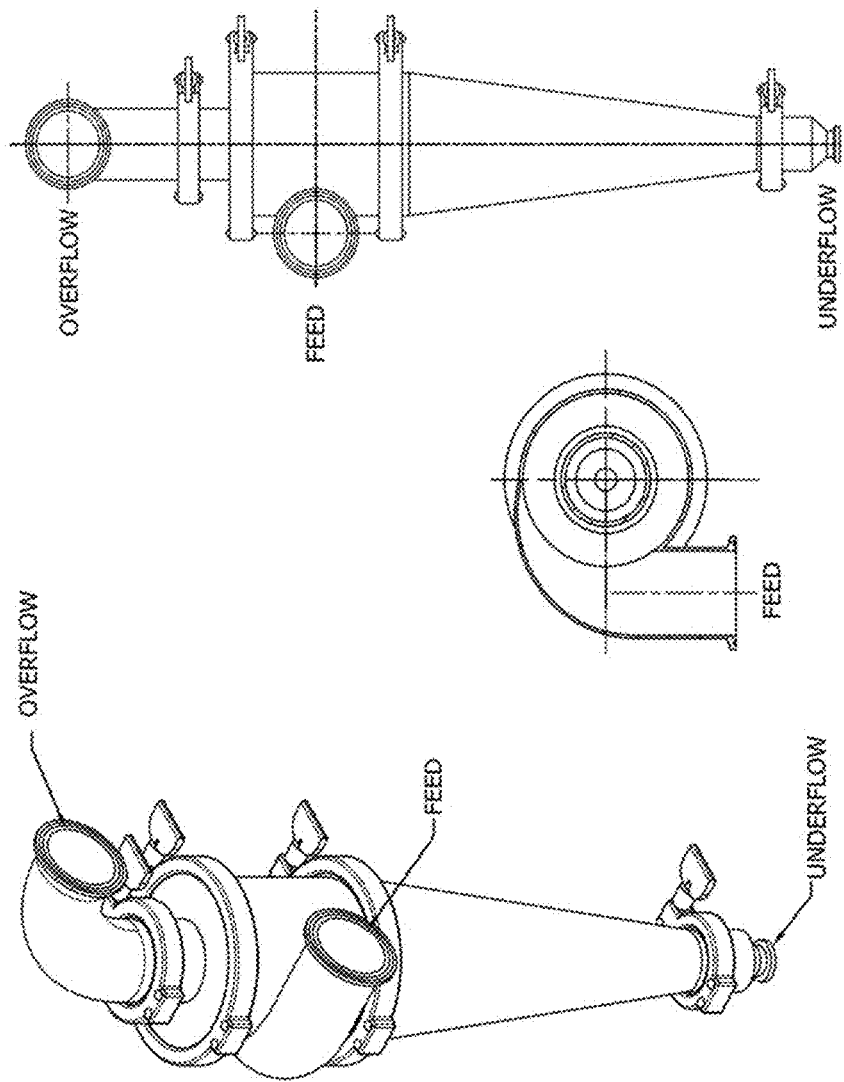
FIG. 6 shows a several views of a generic hydrocyclone without grit pot, according to some aspects of the present disclosure.
Figure 7A:
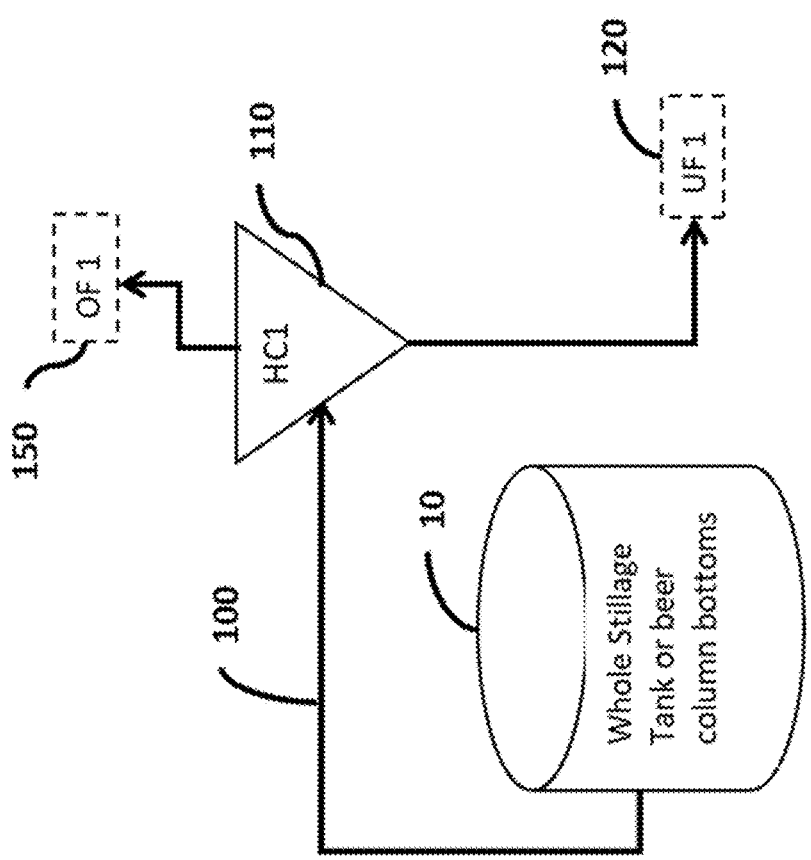
FIGS. 7A-7B show a simplified static density separation process and filter device, according to some aspects of the present disclosure.
Figure 7B:
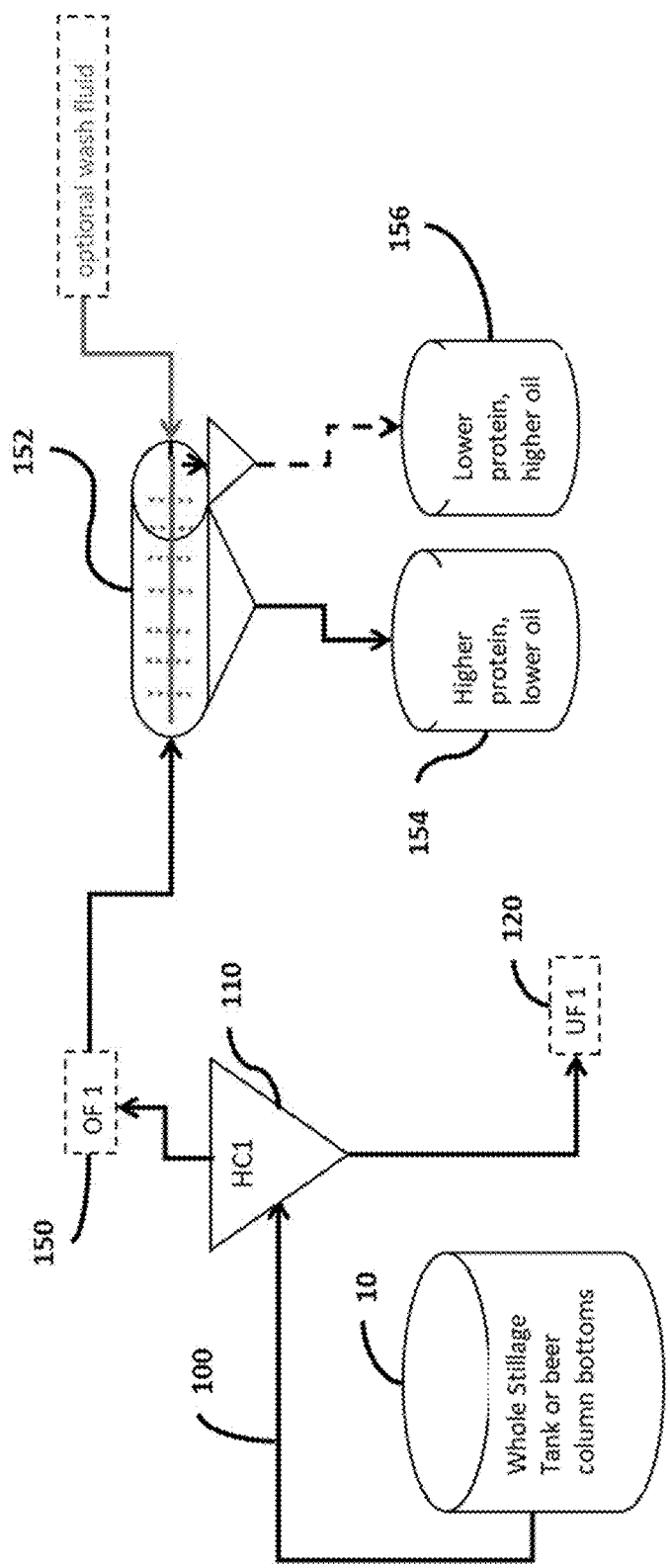

In some embodiments, the stillage fractionation and/or clarification system further includes a whole stillage storage tank. In the non-limiting example of FIG. 10A, whole stillage is stored in a whole stillage tank 10. Whole stillage feed 100 is processed through a hydrocyclone (or parallel hydrocyclone bank) 110, such as the exemplary hydrocyclone HC shown in FIG. 6. The hydrocyclone 110 is operated such that, in comparison to the whole stillage feed 100, the underflow 120 is depleted in water, water soluble components, protein, and oil, and enriched in fiber.

In some embodiments, the stillage fractionation and/or clarification system further includes an evaporator.

Figure 2:
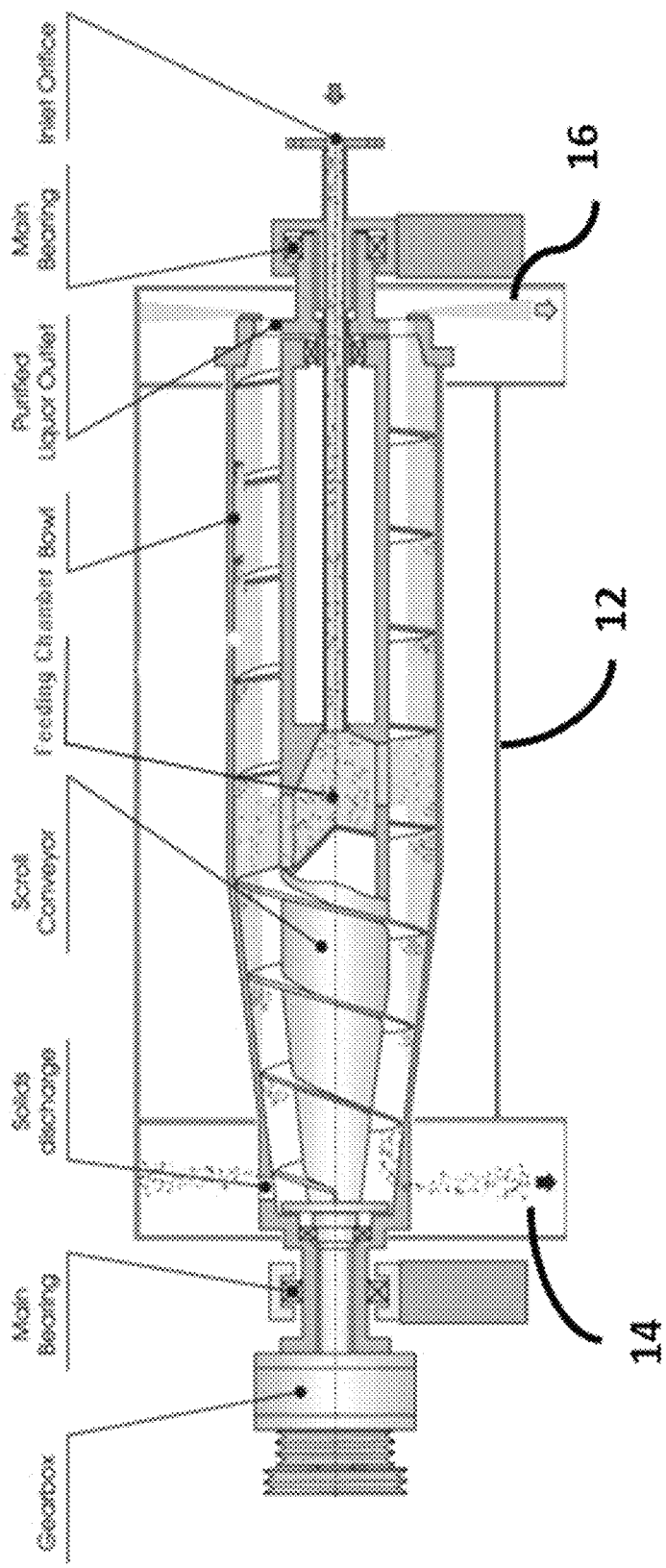
FIG. 2 shows a perspective view of a generic two-phase decanter type centrifuge, according to some aspects of the present disclosure.
Figure 3:
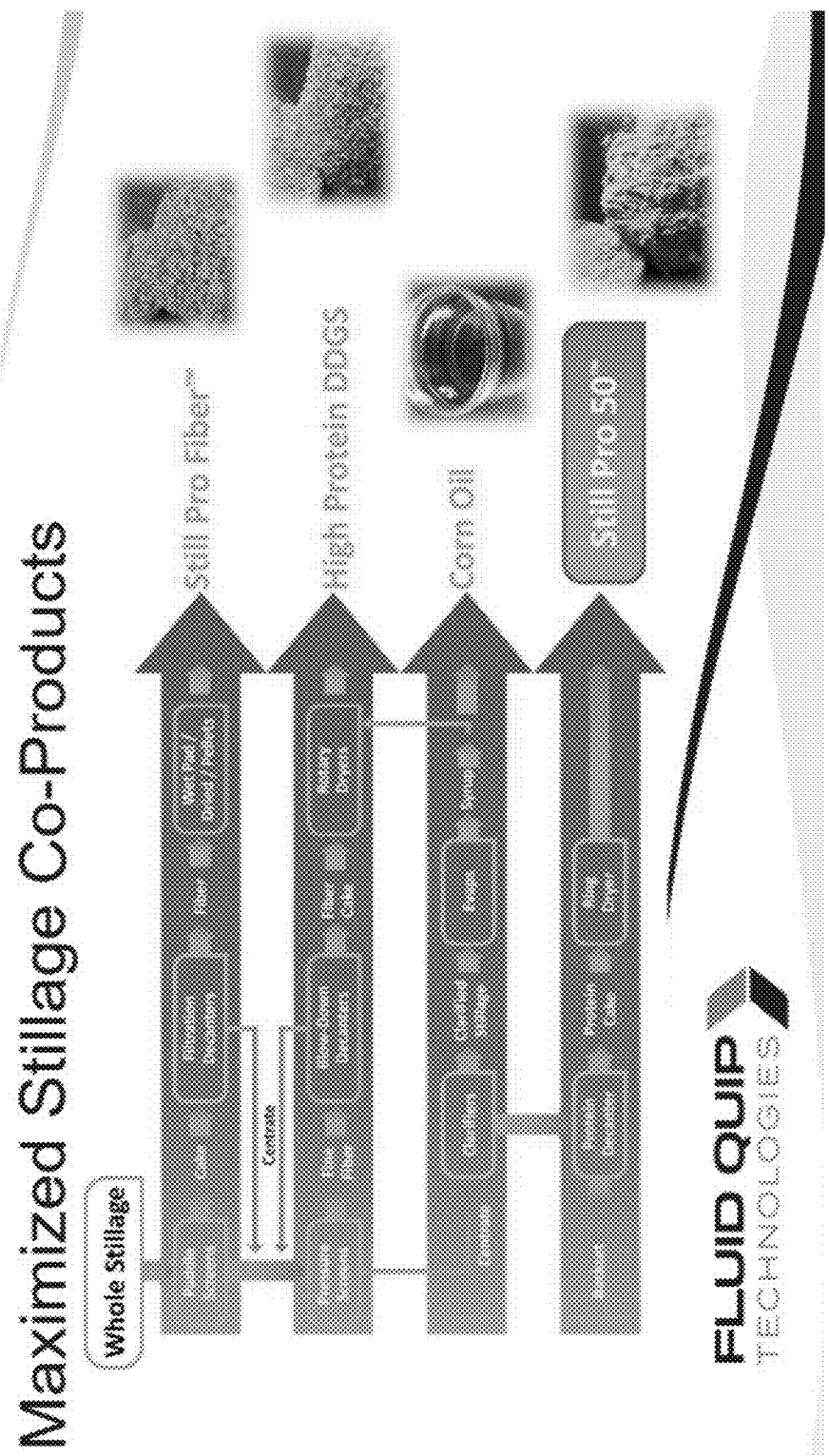
FIG. 3 shows a schematic view of a commercially offered distiller's fractionation process [FQT].
Figure 4:
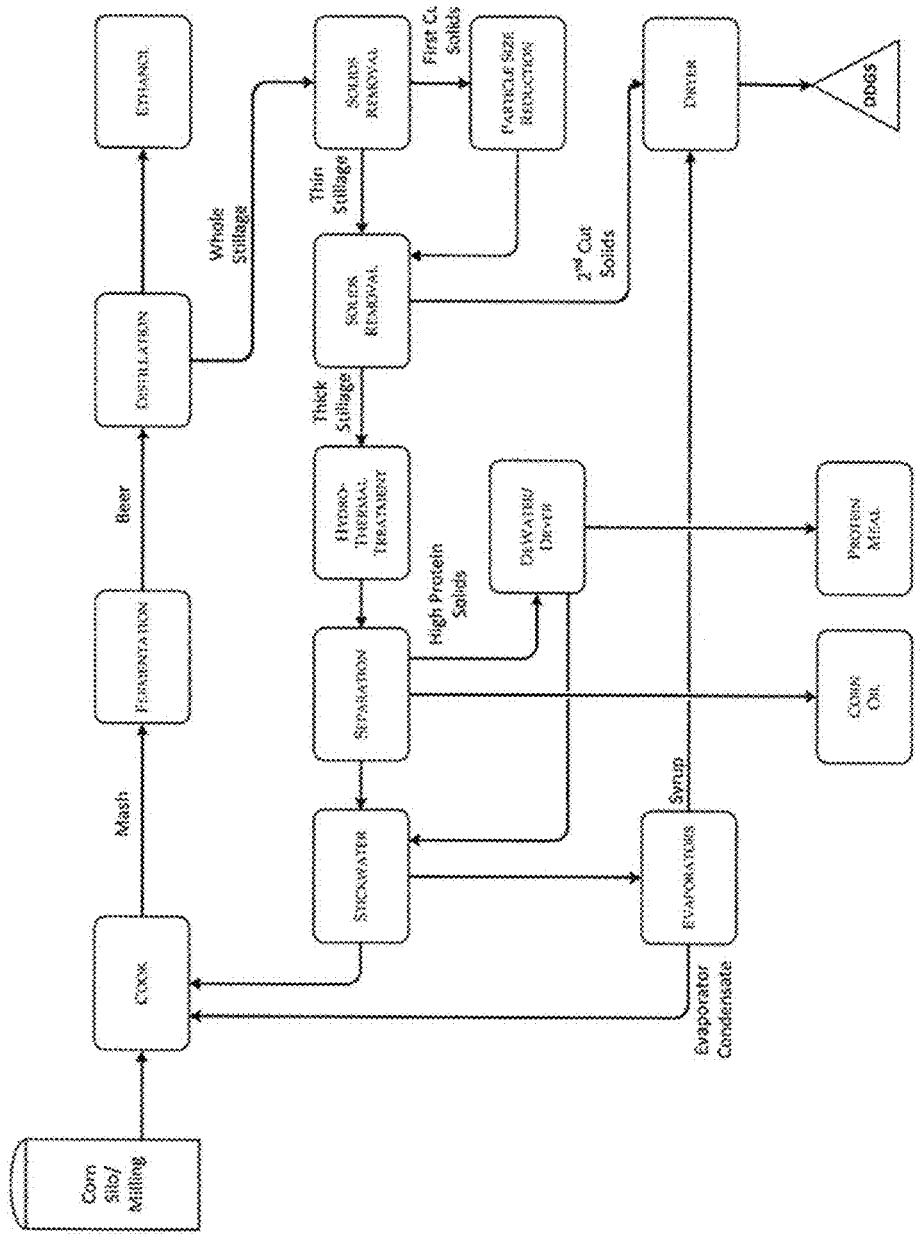
FIG. 4 shows a schematic view of a commercially offered distiller's fractionation process [Valicor].
Figure 5A:
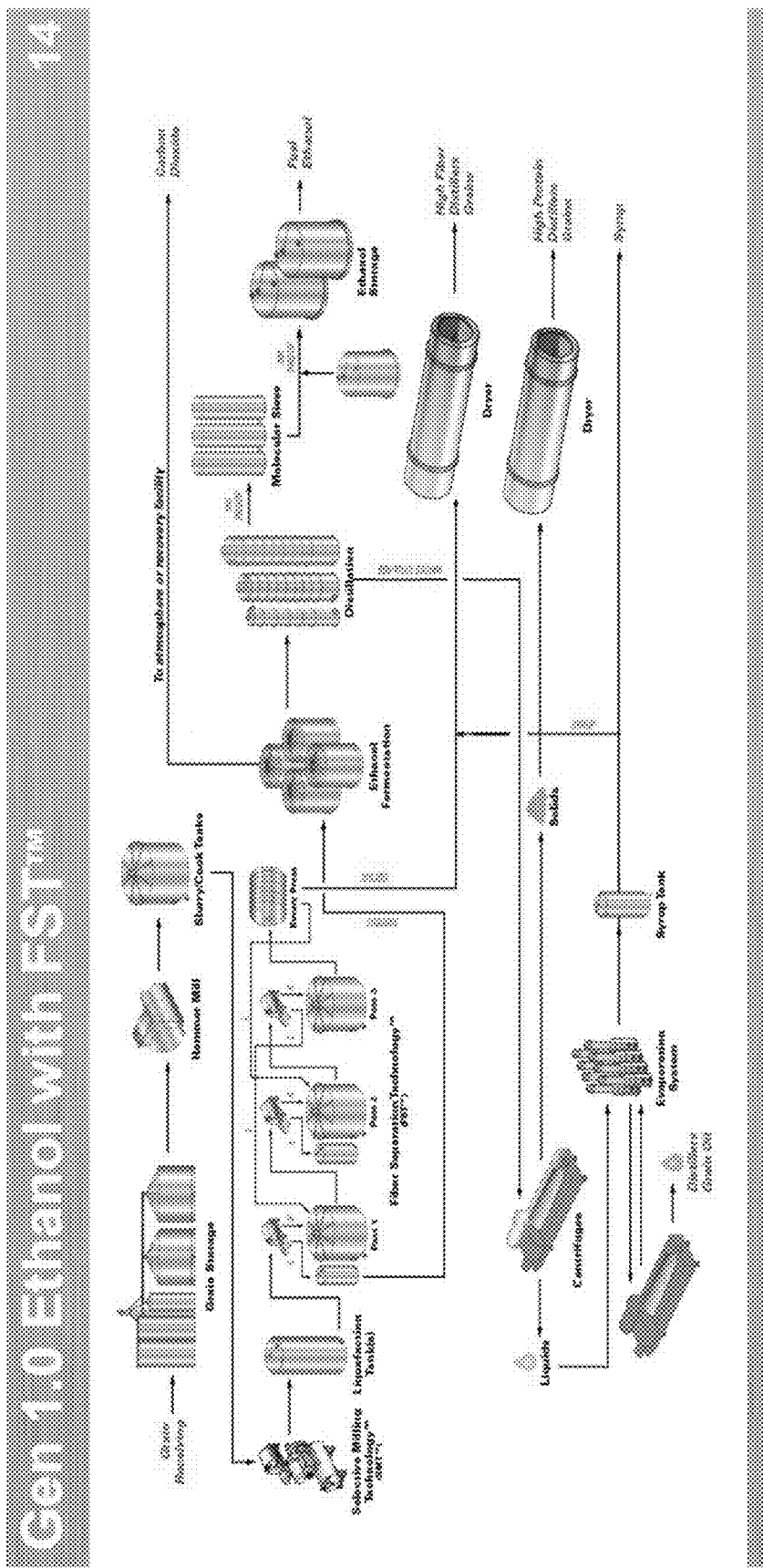
FIGS. 5A-5B show schematic views of a commercially offered distiller's fractionation [ICM].
Figure 5B:
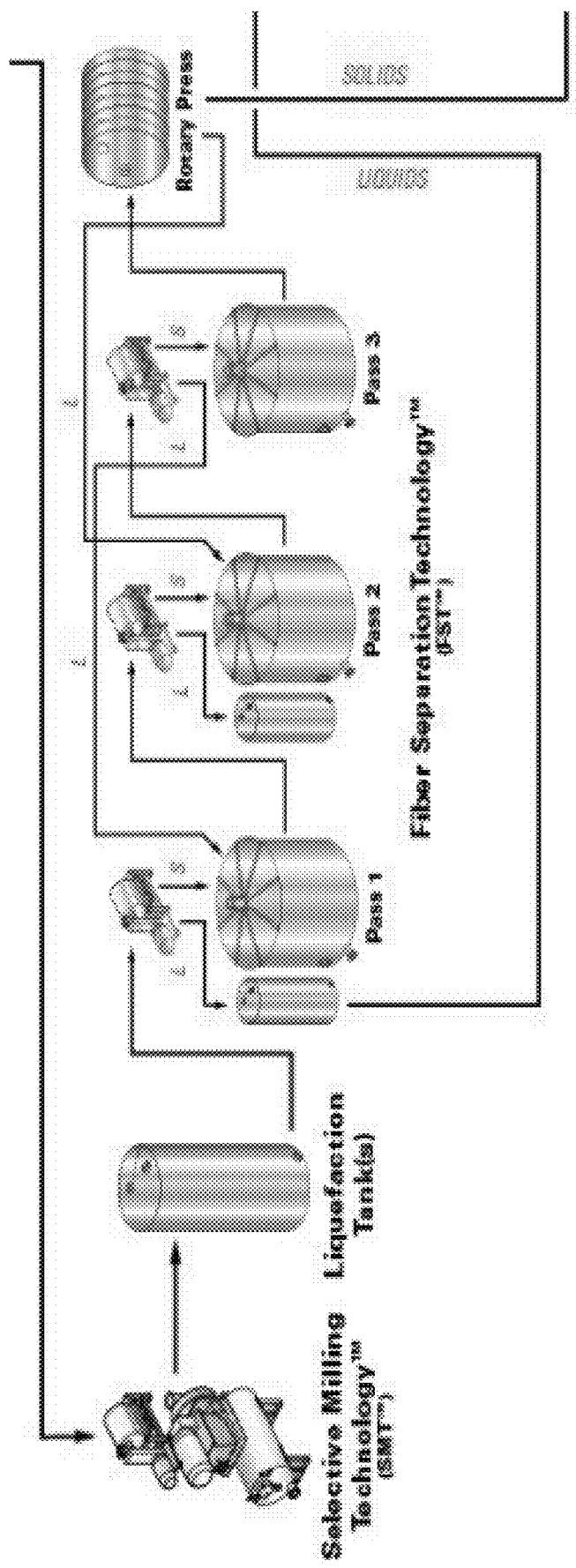

In some embodiments, the underflow 120 is fed to a dewatering device, such as an existing decanter or disc-style centrifuge, with or without internal modification, 130 for dewatering. In some embodiments, the first separation device 130 can comprise a decanting centrifuge, a disc-style centrifuge, a belt press, a screw press, a rotary vacuum drum filter, a paddle screen machine, a rotary press or other such commonly available dewatering devices. In certain embodiments, an existing two-phase decanting centrifuge (e.g., the example decanting centrifuge of FIG. 2) within the plant is repurposed, with or without internal modification, to conduct the dewatering process. In some embodiments, the dewatered concentrate can be sold as wet feed, transferred to further processing units, or dried to increase storage shelf life and reduce transportation costs. Because the hydraulic load from the underflow 120 is reduced in comparison to the whole stillage volume 100, fewer decanting centrifuges need to be used to effectively dewater the decanter flow than compared to a traditional whole stillage processing decanter. This reduction in decanter requirement can free up existing decanting centrifuges at the plant for different purpose, such as acting as a protein enriched separation device 140.

Figure 8:
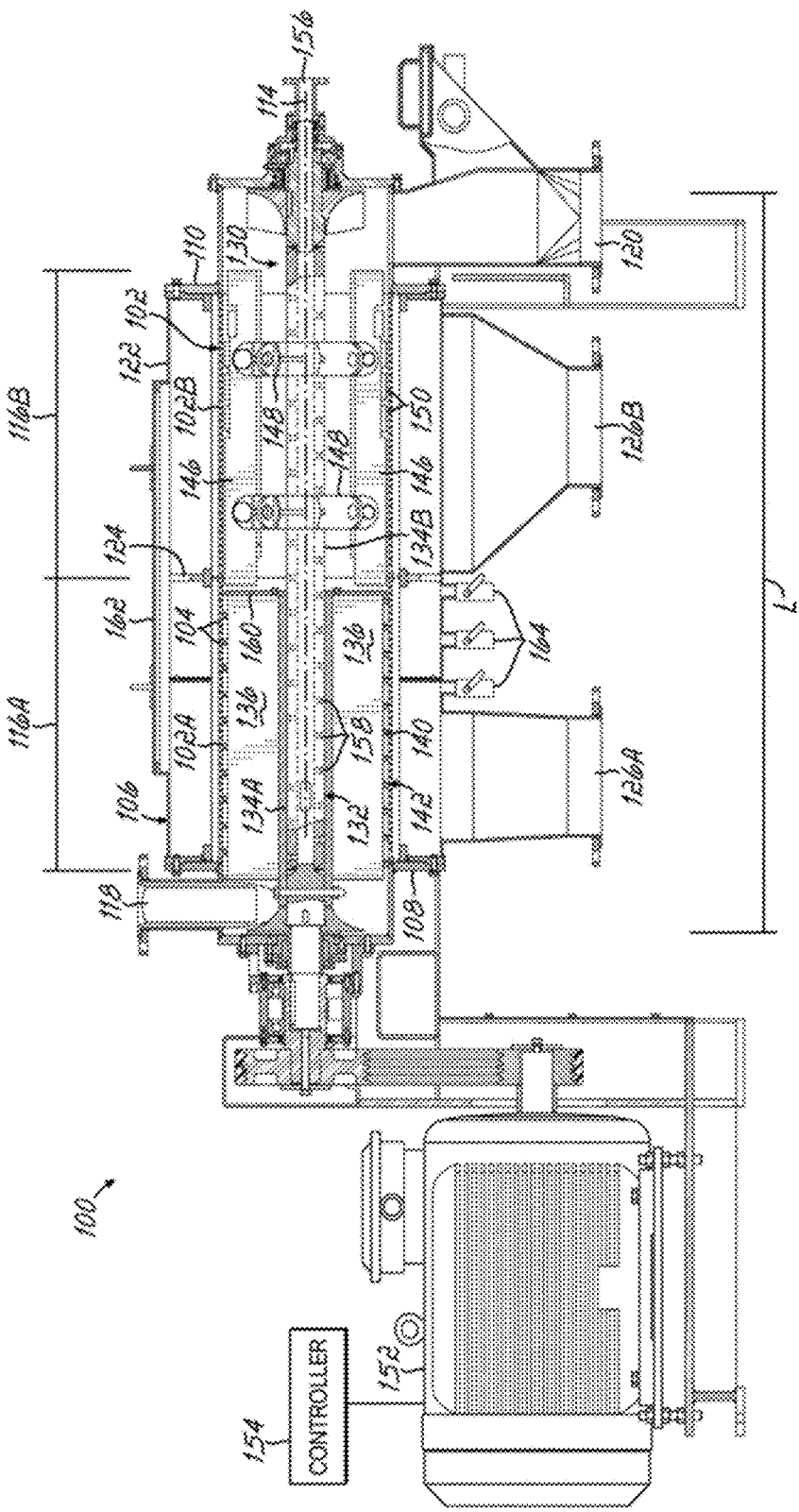
FIG. 8 shows an example of a filtration device for separating larger particles from smaller particles.

In some embodiments, the stillage fractionation and/or clarification system further includes a washing filtration system. In some embodiments, the washing filtration system is configured to filter, with washing of the filtered material, a protein enriched overflow stream of the one or more modified hydrocyclones to produce a clarified protein enriched overflow stream. In some embodiments, the overflow from the hydrocyclone bank, OF1, 150, is fed to a screening device, such as a washing paddle machine, a non-limiting example of which is shown in FIG. 8. In some embodiments, the screen size openings, opening shape, and screen geometry are selected to screen large particles from the flow which have higher fiber and oil content than the smaller particles. In some embodiments, the material containing the smaller particles that passes through the screen, 154, can be processed through existing decanting centrifuge at the plant with or without mechanical and operational modification, device 140.

Figure 10B:
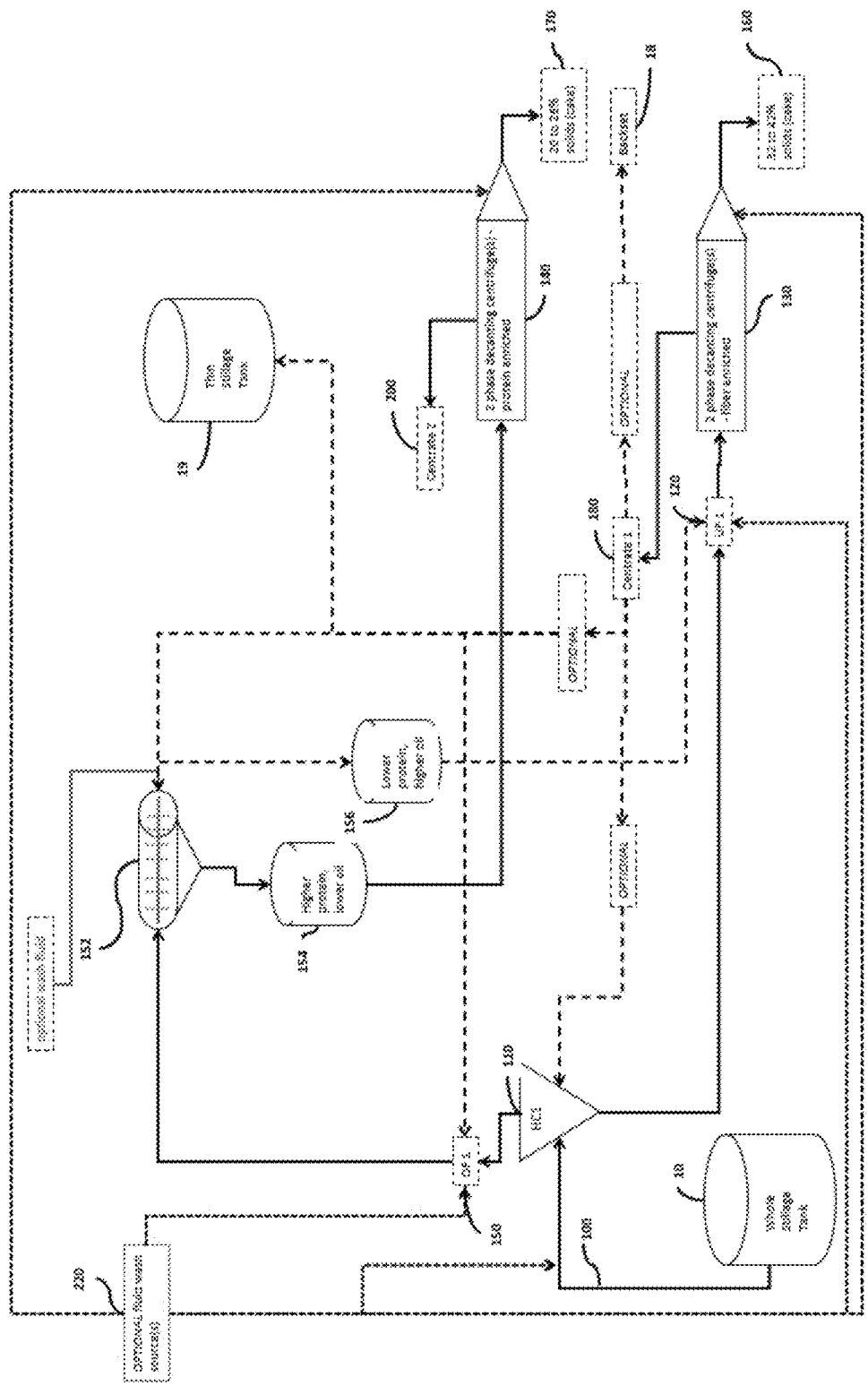
FIG. 10B shows a schematic view of a single hydrocyclone bank and filtration device with example recycle streams and wash fluid inputs in an ethanol facility, according to some aspects of the present disclosure.
Figure 10C:
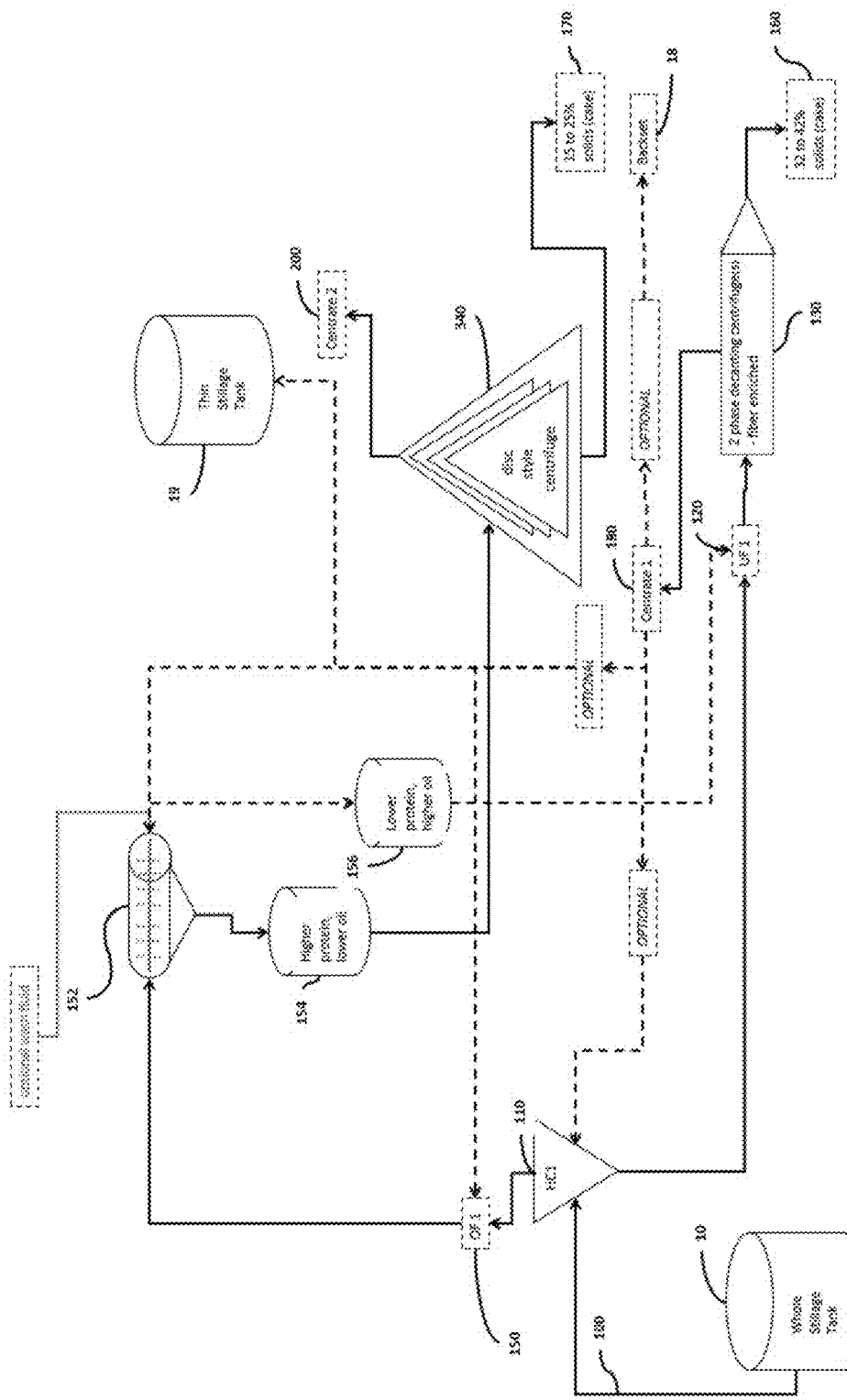
FIG. 10C shows a schematic view of a single hydrocyclone bank and filtration device with example recycle streams and wash fluid inputs in an ethanol facility, according to some aspects of the present disclosure.

Alternatively, in some embodiments, the material containing the smaller particles that passes through the screen, 154, can be processed through an existing disc-style centrifuge at the plant with or without mechanical and operational modification, device 340 (FIG. 10C). In some embodiments, the first protein fraction in the OF is used in combination with the washing filtration system to further enrich the high protein fraction in protein concentration and/or increase the yield of the high protein fraction. In some embodiments, this fraction can be processed with disc centrifuge(s) (340) for mechanical dewatering. In some embodiments, the first fraction (e.g., solid fraction) is recovered by the disc centrifuge(s). In some embodiments, the solid fraction recovered by the disc centrifuge is a first fraction including 40% to 60% protein on a dry weight basis.

In another embodiment, a high torque two-phase decanting centrifuge is used as the dewatering device 130 to increase dryness in the concentrate material from the underflow 120. In certain embodiments, this high torque machine can be created by making low-cost modifications to the existing decanter(s). The hydrocyclone 110 and screen device 152 have already removed many of the fine particles and much of the hydraulic flow from the feed prior to the first solid/liquid separation step, 130. In some embodiments, this removal provides a substantially lower flow volume to the decanting centrifuge while containing lower proportions of fine particles. Because smaller particle size protein and fiber materials have been transferred to the screened overflow 154, the suspended solids present in 120 are more easily dewatered and 160 can be effectively concentrated to 40+% dry matter basis. The resulting centrate in the overflow 180 has substantially lower liquid volume than centrate from a whole stillage dewatering process (see 16 in FIG. 1). In addition, the centrate in the overflow 180 has a reduced amount of fine particles than the traditional process (see 16 or 18 in FIG. 1) thus making for a cleaner backset material for optional use in the fermentation mash bill. In some embodiments, the 180 flow can be directed to evaporation where a lower viscosity evaporative syrup can be produced allowing for higher % dry solids syrup to be created at reducing the energy required for drying syrup and creating DDGS. In some embodiments, the overflow 180 from the separation device 130 can be (a) added to the overflow 150 as washing fluid or (b) added to the screen device 152 as washing fluid, (c) fed back to the hydrocyclone 110 as washing fluid (d) be recovered in subsequent fermentation rounds via backset 18, or (e) be processed at thin stillage 19 where the reduced solids allow the creation of higher dry solids concentration syrup. Solids concentrations of 50% or higher can be obtained in a standard ethanol plant evaporator.

In some embodiments, liquid overflow 150 from the hydrocyclone 110 carries large amounts of protein and reduced amounts of fiber components as well as oil containing particles. In some embodiments, the material is processed through screen 152 to preferentially remove oil containing particles and lower protein concentrated particles thereby making the feed to 154 to the protein recovery decanter 140 higher in protein purity and lower in fat. In some embodiments, the second separation device 140 can be, without limitation, a decanting centrifuge, a belt press, a screw press, a rotary vacuum drum filter, a paddle screen machine, a nozzle disc stack machine, a desludging disc stack machine, a disc decanter centrifuge, or a cross flow filtration membrane. In certain embodiments, an existing two-phase decanting centrifuge (e.g., the decanting centrifuge of FIG. 2 or the disc-style centrifuge of FIG. 10C) within the plant is repurposed to conduct the dewatering process, with or without internal modification. In some embodiments, the second separation device 140 or 340 is used to recover suspended solids with an elevated protein concentration and a lower fiber concentration compared to traditionally recovered decanter wet cake from whole stillage. In some embodiments, the centrate overflow 200 from the second dewatering device, 140 or 340, can be directed to the use in any proportion as any of the following: (a) backset, (b) thin stillage, (c) washing fluid, and/or (d) further processed to refine the flow for higher protein purity.

Optionally, wash fluids can be added into the system in order to further effect the purity of the fiber enriched product and/or the protein enriched product FIG. 10B. In some embodiments, wash fluids 220 can be derived from a variety of locations including, without limitation: thin stillage, backset, $CO_2$ scrubber bottoms, process evaporator condensate, methanator effluent, fresh feed water, separation device 130 centrate (180), separation device 140 (200) centrate, other fluid(s) available and/or any combination of these streams in any proportion.

In some embodiments, wash fluids can be added into the 150 flow. In some embodiments, an advantage of adding wash fluid here is moving additional soluble materials, fine particulates, oil and oil emulsions into the 154 stream. This will dilute the flow going to the protein recovery device 140 allowing these unwanted materials to wash out into the 200 flow avoiding dilution of the high purity protein product, 170.

In some embodiments, wash fluids can be added into the feed to the hydrocyclone bank, 110. One advantage of adding wash fluid here is moving additional larger amounts of protein rich particulates into the overflow stream, 150, thereby providing additional protein for screen 152 and final protein recovery device, 140, to recover. An additional advantage is the underflow, 120, is further depleted in soluble materials, fine protein particulates, oil and oil emulsions allowing for fiber recovery device, 130, to recover a cake, 160, that is further enriched in fiber.

In some embodiments, wash fluids can be added into the hydrocyclone bank underflow, 120, prior to entering separation device 130. An advantage of adding wash fluid here is moving additional amounts of soluble materials, fine protein particulates, oil and oil emulsions from the fiber enriched product. In certain embodiments, if some or all of the 180 stream is directed to the hydrocyclone bank 110 or the screening device 152 the wash fluid has the advantage of further washing the 100 flow creating a lower protein, higher fiber 120 flow while also moving more soluble materials, fine protein particulates, oil and oil emulsions into the 150 and/or 154 flows. This has the dual benefit of creating a higher fiber concentration product, 160, while also creating a higher protein product, 170.

Figure 11A:
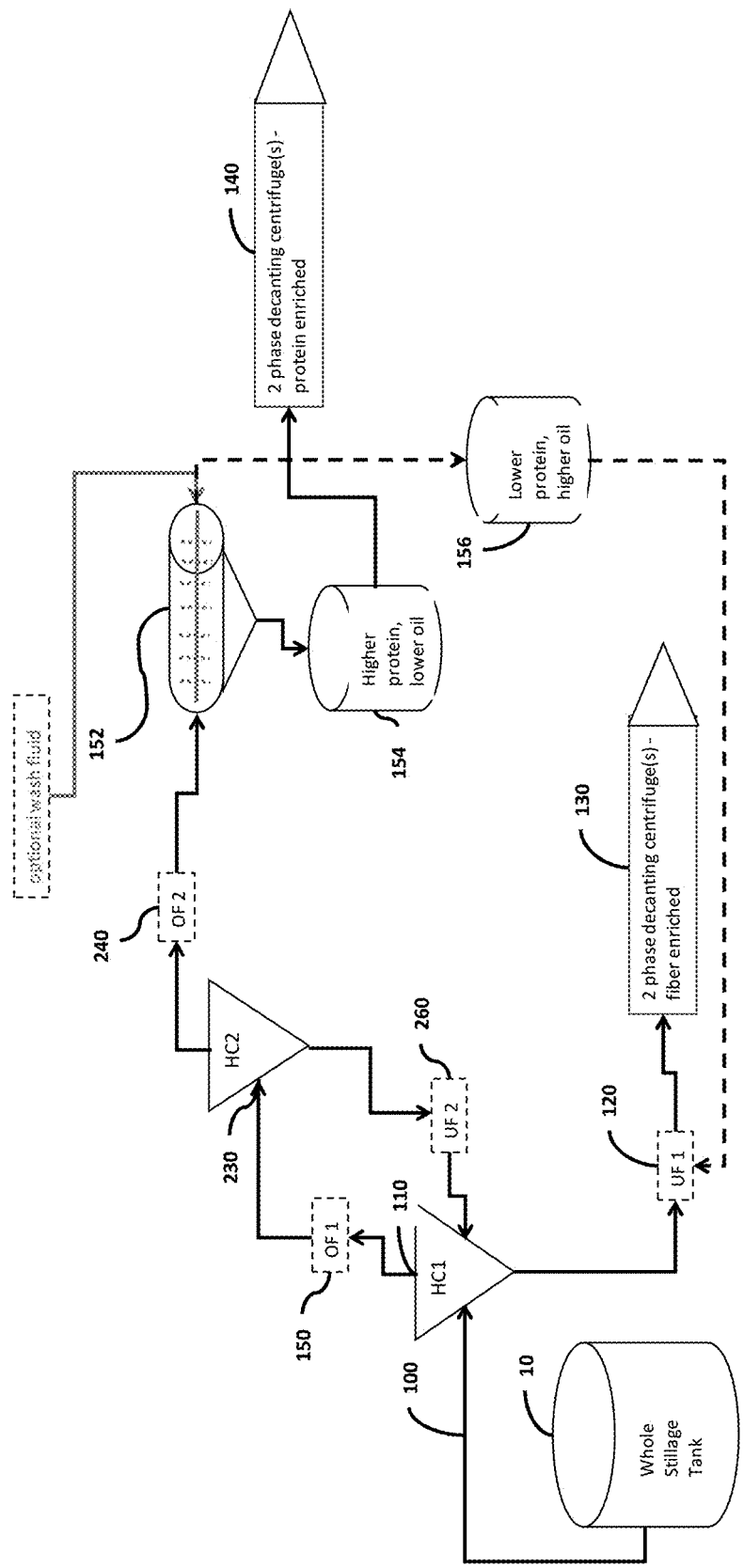
FIG. 11A shows an example schematic view of a stillage fractionation system with two cascading hydrocyclone banks and filtration device in an ethanol facility, according to some aspects of the present disclosure.

A non-limiting example stillage fractionation system with two cascading hydrocyclone banks and screen and is shown in FIG. 11A.

In some embodiments, the stillage fractionation and/or clarification system further includes a means for recycling water. A means for recycling water can include, for example, water recycled as washing fluid.

Figure 11B:
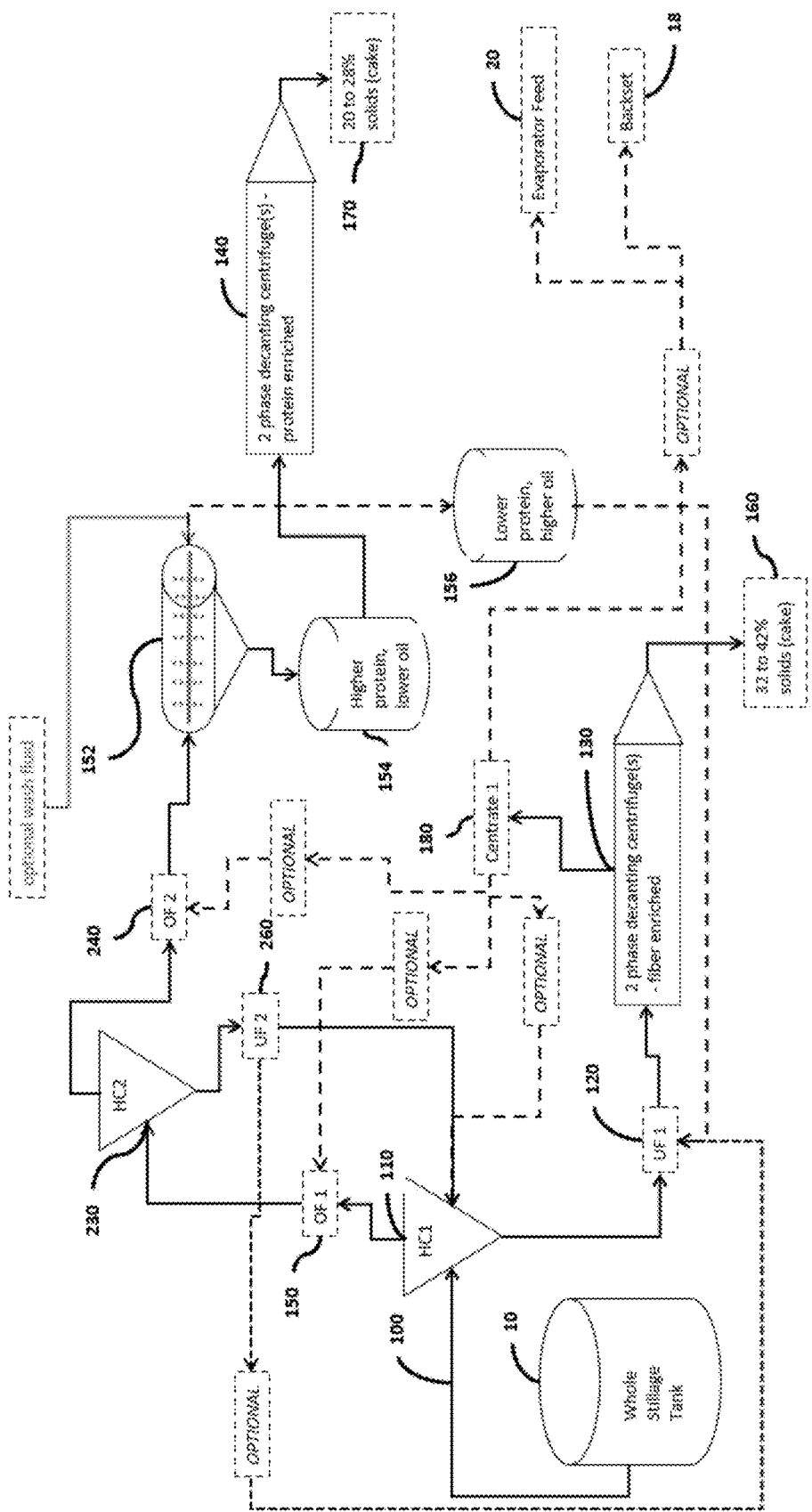
FIG. 11B shows an example schematic view of a stillage fractionation system with two cascading hydrocyclone banks and filtration device in an ethanol facility, according to some aspects of the present disclosure.

A protein concentration system with two cascading hydrocyclone banks and screen device and optional recycle streams is shown in FIG. 11B. In some embodiments, this process adds a second hydrocyclone bank, 230, to further process the OF1, 150. In some embodiments, the selection and operation of hydrocyclone bank 2, 230, is made in such a way to further deplete the flow to screening device 152 in fiber in order to make the protein enriched product higher in protein content, 170. In some embodiments, the UF2 flow, 260, carries an enriched fiber content compared to flow 150. In some embodiments, this fiber enriched flow, 260, can be directed to HC1, 110, where a second split opportunity is available to recover the fiber components into the 120 flow providing for a higher concentration of fiber in the enriched fiber fraction 160.

Optionally, the UF2 flow, 260, can be directed to the 120 flow where the 130 device can recover the additional fiber particles into product 160. Directing 260 to 120 has an advantage of thinning the 120 flow potentially aiding in the 130 unit operation.

In some embodiments, centrate 1, 180, from the enriched fiber recovery device, 130, can optionally be directed to OF2, 240, to increase the purity of the protein enriched product, 170. Addition of the HC2, 230, allows for protein concentrations in the protein enriched product, 170, to generally be about 2 to 10% higher in protein content, on a dry matter basis.

Centrate 1, 180, from the enriched fiber recovery device, 130, can optionally be directed to any or all of the following in any proportion desired:
1) 110 HC1 operation. Addition here will allow for a better wash where the fluid can flow cascade through unit 110, 152, 230 and 140.
2) 150 OF1 flow. Addition here will allow for counter-current fluid wash where the fluid can flow cascade through unit 230, 152, and 140. This addition location will by-pass 110 lowering the hydraulic load on 110.
3) 240 OF2 flow. Addition here will allow for wash fluid flowing through unit 152. This addition location will by-pass 110 and 230 lowering the hydraulic load on 110 and 230.
4) Backset 18 flow back to the front of the plant as makeup water for fermentation mash creation.
5) 152 as wash fluid. Addition here will allow for wash fluid to be used within a washing filtration device, such as, for example FIG. 8, and the teaching in U.S. Pat. No. 9,718,006 B2.

Figure 11C:
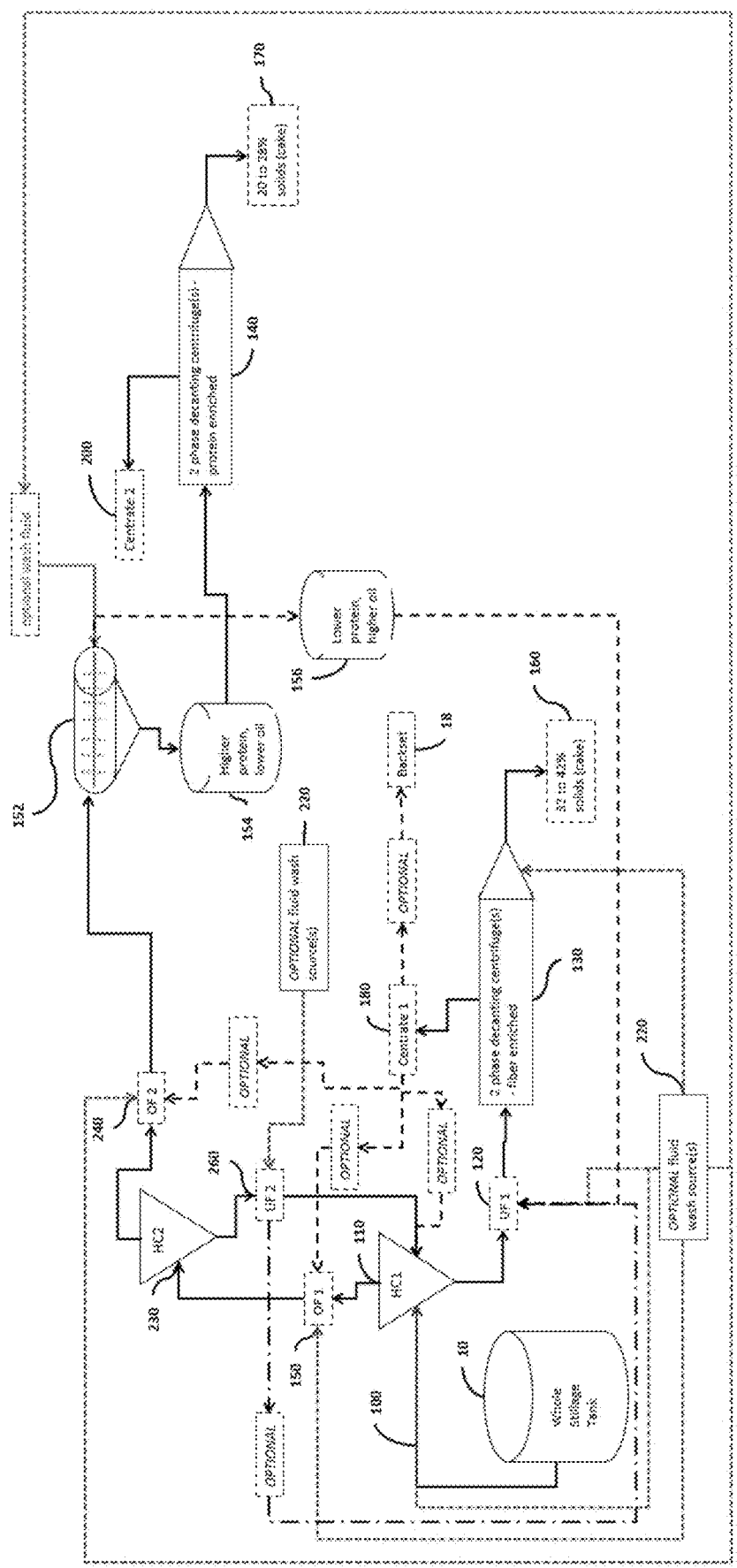
FIG. 11C shows an example schematic view of a stillage fractionation system with two cascading hydrocyclone banks and filtration device with optional wash fluids in an ethanol facility, according to some aspects of the present disclosure.

A stillage fractionation system with two cascading hydrocyclone banks with example optional recycle streams and example wash fluid 220 locations including, without limitation: thin stillage, backset, $CO_2$ scrubber bottoms, process evaporator condensate, methanator effluent, fresh feed water, separation device 130 centrate (180), separation device 140 (200) centrate, other fluid(s) available and/or any combination of these streams in any proportion is shown in FIG. 11C.

This process teaches the addition of wash fluid before separation operations in order to produce any or all of the following: 1) a higher concentration of fiber in the fiber product, 2) a higher protein concentration in the protein product, 3) a higher yield of protein in the protein product, 4) enhanced fluid flow properties for balancing the mechanical separation, 5) increased oil and oil emulsions entering centrate 1, 180, and/or centrate 2, 200.

In some embodiments, wash fluids can be added into the 150 flow. An advantage of adding wash fluid here is moving additional soluble materials, fine particulates, oil and oil emulsions that the protein recovery device 140 does not recover away from the protein concentrate, 170, making for a higher purity protein product. An additional advantage is the wash flow cascades through the HC2 unit, 230, allowing additional separation potential to recover additional fiber rich particles for direction to HC1, 110, via flow UF2, 260.

In some embodiments, wash fluids can be added into the hydrocyclone bank #1, 110. An advantage of adding wash fluid here is moving additional larger amounts of soluble materials, fine protein particulates, oil and oil emulsions into the overflow stream, 150, thereby providing additional protein for the screening device, 152, and protein recovery device, 140, to recover. An additional advantage is the underflow, 120, is further depleted in soluble materials, fine protein particulates, oil and oil emulsions allowing for fiber recovery device, 130, to recover a cake, 160, that is further enriched in fiber.

In some embodiments, wash fluids can be added into the hydrocyclone bank underflow, 120, prior to entering separation device 130. An advantage of adding wash fluid here is moving additional amounts of soluble materials, fine protein particulates, oil and oil emulsions from the fiber enriched product. Additionally, in certain embodiments, if some or all of the 180 stream is directed to the hydrocyclone bank 110 the wash fluid has the advantage of further washing the 100 flow creating a lower protein, higher fiber 120 flow while also moving more soluble materials, fine protein particulates, oil and oil emulsions into the 150 flow. This has the dual benefit of creating a higher fiber concentration product, 160, while also creating a higher protein product, 170.

In some embodiments, wash fluids can be added into the flow 240 prior to move additional protein laden fines into flow 154 where the fines can be recovered in separation device 140. Addition here has the advantage of increasing the removal of soluble materials, oil and oil emulsions from the protein enriched product, 170.

In some embodiments, wash fluids can be added into the UF2 flow, 260 prior to direction to the HC1, 110, separation device. Addition here has the advantage of increasing the removal of soluble materials, fine protein particulates, oil and oil emulsions from the UF1 flow, 120 enriching the 160 product in fiber. Additional advantage is the wash fluid cascades through HC2, 230, and filtration device 152 allowing for a second use of the wash fluid allowing for the removal of soluble materials, oil and oil emulsions from the protein enriched product, 170.

The addition of wash fluid to the various different locations can have the advantage of increasing the protein purity of the high protein fraction recovered 170, increasing the yield (mass per bushel grain processed) of the high protein fraction, increasing the fiber purity of the higher fiber fraction 160, and/or decreasing the oil content in the 170 fraction and increasing the quantity of oil recovered, FIG. 9, 34. It is understood that a variety of alternative washing steps and washing means (e.g., water injection points) may be incorporated into configurations of the subject stillage fractionation processes and systems of the present disclosure.

Figure 11D:
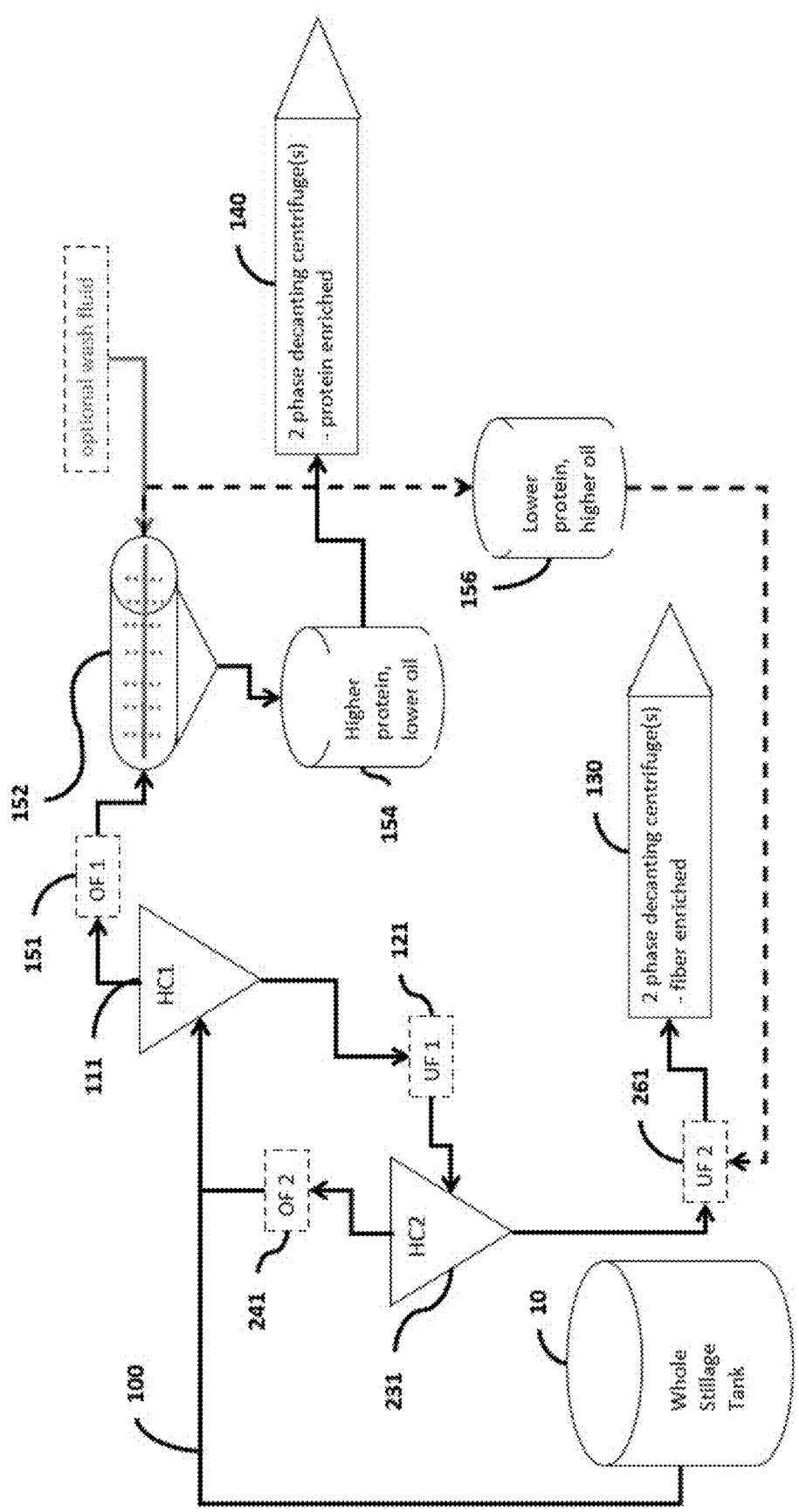
FIG. 11D shows an example schematic view of a stillage fractionation system with two cascading hydrocyclone banks and filtration device in an ethanol facility, according to some aspects of the present disclosure.

A non-limiting example protein concentration system with two cascading hydrocyclone banks and filtration device and is shown in FIG. 11D.

Figure 11E:
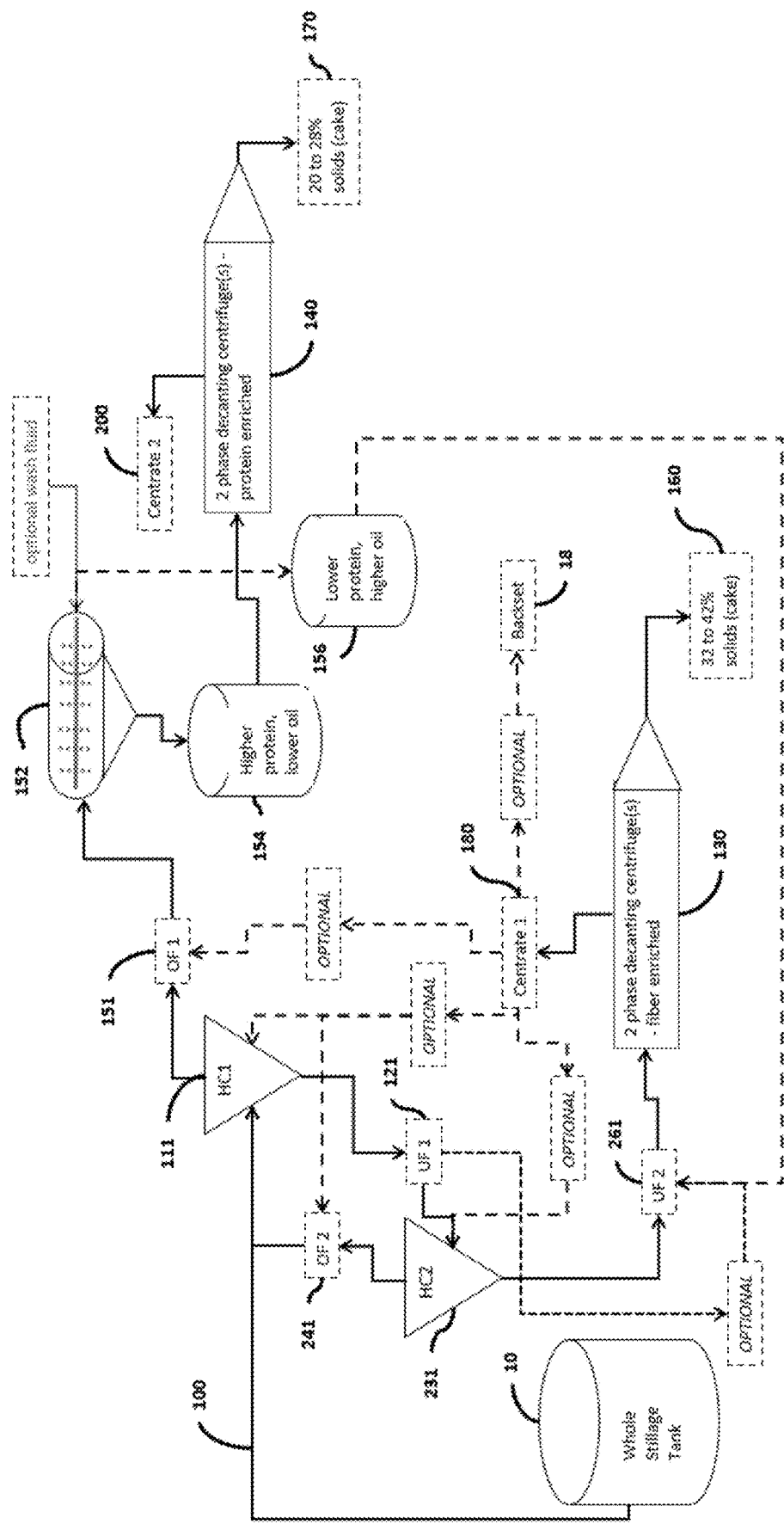
FIG. 11E shows an example schematic view of a stillage fractionation system with two cascading hydrocyclone banks and filtration device in an ethanol facility, according to some aspects of the present disclosure.

A protein concentration system with two cascading hydrocyclone banks and filtration device with optional recycle streams is shown in FIG. 11E. In some embodiments, this process adds a second hydrocyclone bank, 231, to further process the UF1, 121. In some embodiments, the selection and operation of hydrocyclone bank 2, 231, is made in such a way to further deplete the flow to separation device 130 in protein in order to make the fiber enriched product higher in fiber content, 160.

In some embodiments, the OF2 flow, 241, carries an enriched protein content compared to flow 121. In some embodiments, protein enriched flow, 241, can be directed to HC1, 111, where an additional separation opportunity is available to recover the higher protein components into the 151 flow providing for a higher concentration of protein to the filtration system 151 allowing for further enriched protein fraction 170 with lower oil content.

Optionally, the UF1 flow, 121, can be directed to the 261 flow where the 130 device can recover the additional fiber particles into product 160 producing an even higher fiber concentration cake. Directing 121 to 261 has an advantage of thinning the 261 flow potentially aiding in the 130 unit operation.

In some embodiments, Centrate 1, 180, from the enriched fiber recovery device, 130, can optionally be directed to OF1, 151 before the filter process 152, to increase the purity of the protein enriched product, 170. Addition of the HC2, 231, allows for protein concentrations in the protein enriched product, 170, to generally be 2 to 10% higher in protein content, on a dry matter basis.

In some embodiments, Centrate 1, 180, from the enriched fiber recovery device, 130, can optionally be directed to any or all of the following in any proportion desired:
1) 231 HC2 operation. Addition here will allow for a better counter-current fluid wash where the fluid can flow cascade through units 231, 111, 152 and 140.
2) 111 HC1 operation (add to 241). Addition here will allow for a better counter-current fluid wash where the fluid can flow cascade through unit 111, 152 and 140.
3) 151 OF1 flow. Addition here will allow for wash fluid flowing through units 152, and 140. This addition location will by-pass 111 and 231 lowering the hydraulic load on 111 and 231.
4) 152 as wash fluid. Addition here will allow for wash fluid to be used within a washing filtration device, such as, for example FIG. 8, and the teaching in U.S. Pat. No. 9,718,006 B2.
5) Backset 18 flow back to the front of the plant as makeup water for fermentation mash creation and allow further leaching of oil into the fermentation fluid from oil bearing particles.

Figure 11F:
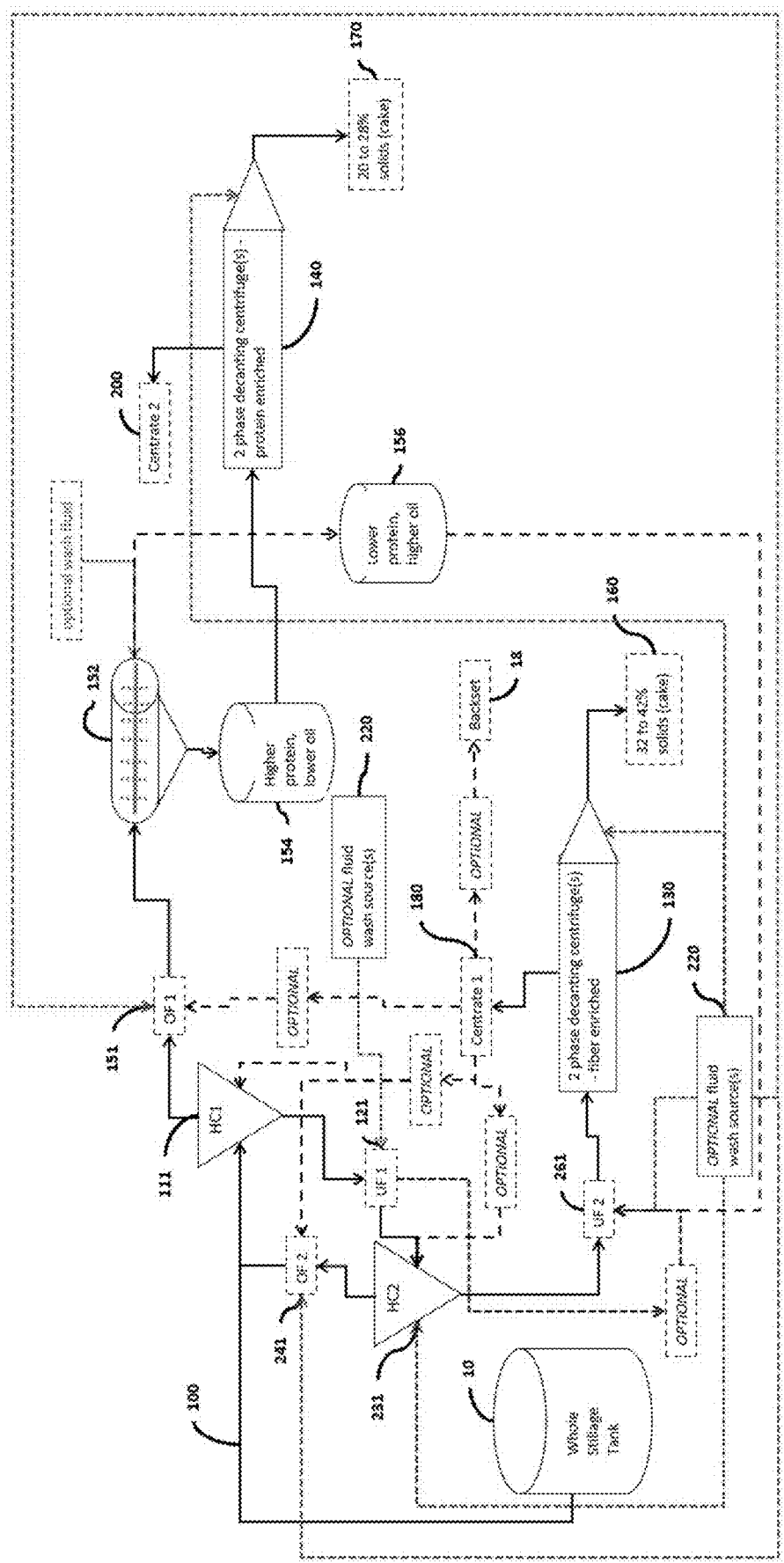
FIG. 11F shows an example schematic view of a stillage fractionation system with two cascading hydrocyclone banks and filtration device with optional wash fluids in an ethanol facility, according to some aspects of the present disclosure.

A protein concentration system with two cascading hydrocyclone banks with example optional recycle streams and example wash fluid 220 streams is shown in FIG. 11F. In some embodiments, wash fluids 220 can be derived from a variety of locations including, without limitation: thin stillage, backset, $CO_2$ scrubber bottoms, process evaporator condensate, methanator effluent, fresh feed water, separation device 130 centrate (180), separation device 140 (200) centrate, other fluid(s) available and/or any combination of these streams in any proportion.

In some embodiments, the process includes addition of a wash fluid before separation operations in order to produce any one or all of the following: 1) a higher concentration of fiber in the fiber-rich product, 2) a higher protein concentration in the protein-rich product, 3) enhanced fluid flow properties for balancing the mechanical separation, 4) increase protein yield (i.e. pounds of product per bushel grain) in the enriched protein fraction, and 5) increased oil and oil emulsions entering centrate 1, 180, and/or centrate 2, 200.

In some embodiments, the wash fluids can be added into the 241 flow. One advantage of adding wash fluid here is moving additional soluble materials, fine particulates, oil and oil emulsions that the protein recovery device 140 does not recover away from the protein concentrate, 170, making for a higher purity protein product. An additional advantage is the wash flow cascades through the HC1 unit, 111, allowing additional separation potential to recover additional fiber rich particles for direction to HC2, 231, via flow UF1, 121. An additional advantage is the wash flow cascades through the filtration unit, 152, removing more fines (i.e., fine particles) from the 156 flow recovering those fines into the 154 flow for recovery as increased protein concentration and volume through the protein recovery device, 140, increasing the purity and volume of 170.

In some embodiments, wash fluids can be added into the hydrocyclone bank #2, HC2, 231. One advantage of adding wash fluid here is moving additional amounts of soluble materials, fine protein particulates, oil and oil emulsions into the overflow stream, 241, thereby providing additional protein through 152 into 154 for the protein recovery device, 140, to recover. An additional advantage is the underflow, 261, is further depleted in soluble materials, fine protein particulates, oil and oil emulsions allowing for fiber recovery device, 130, to recover a cake, 160, that is further enriched in fiber.

In some embodiments, wash fluids can be added into the hydrocyclone bank underflow, 261, prior to entering separation device 130. One advantage of adding wash fluid here is moving additional amounts of soluble materials, fine protein particulates, oil and oil emulsions from the fiber enriched product. Additionally, if some or all of the 180 stream is directed to the hydrocyclone bank 111 the wash fluid has the advantage of further washing the 100 flow creating a lower protein, higher fiber 121 flow while also moving more soluble materials, fine protein particulates, oil and oil emulsions into the 151 flow. This has the dual benefit of creating a higher fiber concentration product, 160, while also creating a higher protein product, 170.

In some embodiments, wash fluids can be added into the flow 151 prior to processing through 152 increasing the protein suspended particles in 154 passing to separation device 140. This has the advantage of increasing both the protein concentration and protein yield per bushel in the 170 product.

In some embodiments, wash fluids can be added into the washing mechanism in device 152. This has the advantage of increasing both the protein concentration and protein yield per bushel in the 170 product.

In some embodiments, wash fluids can be added into the UF1 flow, 121 prior to direction to the HC2, 231, separation device. Addition here has the advantage of increasing the removal of soluble materials, fine protein particulates, oil and oil emulsions from the UF2 flow, 261 enriching the 160 product in fiber. An additional advantage is the wash fluid cascades through HC1, 111, allowing for a second use of the wash fluid in 152 allowing for the removal fine particles from material directed to 156 as well are removing more soluble materials, oil and oil emulsions from the protein enriched product, 170 through dilution and removal of these materials into the 200 stream.

Figure 12:
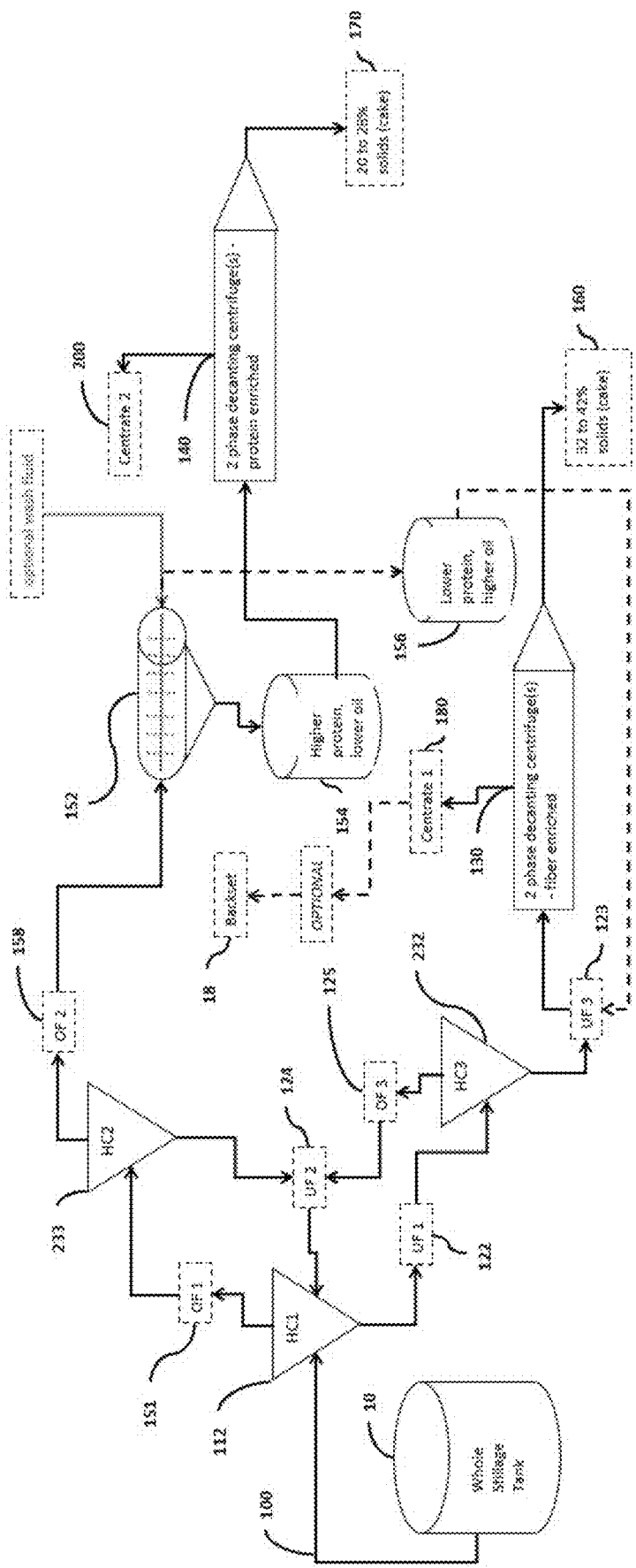
FIG. 12 shows an example schematic view of a stillage fractionation system with three cascading hydrocyclone banks and filtration device in an ethanol facility, according to some aspects of the present disclosure.

A non-limiting example stillage fractionation system with three cascading hydrocyclone banks and is shown in FIG. 12. HC1, 112, acts as the primary cut where protein enriched fluid is directed to the OF1, 151, and fiber enriched fluid is directed to the UF1, 122. In certain embodiments, HC2, 233, acts as the quality protein cut removing as much fiber as desired from the OF2, 158, flow allowing for higher purity protein capture than a single hydrocyclone split. In certain embodiments, HC3, 232, acts as the quality fiber cut removing as much protein as desired from UF3, 123, flow allowing for higher purity fiber capture than a single hydrocyclone split. Optional recycle loops and wash fluid applications can be applied similar to one and two HC processing systems with the same general scientific principles and outcomes.

A stillage fractionation system with three cascading hydrocyclone banks and optional recycle streams is shown in FIG. 12. In some embodiments, this process adds a second hydrocyclone bank, 233, to further process the OF1, 152 and a third hydrocyclone bank, 232, to further process the UF1, 122 flow.

The selection and operation of hydrocyclone bank 2, 233, is made in such a way to further deplete the flow to separation device 140 in fiber in order to make the protein enriched product higher in protein content, 170. In some embodiments, the UF2 flow, 124, carries an enriched fiber content compared to flow 158. This fiber enriched flow, 124, can be directed to HC1, 112, where a second split opportunity is available to recover the fiber components into the 122 flow providing for a higher concentration of fiber in the enriched fiber fraction 160.

In some embodiments, the selection and operation of hydrocyclone bank 3, 232, is made in such a way to further deplete the flow to separation device 130 in protein in order to make the fiber enriched product higher in fiber content, 160. The OF3 flow, 125, carries an enriched protein content compared to flow 122. This protein enriched flow, 125, can be directed to HC1, 112, where a second split opportunity is available to recover the protein components into the 158 flow providing for a higher concentration of protein in the enriched protein fraction 170.

Optionally, the UF2 flow, 124, can be directed to the 122 flow where the HC3, 232, can recover the additional fiber particles into flow UF3, 123, where device 130 can recover product 160 producing an even higher fiber concentration 160 cake. Directing 124 to 122 has an advantage of cascading the flow through devices 232 and 130 thereby getting better recovery. Directing 124 to 122 has a second advantage of reducing the hydraulic load on 112.

Optionally, the UF2 flow, 124, can be directed to the 123 flow where the 130 device can recover the additional fiber particles into produce 160 producing even higher fiber concentration cake. Directing 124 to 123 has an advantage of thinning the 123 flow potentially aiding in the 130 unit operation. Directing 124 to 122 has a second advantage of reducing the hydraulic load on devices 112 and 232.

In some embodiments, the selection and operation of hydrocyclone bank 3, 232, is made in such a way to further deplete the flow to separation device 130 in protein in order to make the fiber enriched product higher in fiber content, 160. The OF3 flow, 125, carries an enriched protein content compared to flow 122. In some embodiments, this protein enriched flow, 125, can be directed to HC1, 112, where a second split opportunity is available to recover the protein components into the 158 flow providing for a higher concentration of protein in the enriched protein fraction 170.

Optionally, the OF3 flow, 125, can be directed to the 151 flow where the HC2, 233, can recover the additional protein particles into flow OF2, 158, where device 152 and 140 can recover product 170 producing an even higher protein concentration 170 cake. Directing 125 to 151 has an advantage of cascading the fluid through 233 and device 152 and 140 allowing for more efficient use of recycle water in the production of higher purity protein product, 170.

Optionally, the OF3 flow, 125, can be directed to the 158 flow where device 152 and 140, can recover the additional protein particles into the flow feeding device 140. Directing the flow here has the benefit of reducing the hydraulic load on unit 233 while allowing higher purity protein product, 170, to be recovered from device 140 while producing higher fiber product from device 130, cake 160.

Centrate 1, 180, from the enriched fiber recovery device, 130, can optionally be directed to OF1, 151, to increase the purity of the protein enriched product, 170. Addition of the HC2, 233, allows for protein concentrations in the protein enriched product, 170, to generally be 2 to 10% higher in protein content, on a dry matter basis.

Centrate 1, 180, from the enriched fiber recovery device, 130, can optionally be directed to any or all of the following in any proportion desired:

1) 112 HC1 operation. Addition here will allow for a better counter-current fluid wash where the fluid can flow cascade through unit 112, 233, 152 and 140.
2) 151 OF1 flow. Addition here will allow for counter-current fluid wash where the fluid can flow cascade through unit 233, 152, and 140. This addition location will by-pass 112 so as to not increase the hydraulic load on 112.
3) 158 OF2 flow. Addition here will allow for wash fluid flowing through unit 152 and 140. This addition location will by-pass 112 and 233 so as to not increase the hydraulic load on 112 and 233.
4) 124 UF2 flow. Addition here will allow for counter-current fluid wash where the fluid can flow cascade through unit 112, 233, 152, and 140 when UF2 flow, 124, is directed for 112. When UF2 flow, 124, is directed to UF1, 122 or UF3, 123 the benefit is better washing of the fiber cake, 160, by moving more protein into the 125 and/or 180 flow streams.
5) 122 UF1 flow. Addition here will allow for counter-current fluid wash where the fluid can flow cascade through unit 232, and 130 the benefit is better washing of the fiber cake, 160, by moving more protein into the 125 and/or 180 flow streams. An additional benefit is the hydraulic load on 112 is not increased.
6) 123 UF3 flow. Addition here will allow for wash fluid to reduce the solids content going to unit 130. This will reduce the pumping difficulty of the high fiber product to device 130. This fluid will produce a better recovery of higher fiber content fiber cake, 160, by moving more protein into the 180 flow stream. Additional benefit is the hydraulic load on 112 and 232 is not increased.
7) 152 washing screening device. Addition here will allow for counter current washing of material over the screen barrier. This will remove additional protein rich suspended solids which 140 can recover as additional yield (pounds per bushel) and purity of 170.
8) Backset 18 flow back to the front of the plant as makeup water for fermentation mash creation.

In some embodiments, the stillage fractionation system has three cascading hydrocyclone banks with optional recycle streams and means for washing, e.g., as depicted in the example wash fluid streams of FIG. 12 and FIG. 10B, 220. Wash fluids (e.g., 220) can be derived from a variety of locations including, without limitation: thin stillage, backset, $CO_2$ scrubber bottoms, process evaporator condensate, methanator effluent, fresh feed water, separation device 130 centrate (180), separation device 140 (200) centrate, other fluid(s) available and/or any combination of these streams in any proportion. Addition of wash fluids generally serves to move fine proteins, soluble components, oil, and oil emulsions from the fiber stream resulting in a fiber cake, 160 of higher purity. Addition of wash fluids also generally serve to move fiber particles, soluble components, oil, and oil emulsions from the protein stream resulting in a protein cake, 170 of higher protein concentration (purity). Oils and oil emulsions that are removed by washing can be recovered in an oil recovery system with higher yields (i.e. more oil per bushel grain processed) thereby increasing plant profitability.

In some embodiments, the process teaches the addition of wash fluid before separation operations in order to produce any one or all of the following: 1) a higher concentration of fiber in the fiber product, 2) a higher protein concentration in the protein product, 3) enhanced fluid flow properties for balancing the mechanical separation, 4) increased oil and oil emulsions entering centrate 1, 180, and/or centrate 2, 200.

In some embodiments, wash fluids can be added into the 151 flow or prior to the 233 device (FIG. 12). One advantage of adding wash fluid here is moving additional soluble materials, fine particulates, oil and oil emulsions that the protein recovery device 152 and 140 does not recover away from the protein concentrate, 170, making for a higher purity protein product. An additional advantage is the wash flow cascades through the HC2 unit, 233, allowing additional separation potential to recover additional fiber rich particles for direction to HC1, 112, via flow UF2, 124.

In some embodiments, wash fluids can be added into the hydrocyclone bank #1, HC1, 112. An advantage of adding wash fluid here is moving additional larger amounts of soluble materials, fine protein particulates, oil and oil emulsions into the overflow stream, 151, thereby providing additional protein for the devices, 152 and 140, to recover. An additional advantage is the underflow 1, UF1, 122, is further depleted in soluble materials, fine protein particulates, oil and oil emulsions allowing for fiber recovery device, 130, to recover a cake, 160, that is further enriched in fiber. Wash fluids added prior to 112 provide and additional advantage of cascade washing through 112, 233, 152, and 140 making for a more efficient use of wash fluid.

In some embodiments, wash fluids can be added into the HC1 bank underflow, 122, prior to entering separation device 232. An advantage of adding wash fluid here is moving additional amounts of soluble materials, fine protein particulates, oil and oil emulsions from the fiber enriched product into the OF3, 125, stream. Additionally, the removal of protein components results in a higher fiber concentration in the fiber solids cake, 160. Wash fluids added prior to 232 provide additional advantage of cascade washing through 232 and any units that fluid 125 passes through. Additional benefit of adding wash fluid to 232 is reduction in hydraulic load on unit 112. This has the triple benefit of creating a higher fiber concentration product, 160, creating a higher protein product, 170, and moving more oil and oil emulsions to an oil recovery system for higher oil yield per bushel.

In some embodiments, wash fluids can be added into the flow 158 or 154 or 152 prior to entering separation device 140. Addition here has the advantage of increasing the removal of soluble materials, oil and oil emulsions from the protein enriched product, 170 as well as moving more oil and oil emulsions to an oil recovery system for higher oil yield per bushel.

In some embodiments, wash fluids can be added into the washing mechanism in device 152. This has the advantage of increasing both the protein concentration and protein yield per bushel in the 170 product.

In some embodiments, wash fluids can be added into the UF3 flow, 123, or directly prior to entering separation device 130. Addition here has the advantage of thinning the flow to the 130 device making for easier operation of the unit. Additional benefit has the advantage of increasing the removal of protein rich materials, soluble materials, oil and oil emulsions from the fiber enriched product, 160 as well as moving more oil and oil emulsions to an oil recovery system for higher oil yield per bushel.

In some embodiments, wash fluids can be added into the UF2 flow, 124 prior to direction to the HC1, 112, separation device. Addition here has the advantage of increasing the removal of soluble materials, fine protein particulates, oil and oil emulsions from the UF1 flow, 122 enriching the 160 product in fiber. Additional advantage is the wash fluid cascades through HC3, 232, allowing for a second use of the wash fluid allowing for the removal of soluble materials, oil and oil emulsions from the protein enriched product, 170 as well as moving more oil and oil emulsions to an oil recovery system for higher oil yield per bushel.

Figure 13:
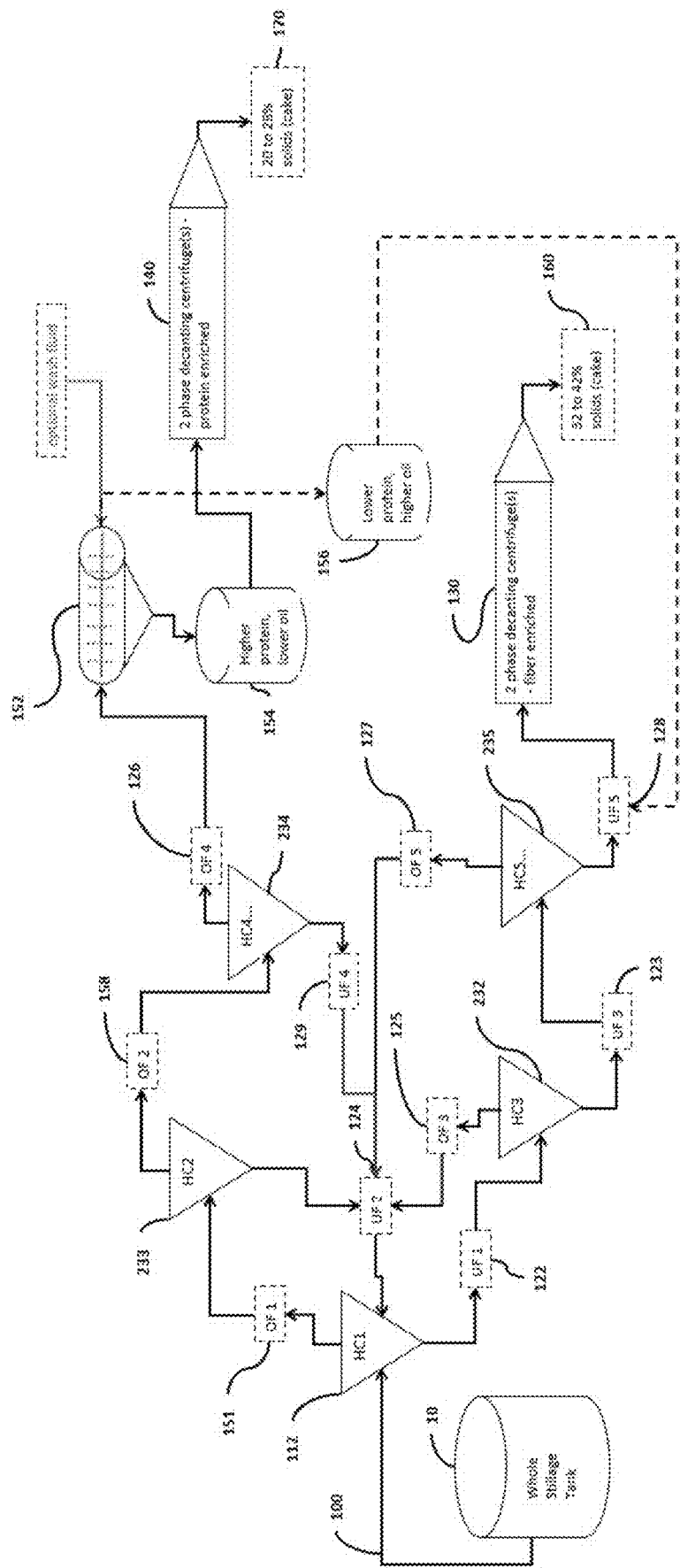
FIG. 13 shows an example schematic view of a stillage fractionation system with more than three cascading hydrocyclone banks and filtration device in an ethanol facility, according to some aspects of the present disclosure.

A non-limiting example of a stillage fractionation system with more than three cascading hydrocyclone banks and filtration process is shown in FIG. 13. This gives insight into using more and more hydrocyclones in series in order to further purify the high fiber fraction 160, high protein fraction 170, and move more oil and oil emulsions into flows that oil recovery systems can process for higher oil recovery yields per bushel processed. The present disclosure is not limited to a particular number or configuration of hydrocyclone(s), hydrocyclone banks or hydrocyclone types used to practice the subject processes. The present disclosure shows the utility of using hydrocyclones in a variety of configurations for processing stillage bottoms for the production of protein enriched (170), fiber enriched (160), and augmented bio-oil yields (34).

EXEMPLARY EMBODIMENTS

Aspects of the preset disclosure are embedded in the clauses and exemplary embodiments set forth below.

Clause 1. A process for fractionating whole stillage, comprising:
using one or more hydrocyclones without a grit pot at high flow rate and high feed pressure to fractionate whole stillage into first and second fractions containing suspended solids, wherein the first fraction is enriched in protein and the second fraction is depleted in protein; and
presenting the first and second fractions to decanting or disc-style centrifuges for mechanical dewatering, and
recovering from the decanting or disc-style centrifuges suspended solid fractions comprising:
a first dewatered fraction comprising 40% to 60% protein on a dry weight basis.

Clause 2. The process of clause 1, wherein the suspended solid fractions recovered from the decanting or disc-style centrifuges comprises:
a first dewatered fraction comprising 40% to 60% protein on a dry weight basis; and
a second dewatered fraction comprising 20 to 34% protein on a dry weight basis.

Clause 3. The process of clause 2, wherein the second dewatered fraction comprises 20 to 27% protein on a dry weight basis.

Clause 4. The process of clause 2 or 3, wherein the centrate from the second dewatered fraction is substantially depleted in suspended solids.

Clause 5. A process for fractionating whole stillage, comprising:
using one or more hydrocyclones without a grit pot at high flow rate and high feed pressure to fractionate whole stillage into first and second fractions containing suspended solids, wherein the first fraction is enriched in protein and the second fraction is depleted in protein, and wherein the one or more hydrocyclones are operated at an overflow flow rate that is less than three times the underflow flow rate; and presenting the first and second fractions to decanting or disc-style centrifuges for mechanical dewatering, and recovering from the decanting or disc-style centrifuges suspended solids fractions comprising:

a first dewatered fraction comprising 40% to 60% protein on a dry weight basis.

Clause 6. The process of clause 5, wherein the suspended solid fractions recovered from the decanting or disc-style centrifuges comprises:

a first dewatered fraction comprising 40% to 60% protein on a dry weight basis; and a second dewatered fraction comprising 20 to 34% protein on a dry weight basis.

Clause 7. The process of clause 6, wherein the second dewatered fraction comprises 20 to 27% protein on a dry weight basis.

Clause 8. The process of clause 5 or 6, wherein the centrate from the second dewatered fraction is substantially depleted in suspended solids.

Clause 9. A process for fractionating whole stillage, comprising:

using one or more hydrocyclones and at least one filtration device to fractionate whole stillage into first and second fractions containing suspended solids, wherein the first fraction is enriched in protein and the second fraction is depleted in protein; and presenting the first and second fractions to decanting or disc-style centrifuges for mechanical dewatering, said suspended solids fractions recovered by the decanter comprising:

a first fraction comprising 40% to 60% protein on a dry weight basis

Clause 10. The process of clause 9, wherein the suspended solid fractions recovered from the decanting or disc-style centrifuges comprises:

a first dewatered fraction comprising 40% to 60% protein on a dry weight basis; and a second dewatered fraction comprising 20 to 34% protein on a dry weight basis.

Clause 11. The process of clause 10, wherein the second dewatered fraction comprises 20 to 27% protein on a dry weight basis.

Clause 12. The process of clause 10 or 11, wherein the centrate from the second dewatered fraction is substantially depleted in suspended solids.

Clause 13. A protein concentration process comprising:

using one or more hydrocyclones and a washing filtration system fractionate whole stillage into two fractions containing suspended solids enriched in protein and a second fraction depleted in protein; and using the washing filtration system to further enrich the high protein fraction in protein concentration and/or increase the yield of the high protein fraction; and presenting the two fractions to a plant's existing decanting or disc-style centrifuges for mechanical dewatering, said suspended solids fractions recovered by the decanter comprising:

a first fraction comprising 40% to 60% protein on a dry weight basis.

Clause 14. The process of clause 13, wherein the suspended solid fractions recovered from the decanting or disc-style centrifuges comprises:

a first dewatered fraction comprising 40% to 60% protein on a dry weight basis; and a second dewatered fraction comprising 20 to 34% protein on a dry weight basis.

Clause 15. The process of clause 14, wherein the second dewatered fraction comprises 20 to 27% protein on a dry weight basis.

Clause 16. The process of clause 14 or 15, wherein the centrate from the second dewatered fraction is substantially depleted in suspended solids.

Clause 17. The process of any one of clauses 1-16, wherein a single pass hydrocyclone bank is used to fractionate the whole stillage into high and low protein fractions.

Clause 18. The process of any one of clauses 1-16, wherein:

a centrate from the underflow decanter is depleted in suspended solids;

a portion of the centrate, up to 100%, is directed to the evaporation process; and a concentrate is produced by the evaporation process that comprises at least 50% solids on a dry matter basis.

Clause 19. The process of any one of clauses 1-16, wherein:

a centrate from the underflow decanter is depleted in suspended solids;

a portion of the centrate, up to 100%, is directed to mash bill as backset; and the backset is reduced in suspended solids.

Clause 20. The process of any one of clauses 1-16, wherein a first pass hydrocyclone conveys the overflow stream to a second hydrocyclone of equal or smaller diameter that further concentrates the smaller protein particles of the first fraction.

Clause 21. The process of any one of clauses 1-16, wherein a first pass hydrocyclone conveys the underflow stream to a subsequent hydrocyclone or subsequent hydrocyclones of equal or smaller diameter that further concentrates the larger fiber particles of the second fraction.

Clause 22. The process of any one of clauses 1-21, further comprising using a portion of a process evaporator condensate to remove, as a suspension or solution, water soluble components and/or water insoluble components from a high fiber feed.

Clause 23. The process of clause 22, wherein removing the water soluble components and/or the small particle sized insoluble components produces an animal feed that is higher in fiber purity.

Clause 24. The process of any one of clauses 22-23, wherein the water soluble components and/or the small particle sized insoluble components removed from the high fiber feed are recycled into the next fermentation cycle.

Clause 25. The process of any one of clauses 23-24, wherein the water soluble components and/or the small particle sized insoluble components removed from the high fiber feed are moved into an oil recovery and high protein purity recovery process for capture as additional oil and/or additional protein volume fractions.

Clause 26. The process of any one of clauses 1-25, wherein the process is a stillage clarification process that produces:

between one and seven and one half pounds per bushel of a first fraction, elevated in protein concentration;

between two and eight and one half pounds per bushel of a second fraction, depleted in protein concentration; and/or between 74% and 100% concentration bio-oil and bio-oil degradation products in a third fraction; and
a fourth fraction concentrated in solubles Clause 27. A process for fractionating whole stillage, comprising:
separating whole stillage using one or more modified hydrocyclones lacking a grit pot under conditions sufficient to produce a protein enriched overflow stream and a protein depleted underflow stream;
dewatering the protein enriched overflow stream using a decanting or disc-style centrifuge to recover a first protein enriched fraction comprising 40% to 60% protein on a dry weight basis; and
dewatering the protein depleted underflow stream using a decanting or disc-style centrifuge to recover a second protein depleted fraction 20 to 34% protein on a dry weight basis.

Clause 28. The process of clause 27, wherein the modified hydrocyclone is operated at an overflow flow rate that is less than three times the underflow flow rate.

Clause 29. The process of clause 28, wherein the modified hydrocyclone is operated at an overflow flow rate that is greater than the underflow flow rate.

Clause 30. The process of clause 27 or 28, wherein the modified hydrocyclone is operated at a high feed flow rate and high feed pressure.

Clause 31. The process of any one of clauses 27-30, wherein the feed flow rate of the whole stillage is 50% higher than manufacturers recommendation or more (e.g., 60% higher or more, 70% higher or more, 80% higher or more, 90% higher or more, or 100% higher or more).

Clause 32. The process of any one of clauses 27-31, wherein the feed pressure of the whole stillage is 12 psig or more (e.g., 16 psig or more, 20 psig or more, 25 psig or more, 30 psig or more, 35 psig or more, 40 psig or more, 45 psig or more, 50 psig or more, 55 psig or more, 60 psig or more, 65 psig or more, 70 psig or more, or 75 psig or more).

Clause 33. The process of any one of clauses 27-32, wherein the protein enriched overflow stream and the protein depleted underflow stream each comprise suspended solid particles.

Clause 34. The process of any one of clauses 27-33, wherein the one or more modified hydrocyclones is a single pass hydrocyclone bank.

Clause 35. The process of any one of clauses 27-33, wherein the separating step using one or more modified hydrocyclones includes conveying a first protein enriched overflow stream from a first pass hydrocyclone to a second pass hydrocyclone of equal or smaller diameter to produce a second protein enriched overflow stream comprising concentrated smaller protein particles.

Clause 36. The process of any one of clauses 27-33, wherein the separating step using one or more modified hydrocyclones includes conveying a first protein depleted underflow stream from a first pass hydrocyclone to one or more subsequent hydrocyclones of equal or smaller diameter to produce a second protein depleted underflow stream comprising concentrated larger fiber particles.

Clause 37. The process of any one of clauses 27-33, wherein the separating step is performed using three modified hydrocyclones each lacking a grit pot and configured together to produce the protein enriched overflow stream and the protein depleted underflow stream.

Clause 38. The process of any one of clauses 27-37, wherein the protein enriched overflow stream and the protein depleted underflow stream each comprise suspended solid particles.

Clause 39. The process of any one of clauses 27-38, further comprising, after the separating step and before the dewatering steps, filtering the protein enriched overflow stream.

Clause 40. The process of any one of clauses 27-39, wherein the filtering is performed under conditions sufficient to produce a clarified protein enriched overflow stream having an enriched protein concentration and/or increased protein yield relative to an unfiltered protein enriched overflow stream.

Clause 41. The process of clause 40, wherein the filtering is performed using a washing filtration system that washes the filtered material (i.e., screen).

Clause 42. The process of clause 40 or 41, wherein decreasing the hydrocyclone overflow rate relative to the hydrocyclone underflow rate increases the protein content in the filtered material (i.e., screen) and increases the protein content of the first protein enriched fraction.

Clause 43. The process of any one of clauses 40-42, wherein the filtering reduces the fat content of the first protein enriched fraction.

Clause 44. The process of any one of clauses 27-43, further comprising using a portion of a process evaporator condensate to remove, as a suspension or solution, water soluble components and/or water insoluble components from a high fiber feed stream.

Clause 45. The process of clause 44, wherein removing the water soluble components and/or the water insoluble components (e.g., having small particle sizes) produces an animal feed that is higher in fiber purity.

Clause 46. The process of any one of clauses 44-45, wherein the water soluble components and/or the water insoluble components (e.g., having small particle sizes) removed from the high fiber feed stream are recycled into a next fermentation cycle.

Clause 47. The process of any one of clauses 45-46, wherein the water soluble components and/or the water insoluble components (e.g., having small particle sizes) removed from the high fiber feed are moved into an oil recovery and high purity protein recovery process to produce additional fractions of oil and/or additional protein volume.

Clause 48. The process of any one of clauses 27-47, wherein the process is a stillage clarification process that produces:
between one and seven and one half pounds per bushel of the first protein enriched fraction;
between two and eight and one half pounds per bushel of the second protein depleted fraction; and/or
a third fraction of between 74% and 100% concentration of bio-oil and bio-oil degradation products
fourth fraction concentrated in solubles Clause 49. A product produced according to the process of any one of clauses 1-48.

Clause 50. A stillage fractionation and/or clarification system, comprising:
a grain ethanol plant producing stillage;
one or more modified hydrocyclones each lacking a grit pot; and
one or more decanting or disc-style centrifuges;
wherein the system is configured to fractionate whole stillage into fractions comprising:
a first protein enriched fraction comprising 40% to 60% protein on a dry weight basis; and
a second solubles rich fraction; and
a third protein depleted fraction comprising 20 to 34% protein on a dry weight basis; and
a fourth solubles rich fraction Clause 51. The system of clause 50, further comprising a washing filtration system configured to filter, with washing of the filtered material, a protein enriched overflow stream of the one or more modified hydrocyclones to produce a clarified protein enriched overflow stream.

Clause 52. The system of any one of clauses 50-51, further comprising an evaporator.

Clause 53. The system of any one of clauses 50-52, further comprising means for recycling water.

EXAMPLES

Example 1

Over a period of several days, a single bank hydrocyclone was operated at an ethanol plant in Kansas, USA running 100% grain sorghum as the raw material. The hydrocyclone was operated at approximately 200% the manufactures recommended flow rate and the manufacturers recommended grit pot was removed. These changes in operation were contrary to the manufacturers recommendation but determined by the inventor to provide the best purity of OF protein capture. The feed flow rate was 95 gallons per minute, the overflow rate (OF1) was 68 gallons per minute, the underflow rate (UF1) was 27 gallons per minute. The OF1 was processed through a commercial decanter running at 3000 g at between 5 and 9 rpm differential on the scroll vs bowl rate. The UF1 was processed through a commercial decanter running at 3000 g at 20 gpm differential on the scroll vs bowl rate. The whole stillage, OF1, UF1, OF1 commercial decanter centrate, UF1 commercial decanter centrate and plant thin stillage were collected and centrifuged in a laboratory bucket centrifuge at 3000 g for 5 minutes. The compaction patterns of the fractions are shown in FIGS. 14A-14B and the % heavy, light and watery fractions quantitated in Table 1.

TABLE 1

Stillage processed from 100% grain sorghum. 95 gpm feed, 68 gpm OF and 27 gpm UF. From FIG. 14A-C-1: Decanter UF centrate (180). 2: HC UF (120). 3: whole stillage (100). 4: HC OF (150). 5: decanter OF centrate (200). From FIG. 1-6: plant thin stillage (18,20). All materials centrifuged in a laboratory bucket centrifuge at 3000g for 5 minutes.

| Spinnable solids | 1: Decanter UF centrate (180) | 2: HC Underflow (UF, 120) | 3: whole stillage (100) | 4: HC OF (150) | 5: decanter OF centrate (200) | 6: plant thin stillage (18, 20) |
|---|---|---|---|---|---|---|
| % easily compacting solids | trace | 50.0% | 23.3% | 10.0% | ND | ND |
| % find suspended solids | 1.7% | 0.7% | 11.7% | 10.0% | 4.0% | 5.0% |
| % soluble + oil | 98.3% | 49.3% | 65.0% | 80.0% | 96.0% | 95.0% |

The whole stillage sample has 23.3% volume easily compacting spinnable solids and 11.7% fine suspended solids. The HC operated at 200% of recommended flow rate and with the grit pot removed produced a large amount of easily compacting solids with 50% of the spinnable volume easily compacting solids in the UF, substantially higher than the whole stillage. The HC operated at 200% of recommended flow rate and with the grit pot removed produced a small amount of fine suspended solids with 0.7% of the spinnable volume fine suspended solids in the UF, substantially lower than the whole stillage. The ratio of fine suspended to easily compacting solids in whole stillage is 11.7:23.3 (0.5). The ratio of fine suspended to easily compacting solids in the UF is 0.7:50 (0.014). These largely easily compacting solids are easy to dewater with a decanter (FIG. 10A, 130), as shown in example 2 producing an elevated dry solids concentration of 38% (FIG. 10A, 160).

Figure 1:
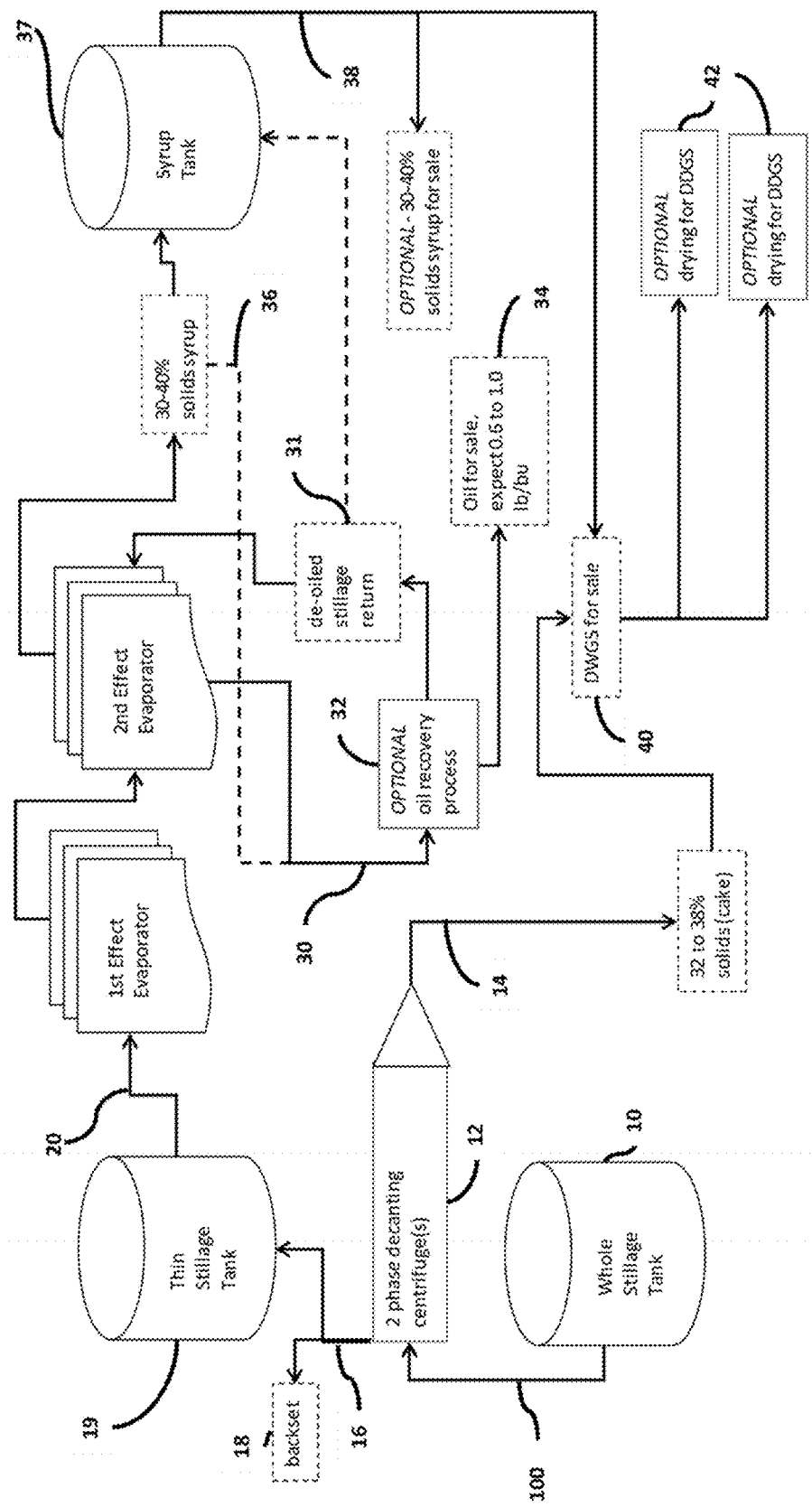
FIG. 1 shows a schematic view of a classical ethanol plant with process flow diagram of whole stillage processing into bio-oil and WDGS and/or DDGS and optionally syrup (CCDS).

The decanter centrate from the UF (FIG. 10A, 180) processing is substantially lower in suspended solids than traditional thin stillage with only about 1.7 v/v % suspended solids in the centrate compared to 5% v/v suspended solids in the plants thin stillage (FIG. 1, 20). This reduction in suspended solids allows the opportunity to produce a cleaner evaporator feed product. Alternately, this reduction in suspended solids allows the opportunity to produce a cleaner backset.

The coarse solids recovered in the UF are low in protein and elevated in fiber content, as shown in example 2. The volume reduction associated with the high recovery rate reduces the load on the dewatering decanters freeing up capacity of the compliment of existing decanters for other duty loads, such as to process the OF more effectively.

The whole stillage sample has 23.3% volume easily compacting spinnable solids and 11.7% fine suspended solids. The HC operated at 200% of recommended flow rate and with the grit pot removed produced a small amount of easily compacting solids with 10% of the spinnable volume easily compacting solids in the OF, substantially lower number than the whole stillage. The HC operated at 200% of recommended flow rate and with the grit pot removed produced a large amount of fine suspended solids with 10% of the spinnable volume fine suspended solids in the OF. The ratio of fine suspended to heavy compacting solids in the whole stillage is 11.7:23.3 (0.5). The ratio of fine suspended to heavy compacting solids in the OF is 10:10 (1.0). The OF is substantially elevated in fine suspended solids to easily compacting solids ratio.

The decanter centrate from the OF (FIG. 10A, 200) processing is slightly lower in suspended solids than traditional thin stillage with only about 4 v/v % suspended solids in the centrate compared to 5% v/v suspended solids in the plants thin stillage (FIG. 1, 20). This reduction in suspended solids allows the opportunity to produce a slightly cleaner evaporator feed product. Alternately, this reduction in suspended solids allows the opportunity to produce a slightly cleaner backset.

Example 2

Over a period of several days a single bank hydrocyclone processed whole stillage at an ethanol plant in Iowa, USA running 100% corn as the raw material. The hydrocyclone was operated at approximately 200% the manufactures recommended flow rate and the manufacturers recommended grit pot was removed. These changes in operation were contrary to the manufacturers recommendation but determined by the inventor to provide the best purity of OF protein capture. The feed flow rate was 90 gallons per minute, the overflow rate (OF1) was 60 gallons per minute, the underflow rate (UF1) was 30 gallons per minute. The OF1 was processed through a commercial decanter running at 3000 g at between 5 and 9 rpm differential on the scroll vs bowl rate. The UF1 was processed through a commercial decanter running at 3000 g at 20 gpm differential on the scroll vs bowl rate. The operation at the higher flow rates allowed higher protein concentrations to be recovered in the OF1 as shown in Table 2. Results from running the UF1 through the decanter are shown in Table 3.

TABLE 2

OF1 produced with 100% corn whole stillage, approximately 200% feed rate of manufacturer, no grit pot. 90 gpm feed rate to hydrocyclone, 60 gpm overflow rate (UF1), 30 gpm underflow rate (UF1). Recovered with decanter at 3000 g with 5 to 9 rpm scroll differential compared to bowl.

| | % dry solids | % protein DMB | % fat DMB |
|---|---|---|---|
| OF1 decanter cake | 28.3% | 49.1% | 10.5% |
| Standard deviation | 3.6% | 1.3% | 0.3% |

TABLE 3

UF1 produced with 100% corn whole stillage, approximately 200% feed rate of manufacturer, no grit pot. 90 gpm feed rate to hydrocyclone, 60 gpm overflow rate (UF1), 30 gpm underflow rate (UF1). Recovered with decanter at 3000 g with 20 rpm scroll differential compared to bowl.

| | % dry solids | % protein DMB | % fat DMB |
|---|---|---|---|
| UF1 decanter cake | 38.4% | 29.2% | 6.8% |
| Standard deviation | 5.1% | 0.9% | 1.0% |

Example 3

Over a period of several days a single bank hydrocyclone processed whole stillage at an ethanol plant in Kansas, USA running 100% grain sorghum as the raw material. The hydrocyclone was operated at approximately 200% the manufactures recommended flow rate and the manufacturers recommended grit pot was removed. These changes in operation were contrary to the manufacturers recommendation but determined by the inventor to provide the best purity of OF protein capture. The feed flow rate was 90 gallons per minute, the overflow rate (OF1) was 60 gallons per minute, the underflow rate (UF1) was 30 gallons per minute. The OF1 was processed through a commercial decanter running at 3000 g at between 5 and 9 rpm differential on the scroll vs bowl rate. The UF1 was processed through a commercial decanter running at 3000 g at 20 gpm differential on the scroll vs bowl rate. The operation at the higher flow rates allowed higher protein concentrations to be recovered in the OF1 as shown in Table 4. Results from running the UF1 through the decanter are shown in Table 5.

TABLE 4

OF1 produced with 100% grain sorghum whole stillage, approximately 200% feed rate of manufacturer, no grit pot. 90 gpm feed rate to hydrocyclone, 60 gpm overflow rate (OF1), 30 gpm underflow rate (UF1). Recovered with decanter at 3000 g with 10 rpm scroll differential compared to bowl.

| | % dry solids | % protein DMB | % NDF DMB | % fat DMB | % ash DMB |
|---|---|---|---|---|---|
| OF1 decanter cake | 26.9% | 49.1% | 30.1% | 10.4% | 3.1% |
| Standard deviation | 3.6% | 1.3% | 3.2% | 0.1% | 0.2% |

TABLE 5

UF1 produced with 100% grain sorghum whole stillage, approximately 200% feed rate of manufacturer, no grit pot. 90 gpm feed rate to hydrocyclone, 60 gpm overflow rate (UF1), 30 gpm underflow rate (UF1). Recovered with decanter at 3000 g with 5 to 9 rpm scroll differential compared to bowl.

| | % dry solids | % protein DMB | % NDF DMB | % fat DMB | % ash DMB |
|---|---|---|---|---|---|
| UF1 decanter cake | 35.9% | 36.7% | 43.4% | 8.6% | 2.7% |
| Standard deviation | 1.0% | 1.6% | 2.6% | 0.4% | 0.2% |

Example 4

Over a period of several days a single bank hydrocyclone processed whole stillage at an ethanol plant in Iowa, USA running 100% corn as the raw material. The hydrocyclone was operated at approximately 200% the manufactures recommended flow rate and the manufacturers recommended grit pot was removed. These changes in operation were contrary to the manufacturers recommendation but determined by the inventor to provide the best purity of OF protein capture. The feed flow rate was 90 gallons per minute and the overflow (OF1) was captured and run through a decanter. The decater scroll vs conveyor differentional was 19 rpm. The OF vs UF flow rate was varied and sampled several times. The flow rate was 90 gpm for all runs. The OF to UF rate was adjusted to create knowledge around split performance with: 80 gpm OF with 10 gpm UF, 70 gpm OF with 20 gpm UF, 65 gpm OF with 25 gpm UF, 60 gpm OF with 30 gpm UF. The protein captured with the decanter was analyzed with results for the 80OF:10UF shown in Table 6.

TABLE 6

OF1 produced with 100% corn based whole stillage, approximately 200% feed rate of manufacturer, no grit pot. 90 gpm feed rate to hydrocyclone, 80 gpm overflow rate (OF1), 10 gpm underflow rate (UF1). OF1 was recovered with decanter at 3000 g with 19 rpm scroll differential compared to bowl.

| | % dry solids | % protein DMB | % ADF DMB | % NDF DMB | % fat DMB |
|---|---|---|---|---|---|
| OF 1 decanter cake | 29.8% | 40.1% | 14.9% | 33.9% | 9.2% |
| Standard deviation | 0.4% | 1.3% | 0.8% | 3.3% | 0.7% |

The protein captured with the decanter was analyzed with results for the 70OF:20UF shown in Table 7.

TABLE 7

OF1 produced with 100% corn based whole stillage, approximately 200% feed rate of manufacturer, no grit pot. 90 gpm feed rate to hydrocyclone, 70 gpm overflow rate (OF1), 20 gpm underflow rate (UF1). OF1 was recovered with decanter at 3000 g with 19 rpm scroll differential compared to bowl.

|  | % dry solids | % protein DMB | % ADF DMB | % NDF DMB | % fat DMB |
|---|---|---|---|---|---|
| OF1 decanter cake | 28.3% | 48.6% | 18.9% | 24.6% | 10.5% |
| Standard deviation | 0.4% | 0.9% | 5.9% | 2.8% | 0.6% |

The protein captured with the decanter was analyzed with results for the 65OF:25UF shown in Table 8.

TABLE 8

OF1 produced with 100% corn based whole stillage, approximately 200% feed rate of manufacturer, no grit pot. 90 gpm feed rate to hydrocyclone, 65 gpm overflow rate (OF1), 25 gpm underflow rate (UF1). OF1 was recovered with decanter at 3000 g with 19 rpm scroll differential compared to bowl.

|  | % dry solids | % protein DMB | % ADF DMB | % NDF DMB | % fat DMB |
|---|---|---|---|---|---|
| OF1 decanter cake | 27.6% | 50.0% | 19.8% | 30.8% | 9.9% |
| Standard deviation | 0.7% | 0.8% | 4.4% | 6.6% | 0.2% |

The protein captured with the decanter was analyzed with results for the 60OF:30UF shown in Table 9.

TABLE 9

OF1 produced with 100% corn based whole stillage, approximately 200% feed rate of manufacturer, no grit pot. 90 gpm feed rate to hydrocyclone, 60 gpm overflow rate (OF1), 30 gpm underflow rate (UF1). OF1 was recovered with decanter at 3000 g with 19 rpm scroll differential compared to bowl.

|  | % dry solids | % protein DMB | % ADF DMB | % NDF DMB | % fat DMB |
|---|---|---|---|---|---|
| OF1 decanter cake | 27.6% | 51.2% | 18.7% | 31.4% | 10.0% |
| Standard deviation | 0.6% | 1.2% | 2.2% | 14.0% | 0.6% |

FIG. 15, Graph 1, shows a plot of % protein with varying OF1 to UF1 rate for single HC at constant feed rate of 90 gpm.

Example 5

Over a period of several days a single bank hydrocyclone processed whole stillage at an ethanol plant in Illinois, USA running 100% corn as the raw material. The hydrocyclone was operated at approximately 200% the manufactures recommended flow rate and the manufacturers recommended grit pot was removed. These changes in operation were contrary to the manufacturers recommendation but determined by the inventor to provide the best purity of OF protein capture. The feed flow rate was 90 gallons per minute, the overflow rate (OF1) was 60 gallons per minute, the underflow rate (UF1) was 30 gallons per minute. The OF1 was processed through a commercial decanter running at 3000 g at 15 rpm differential on the scroll vs bowl rate. The UF1 was processed through a commercial decanter running at 3000 g at 20 gpm differential on the scroll vs bowl rate. The operation at the higher flow rates allowed higher protein concentrations to be recovered in the OF1 as shown in Table 10. Results from running the UF1 through the decanter are shown in Table 11.

TABLE 10

OF1 produced with 100% corn whole stillage, approximately 200% feed rate of manufacturer, no grit pot. 90 gpm feed rate to hydrocyclone, 60 gpm overflow rate (UF1), 30 gpm underflow rate (UF1). Recovered with decanter at 3000 g with 15 rpm scroll differential compared to bowl.

|  | % dry solids | % protein DMB | % fat DMB |
|---|---|---|---|
| OF1 decanter cake | 25.9% | 51.6% | 8.4% |
| Standard deviation | 0.7% | 1.0% | 0.5% |

TABLE 11

UF1 produced with 100% corn whole stillage, approximately 200% feed rate of manufacturer, no grit pot. 90 gpm feed rate to hydrocyclone, 60 gpm overflow rate (UF1), 30 gpm underflow rate (UF1). Recovered with decanter at 3000 g with 20 rpm scroll differential compared to bowl.

|  | % dry solids | % protein DMB | % fat DMB |
|---|---|---|---|
| UF1 decanter cake | 36.5% | 27.7% | 8.2% |
| Standard deviation | 0.6% | 2.5% | 0.2% |

Example 6

Over a period of several days a single bank hydrocyclone processed whole stillage at an ethanol plant in Illinois, USA running 100% corn as the raw material. The hydrocyclone was operated at approximately 200% the manufactures recommended flow rate and the manufacturers recommended grit pot was removed. These changes in operation were contrary to the manufacturers recommendation but determined by the inventor to provide the best purity of OF protein capture. The feed flow rate was 90 gallons per minute, the OF1 flow rate was 60 gpm and the UF1 flow rate was 30 gpm. Samples were collected and processed through laboratory centrifuge operating at 3000 g for 5 minutes.

Additional samples were screened through a variety of different size screen openings. The material that went through the screen was concentrated in a laboratory centrifuge operating at 3000 g for 5 minutes. The percentage difference of mass recovered from the whole broth centrifuge (100% yield) compared to the mass which passed through the screen was analyzed. As the screen size gets smaller the protein concentration gets higher, the fat concentration decreases and the yield (pounds per bushel) decreases (Table 12, Graph 2, FIG. 16).

TABLE 12

% Protein, % Fat that passed through a screen recovered by lab centrifuge and the suspended solids analyzed

| micrometer opening | % protein | % fat | yield |
| --- | --- | --- | --- |
| 2000 | 42.14 | 15.84 | 100.0% |
| 1000 | 43.66 | 15.35 | 95% |
| 850 | 43.65 | 14.68 | 82.2% |
| 500 | 44.57 | 12.38 | 72.9% |
| 250 | 47.19 | 9.65 | 53.9% |
| 75 | 50.47 | 7.2 | 24.5% |

FIG. 16 shows Graph 2 (Table 12) plot of OF suspended solids materials that passed though a screen and the suspended solids recovered by lab centrifuge and analyzed.

Additional samples were screened and the material retained on the screen washed with three mass units of water through a variety of different size screen openings. The suspended solids material that went through the screen were concentrated (recovered) in a laboratory centrifuge operating at 3000 g for 5 minutes. The percentage difference between mass recovered from the whole broth centrifuge (100% yield) compared to the mass which passed through the screen was analyzed. As the screen size gets smaller the protein concentration gets higher, the fat concentration decreases and the yield (pounds per bushel) decreases (Table 13, Graph 3).

TABLE 13

% Protein, % Fat that passed through a screen recovered with solids washed with 3 volumes of water and liqud through the screen recovered by lab centrifuge and the suspended solids analyzed

| micrometer opening | % protein | % fat | yield |
| --- | --- | --- | --- |
| 2000 | 42.14 | 15.84 | 100.0% |
| 850 | 46.6 | 14.58 | 88% |
| 500 | 47.63 | 14.05 | 84.0% |
| 250 | 48.64 | 10.92 | 72.6% |
| 75 | 52.75 | 10.19 | 39.1% |

FIG. 17, Graph 3, OF material passed through a screen and the material on top of the screen washed with 3 volumes of water. All materials that passed through the screen were recovered by lab centrifuge and the suspended solids laboratory pellet was analyzed.

Comparision of the yield of material with screening and with or without washing on the screen shows that washing on the screen increases the yield per bushel (Table 14, Graph 4, FIG. 18) and increases the protein purity (Table 15, Graph 5, FIG. 19).

TABLE 14

Relative yield of OF1 mass recovered through different screen opening sizes. Yields compared with and without wash water added during screening.

| micrometer opening | screen yield | washed screen yield |
| --- | --- | --- |
| 2000 | 100.0% | 100.0% |
| 850 | 82.2% | 88% |
| 500 | 72.9% | 84.0% |
| 250 | 53.9% | 72.6% |
| 75 | 24.5% | 39.1% |

FIG. 18, Graph 4, Screen yield of OF1 with and without washing. Yield is compared to no screen yield. 100%=the yield of material where no screen was used.

TABLE 15

Protein concentration of OF1 material recovered through screens of different openings. The screeings were performed with 3 volumes of wash water or without any wash water.

| micrometer opening | % protein | washed % protein |
| --- | --- | --- |
| 2000 | 42.14 | 42.14 |
| 850 | 43.65 | 46.6 |
| 500 | 44.57 | 47.63 |
| 250 | 47.19 | 48.64 |
| 75 | 50.47 | 52.75 |

FIG. 19, Graph 5, Screen protein purity of OF1 with and without washing.

Example 7

Over a period of several days a single bank hydrocyclone processed whole stillage at an ethanol plant in Iowa, USA running 100% corn as the raw material. The hydrocyclone was operated at approximately 200% the manufactures recommended flow rate and the manufacturers recommended grit pot was removed. These changes in operation were contrary to the manufacturers recommendation but determined by the inventor to provide the best purity of OF protein capture. The feed flow rate was 90 gallons per minute, the OF1 flow rate was 60 gpm and the UF1 flow rate was 30 gpm.

The OF1 materials were processed through a commercial style decanter operating at 3000 g. The differential for the scroll vs bowl rpm when processing OF1 was 15 rpm. Samples of material that was processed by the continuous flow decanter were also processed through a laboratory centrifuge operating at 3000 g for 5 minutes. The pellet recovered at the bottom of the laboratory centrifuge tube was recovered and analyzed. The laboratory centrifuge performance was compared with the commercial decanter performance and shown in Table 16 and Table 17.

The protein content is similar between the laboratory centrifuge and the commercial decanter. However, the results show that the laboratory bucket centrifuge pellet generally has 50% more fat than the commercial continuous decanter. This differential is consistent through many laboratory vs commercial decanter analysis. The inventor has discovered that there are small germ particles that are near neutrally buoyant in the turbulent environment of the continuous conveyor and wash out into the decanter centrate. In the laboratory bucket centrifuge there is less turbulence and these germ particles become part of the pellet recovered in the lab bucket.

TABLE 16

Whole stillage (WS) suspended solids recovered by a laboratory bucket centrifuge compared to a continuous decanting centrifuge. Analytes displayed on a DMB.

|  | % DM | % protein | % NDF | % fat | % ash |
|---|---|---|---|---|---|
| WS lab centrifuge pellet | 25.9% | 32.9% | 37.3% | 12.0% | 3.2% |
| standard deviation | 1.5% | 1.1% | 3.3% | 0.5% | 0.2% |
| WS decanter UF | 33.7% | 34.7% | 43.0% | 6.4% | 2.6% |
| standard deviation | 1.6% | 1.8% | 4.0% | 1.1% | 0.3% |

TABLE 17

HC OF1 suspended solids recovered by a laboratory bucket centrifuge compared to a continuous decanting centrifuge. Analytes displayed on a DMB.

|  | % DM | % protein | % NDF | % fat | % ash |
|---|---|---|---|---|---|
| OF lab pellet | 25.3% | 37.0% | 32.5% | 13.0% | 3.4% |
| standard deviation | 1.1% | 2.6% | 3.4% | 0.4% | 0.1% |
| OF decanter UF | 34.0% | 35.5% | 41.6% | 7.6% | 2.6% |
| standard deviation | 2.3% | 1.9% | 2.6% | 0.6% | 0.5% |

Example 8

Over a period of several days a single bank hydrocyclone processed whole stillage at an ethanol plant in Kansas, USA running 70% corn 30% grain sorghum as the raw material. The hydrocyclone was operated at approximately 200% the manufactures recommended flow rate and the manufacturers recommended grit pot was removed. These changes in operation were contrary to the manufacturers recommendation but determined by the inventor to provide the best purity of OF protein capture. The feed flow rate was 90 gallons per minute, the OF1 flow rate was varied from 30 gallons per minute to 80 gallons per minute with the UF1 adjusting from 60 gallons per minute to 10 gallons per minute. The OF+UF flow were held constant at 90 gpm. Two runs at each flow rate, run A and run B, were processed through the decanter and analyzed.

The OF1 materials were processed through a commercial style decanter operating at 3000 g. The differential for the scroll vs bowl rpm when processing OF1 was 15 rpm. The results from the different runs were analyzyed and shown in Table 18.

TABLE 18

70% corn + 30% grain sorghum OF1 recovered by commercial decanter. 80-10A and 80-10B are 80 gpm OF and 10 gpm UF; 70-20A and 70-20B are 70 gpm OF and 20 gpm UF; 60-30A and 60-30B are 60 gpm OF and 30 gpm UF; 45-45A and 45-45B are 45 gpm OF and 45 gpm UF; 30-60A and 30-60B are 30 gpm OF and 60 gpm UF. All analytes are reported in dry matter basis.

|  | 80-10A | 80-10B | 70-20A | 70-20B | 60-30A | 60-30B | 45-45A | 45-45B | 30-60A | 30-60B |
|---|---|---|---|---|---|---|---|---|---|---|
| % moisture | 70.3% | 69.6% | 71.7% | 70.9% | 72.7% | 72.6% | 75.8% | 75.0% | 75.3% | 75.7% |
| % protein | 37.7% | 37.6% | 41.9% | 40.7% | 43.1% | 43.6% | 45.2% | 46.4% | 48.8% | 48.0% |
| % ADF | 24.7% | 23.2% | 22.2% | 23.7% | 25.0% | 20.4% | 25.5% | 23.4% | 24.0% | 22.2% |
| % NDF | 34.8% | 35.6% | 30.1% | 33.2% | 28.8% | 27.5% | 28.0% | 26.8% | 29.3% | 28.1% |
| % fat | 10.8% | 10.8% | 11.9% | 11.9% | 11.9% | 12.6% | 10.9% | 11.1% | 9.7% | 10.0% |
| % ash | 3.6% | 3.6% | 4.1% | 4.2% | 4.9% | 4.9% | 4.4% | 5.3% | 5.1% | 4.3% |

FIG. 20, Graph 6 Protein concentration of 70% corn 30% sorghum decanter cake as OF flow changes at constant 90 gpm hydroclone feed rate.

Example 9

Over a period of several days a single bank hydrocyclone processed whole stillage at an ethanol plant in Kansas, USA running 100% grain sorghum as the raw material. The hydrocyclone was operated at approximately 200% the manufactures recommended flow rate and the manufactures recommended grit pot was removed. These changes in operation were contrary to the manufacturers recommendation but determined by the inventor to provide the best purity of OF protein capture. The feed flow rate was 90 gallons per minute, the OF1 flow rate was varied from 30 gallons per minute to 80 gallons per minute with the UF1 adjusting from 60 gallons per minute to 10 gallons per minute. The OF+UF flow were held constant at 90 gpm. Two runs at each flow rate, run A and run B, were processed through the decanter and analyzed.

The OF1 materials were processed through a commercial style decanter operating at 3000 g. The differential for the scroll vs bowl rpm when processing OF1 was 15 rpm. The results from the different runs were analyzyed and shown in Table 19.

TABLE 19

100% grain sorghum OF1 recovered by commercial decanter. 80-10A and 80-10B are 80 gpm OF and 10 gpm UF; 70-20A and 70-20B are 70 gpm OF and 20 gpm UF; 60-30A and 60-30B are 60 gpm OF and 30 gpm UF; 45-45A and 45-45B are 45 gpm OF and 45 gpm UF. All analytes are reported in dry matter basis.

|  | 80-10A | 80-10B | 70-20A | 70-20B | 60-30A | 60-30B | 45-45A | 45-45B |
|---|---|---|---|---|---|---|---|---|
| % moisture | 66.9% | 68.1% | 68.5% | 68.9% | 69.5% | 70.0% | 72.1% | 72.2% |
| % protein | 40.3% | 43.8% | 44.2% | 45.3% | 46.1% | 48.4% | 50.4% | 51.0% |
| % ADF | 28.4% | 28.0% | 30.1% | 29.2% | 26.1% | 28.5% | 21.2% | 25.2% |
| % NDF | 36.3% | 37.7% | 31.4% | 40.0% | 37.4% | 40.9% | 30.8% | 26.5% |
| % fat | 10.6% | 10.3% | 11.0% | 11.3% | 11.4% | 11.1% | 9.8% | 10.4% |
| % ash | 2.7% | 2.7% | 2.7% | 2.7% | 2.8% | 2.9% | 3.3% | 3.4% |

FIG. 21 Graph 7 Protein concentration of 100% sorghum decanter cake as OF flow changes at constant 90 gpm hydroclone feed rate.

Example 10

Over a period of several days a single bank hydrocyclone processed whole stillage at an ethanol plant in Illinois, USA running 100% corn as the raw material. The hydrocyclone was operated at approximately 200% the manufactures recommended flow rate and the manufacturers recommended grit pot was removed. These changes in operation were contrary to the manufacturers recommendation but determined by the inventor to provide the best purity of OF protein capture. The feed flow rate was 95 gallons per minute, the OF1 flow rate was varied from 35 gallons per minute to 75 gallons per minute with the UF1 adjusting from 60 gallons per minute to 20 gallons per minute. The OF+UF flow were held constant at 95 gpm.

The OF1 materials were processed through a commercial style decanter operating at 3000 g. The differential for the scroll vs bowl rpm when processing OF1 was 15 rpm. The results from the different runs were analyzed and shown in Table 20.

TABLE 20

Whole stillage from 100% corn OF1 recovered by commercial decanter. 35 OF:60 UF are 35 gpm OF and 60 gpm UF; 45 OF:50 UF are 45 gpm OF and 50 gpm UF; 55 OF:40 UF are 55 gpm OF and 40 gpm UF; 65 OF:30 UF are 65 gpm OF and 30 gpm UF; 75 OF:20 UF are 75 gpm OF and 20 gpm UF. All analytes are reported in dry matter basis.

|  | % protein | % Fat |
|---|---|---|
| 35 OF:60 UF | 48.5 | 9.3 |
| 45 OF:50 UF | 48.7 | 10.1 |
| 55 OF:40 UF | 47.0 | 10.6 |
| 65 OF:30 UF | 45.1 | 12.3 |
| 75 OF:20 UF | 41.6 | 12.3 |

FIG. 22 Graph 8: Protein and oil concentration of 100% corn whole stillage OF1 at 95 gpm feed and varying gpm OF1.

The OF1 materials from the 65OF:30UF trial were also processed through screens with the suspended solids material wash with three volumes of water. All suspended solids materials passing through the screens including the washing waters were recovered laboratory centrifuge at 3000 g for 5 minutes and the pellet analyzed. Whole stillage from 100% corn OF1 material recovered through screens of different openings is shown in Table 21.

TABLE 21

Whole stillage from 100% corn OF1 material recovered through screens of different openings. The screenings were performed with 3 volumes of wash water or without any wash water. All analytes are reported in dry matter basis.

| micrometer opening | % protein | % ADF | % NDF | % Fat | % ash |
|---|---|---|---|---|---|
| 150 | 56.2 | 19.5 | 31.4 | 8.3 | 1.44 |
| 212 | 54.1 | 17.6 | 24.1 | 8.9 | 2.3 |
| 250 | 53.3 | 16.5 | 25.0 | 9.1 | 2.23 |
| 300 | 53.1 | 17.1 | 24.3 | 9.0 | 2.05 |
| 425 | 51.9 | 19.1 | 27.4 | 10.3 | 1.98 |
| 500 | 50.8 | 18.5 | 25.0 | 11.3 | 2.11 |

FIG. 23: Graph 9 Material from the 65OF:40UF trial passed through a screen and the material on top of the screen washed with 3 volumes of water recovered by lab centrifuge and the suspended solids analyzed. (Table 21 data).

As can be seen with Table 20 lower OF1:UF1 ratios create OF with higher protein contents and lower fat contents. This teaches the practitioner of the disclosure to be able to adjust the splits to achieve different levels of protein content and fat content.

As can be seen with Table 21 washing OF1 material through smaller screens increases the protein concentration and reduces the fat concentration.

Example 11

Over a period of several days a single bank hydrocyclone processed whole stillage at an ethanol plant in Kansas, USA running 100% grain sorghum as the raw material. The manufacturers recommendation for operation were stated at "45 gpm" with a "0.65 bar delta P" (0.65 bar=9.6 psi). Samples of the OF and UF were collected and the suspended solids were recovered by a laboratory centrifuge at 3000 g for 5 minutes. The solids recovered were analyzed for compositional assay. Variables during the testing were feed rate and OF:UF gpm split. The protein concentration in the OF suspended particles continued to get higher in protein as the feed pressure was raised and the flow through the system was raised. The pump available during the test reached is maximum capacity before there was a peak in protein concentration.

Table 22 shows 1 part OF to 1 part UF flow rate at varying psig feed and varying flow rate. The protein content in the OF continued to rise as the feed rate to the system increased. Table 22 and Graphs 10 and 11 show the results of the conditions applied.

TABLE 22

1:1 HC feed rate vs feed pressure and protein content.

| psig feed | gpm feed | % protein OF | % protein UF |
|---|---|---|---|
| 6 | 20.4 | 38.4% | 38.6% |
| 8 | 32.9 | 39.3% | 36.2% |
| 10 | 40.9 | 39.0% | 35.8% |
| 16 | 51.3 | 42.1% | 34.5% |
| 22 | 61 | 43.5% | 33.5% |
| 28 | 71 | 44.2% | 33.8% |
| 38 | 80 | 47.2% | 34.3% |
| 49 | 90 | 48.9% | 34.5% |
| 63 | 99 | 50.3% | 34.9% |
| 78 | 109 | 50.5% | 34.8% |

FIG. 24. Graph 10: 1OF:1UF feed rate vs feed pressure. Dashed line at 45 gpm feed rate is manufacturer's recommended rate. Dashed line at 10 psig is manufacturer's recommended pressure.

FIG. 25. Graph 11: 1 OF:1 UF feed rate vs feed pressure. Dashed line at 45 gpm feed rate is manufacturer's recommended rate. Dashed line at 10 psig is manufacturer's recommended pressure.

Table 23 shows 2 parts OF to 1 part UF flow rate at varying psig feed and varying flow rate. The protein content in the OF continued to rise as the feed rate to the system increased. Table 23 and FIGS. 26-27, Graphs 12 and 13 show the results of the conditions applied.

TABLE 23

2:1 HC feed rate vs protein content.

| gpm feed | psig feed | % protein OF | % protein UF |
|---|---|---|---|
| 21.8 | 5 | 36.7% | 37.8% |
| 31.9 | 8 | 40.6% | 36.5% |
| 39.9 | 12 | 39.6% | 34.7% |
| 49.9 | 18 | 42.0% | 33.6% |
| 60 | 25 | 43.3% | 32.8% |
| 72 | 35 | 45.6% | 33.8% |
| 81 | 43 | 47.0% | 34.3% |
| 91 | 54 | 45.9% | 33.8% |
| 99 | 67 | 47.8% | 33.6% |
| 107 | 80 | 48.6% | 33.9% |

FIG. 26. Graph 12: 2OF:1UF feed rate vs feed pressure. Dashed line at 45 gpm feed rate is manufacturer's recommended rate. Dashed line at 10 psig is manufacturer's recommended pressure.

FIG. 27. Graph 13: 2 OF:1 UF feed rate vs feed pressure. Dashed line at 45 gpm feed rate is manufacturer's recommended rate.

Table 24 shows 3 parts OF to 1 part UF flow rate at varying psig feed and varying flow rate. The protein content in the OF continued to rise as the feed rate to the system increased. Table 24 and FIGS. 28-29, Graphs 14 and 15 show the results of the conditions applied.

TABLE 24

3:1 Feed rate vs protein

| psig feed | gpm feed | % protein OF | % protein UF |
|---|---|---|---|
| 5 | 20.8 | 39.8% | 37.8% |
| 8 | 30.3 | 38.3% | 36.2% |
| 12 | 39.5 | 39.1% | 34.7% |
| 19 | 50.6 | 40.3% | 32.8% |
| 26 | 60.7 | 41.7% | 32.0% |
| 34 | 69.0 | 41.1% | 31.2% |
| 54 | 89.2 | 43.0% | 31.2% |
| 79 | 107.0 | 41.0% | 31.3% |

FIG. 28. Graph 14: 3OF:1UF feed rate vs feed pressure. Dashed line at 45 gpm feed rate is manufacture's recommended rate. Dashed line at 10 psig is manufacturer's recommended pressure.

FIG. 29. Graph 15: 3OF:1UF feed rate vs feed pressure. Dashed line at 45 gpm feed rate is manufacturer's recommended rate.

Example 12

Over a period of several days a single bank hydrocyclone processed whole stillage at an ethanol plant in Kansas, USA running 100% grain sorghum as the raw material. Several weeks of measurements were provided to the inventor by the operations staff of the ethanol production facility. These measurements were averages from the operational records stored in the Distributed Control System (DCS) database for grain usage and whole stillage flow. The number of gallons of whole stillage per bushel processed to be calculated was calculated from this dataset. The density of the whole stillage was measured at the plant. Ratioing the whole stillage flow (converted to lbs per unit time mass) to bushels processed per unit time yielded 135.5 lbs whole stillage per bushel processed.

The hydrocyclone was operated at approximately 200% the manufacturer's recommended flow rate and the manufacturer's recommended grit pot was removed. These changes in operation were contrary to the manufacturer's recommendation but discovered by the inventor to provide the best purity of OF protein capture. The feed flow rate was measured every run and was approximately 95 gallons per minute. The OF flow rate was measured every run and UF flow rate was measured every run. The OF and UF were both captured and run through a decanter. The decanter was operated at 3000 g force. The decanter scroll vs conveyor differentional was 19 rpm when processing OF and 5 rpm when processing UF.

In processing the whole stillage through the hydrocyclone, the OF vs UF flow rate was varied and sampled several times. The flow rate was measured and recorded for all runs. The OF to UF rate was adjusted to discover the split performance for protein purity vs pounds per bushel yield estimate.

Capture OF and UF In order to determine the mass balance two empty vessels each complete with agitators were used. Whole stillage was processed through the hydroclone without grit pot and at approximately 200% the recommended flow rate. OF from the hydroclone was directed into vessel 1. UF from the hydroclone was directed into vessel 2. Once the whole stillage hyrocyclone run was finished the full weight of vessel 1 with agitator was taken on a pallet scale and recorded. Once the whole stillage hyrocyclone run was finished the full weight of vessel 2 with agitator was taken and on a pallet scale and recorded.

OF Processing:

Vessel 3 was weighed empty on a pallet scale and the weight recorded. Vessel 4 was weighed empty on a pallet scale and the weight recorded. A commercial decanter was setup. Vessel 3, was setup under the decater centrate outlet. Vessel 4, was setup under the decanter cake outlet.

Vessel 1 containing the OF was processed through the decanter. During processing the agitator was operated in vessel 1 to ensure homogeneous feed to the decanter. The decanter was operated at 3000 g with a 19 rpm scroll vs bowl differential. The centrate was recovered in vessel 3 and the decanter cake recovered in vessel 4. During the operation of the decanter slipstream samples of the decanter cake were taken. Moisture analysis of the decanter cake was made to get the dry solids content of the cake.

After the OF was finished being processed through the decanter, the empty weight of vessel 1 with agitator was recorded. The full weight of vessel 3 was recorded. The full weight of vessel 4 was recorded.

UF Processing:

The UF in vessel 2 was processed through the decanter. Vessel 5 was weighed empty on a pallet scale and the weight recorded. Vessel 6 was weighed empty on a pallet scale and the weight recorded. A commercial decanter was setup. Vessel 5, was setup under the decater centrate outlet. Vessel 6, was setup under the decanter cake outlet.

Vessel 2 containing the UF was processed through the decanter. During processing the agitator was operated in vessel 1 to ensure homogeneous feed to the decanter. The decanter was operated at 3000 g with a 5 rpm scroll vs bowl differential. The centrate was recovered in vessel 5 and the decanter cake recovered in vessel 6. During the operation of the decanter slipstream samples of the decanter cake were taken. Moisture analysis of the decanter cake was made with a moisture oven to get the dry solids content of the cake.

After the UF was finished processing through the decanter, the empty weight of vessel 2 with agitator was recorded. The full weight of vessel 5 was recorded. The full weight of vessel 6 was recorded.

All weights were entered into a spreadsheet along with the % dry matter determined on the samples taken. Using the mass into the system and the mass recovered from the decanter OF cake and the decanter UF cake the pounds per bushel yield was calculated. The error in the mass balance (mass into the system vs mass recovered from the system) was typically between 3.5 and 6%. Example calculations are shown in Table 25.

TABLE 25

Example Mass Balance and % protein calculations HC without grit pot. Weights in pounds.

| Vessel # | contents | Empty lbs | Full lbs | amount processed | % DM | dry lbs | lbs/bu DMB | % protein DMB | gpm |
|---|---|---|---|---|---|---|---|---|---|
| 1 | HC OF | 882 | 2950 | 2068 | | | | | 66.2 |
| 2 | HC UF | 460 | 1737 | 1277 | | | | | 29.4 |
| total lbs in | | | | 3345 | | | | | |
| bu processed (# in divided by 135.5 #/bu) | | | | 24.7 | | | | | |
| % OF/feed ratio | | | | | | | | | 69.2% |
| 3 | OF decanter centrate | 110 | 1796 | 1686 | | | | | |
| 4 | OF decanter cake | 129 | 456 | 327 | 25.15% | 82.2 | 3.32 | 49.44% | |
| 5 | UF decanter centrate | 129 | 933 | 804 | | | | | |
| 6 | UF decanter cake | 456 | 836 | 380 | 38.58% | 146.6 | 5.92 | 37.92% | |
| total lbs out | | | | 3197 | | | | | |
| in minus out | | | | 148 | | | | | |
| % error | | | | 4.4% | | | | | |

Table 25 shows a OF flow rate of 66.2 gpm and a UF flow rate of 29.4 gpm. Adding the OF and UF flows together produces 95.6 gpm feed rate. The OF flow divided by feed flow produces a ratio of 0.692 (0.692=66.2/95.6) or 69.2% OF/feed ratio. The protein content on a dry matter basis of the decanter cake recovered from the OF is 49.44% with a yield of 3.32 pounds per bushel on a dry matter basis. The protein content on a dry matter basis of the decanter cake recovered from the UF is 37.92% with a yield of 5.92 pounds per bushel on a dry matter basis.

The above experiment was repeated a number of times with Table 26 showing the results. There were aggregated samples taken from the following four conditions:

90 gpm feed, 80 gpm OF, 10 gpm UF produced 42.0% protein OF decanter cake 90 gpm feed, 70 gpm OF, 20 gpm UF produced 44.7% protein OF decanter cake 90 gpm feed, 60 gpm OF, 30 gpm UF produced 47.2% protein OF decanter cake 90 gpm feed, 45 gpm OF, 45 gpm UF produced 50.7% protein OF decanter cake The results teach that varying the OF to feed ratio one can change the lbs of protein rich material recovered per bushel. The results teach that varying the OF to feed ratio one can change the % protein content, on a dry matter basis, of the protein rich material recovered.

TABLE 26

Mass balance vs % protein in OF decanter cake. Whole stillage from 100% grain sorghum plant.

| feed rate | overflow | UF flow | % OF | output yield lb/bu | average % protein DMB per condition |
|---|---|---|---|---|---|
| 90.70 | 69.49 | 21.21 | 77% | 5.24 | |
| 90.70 | 45.50 | 45.20 | 50% | 2.72 | |
| 89.50 | 29.41 | 60.09 | 33% | 1.71 | |
| 91.70 | 82.38 | 9.32 | 90% | 6.23 | |
| 90.00 | 74.56 | 15.44 | 83% | 6.00 | |
| 90.20 | 78.71 | 11.49 | 87% | 6.32 | 42.0% |
| 90.10 | 78.90 | 11.20 | 88% | 6.70 | 42.0% |
| 90.00 | 78.22 | 11.78 | 87% | 6.27 | 42.0% |
| 90.00 | 81.93 | 8.07 | 91% | 5.73 | 42.0% |
| 90.40 | 69.35 | 21.05 | 77% | 5.07 | 44.7% |
| 91.50 | 70.68 | 20.82 | 77% | 5.08 | 44.7% |
| 90.10 | 69.42 | 20.68 | 77% | 4.99 | 44.7% |
| 90.10 | 69.69 | 20.41 | 77% | 5.12 | 44.7% |
| 90.30 | 70.86 | 19.44 | 78% | 5.35 | 44.7% |
| 91.20 | 58.87 | 32.33 | 65% | 4.29 | 47.2% |
| 91.40 | 60.91 | 30.49 | 67% | 4.00 | 47.2% |
| 89.30 | 61.06 | 28.24 | 68% | 4.26 | 47.2% |
| 90.10 | 60.91 | 29.19 | 68% | 4.19 | 47.2% |
| 90.80 | 60.83 | 29.97 | 67% | 4.06 | 47.2% |
| 91.30 | 61.32 | 29.98 | 67% | 4.09 | 47.2% |
| 89.50 | 43.67 | 45.83 | 49% | 2.69 | 50.7% |
| 90.70 | 42.56 | 48.14 | 47% | 2.27 | 50.7% |
| 90.90 | 42.44 | 48.46 | 47% | 2.65 | 50.7% |
| 89.70 | 43.19 | 46.51 | 48% | 2.58 | 50.7% |
| 89.10 | 42.60 | 46.50 | 48% | 2.47 | 50.7% |
| 90.00 | 43.20 | 46.80 | 48% | 2.55 | |
| 90.40 | 43.37 | 47.03 | 48% | 2.54 | |
| 89.50 | 43.15 | 46.35 | 48% | 2.53 | |
| 89.80 | 53.98 | 35.82 | 60% | 2.95 | |
| 89.30 | 57.71 | 31.59 | 65% | 4.05 | |

Graph 16 (FIG. 30) shows a graph of lbs per bushel vs % protein content in the OF decanter cake. The results teach that varying the OF to feed ratio one can change the lbs of protein rich material recovered per bushel. The results teach that varying the OF to feed ratio one can change the % protein content, on a dry matter basis, of the protein rich material recovered.

Example 13

Over a period of several days a single bank hydrocyclone processed whole stillage at an ethanol plant in Iowa, USA running 100% corn as the raw material. The hydrocyclone was operated at approximately 200% the manufacturer's recommended flow rate and the manufacturer's recommended grit pot was removed. These changes in operation were contrary to the manufacturers recommendation but discovered by the inventor to provide the best purity of OF protein capture. The feed flow rate was 90 gallons per minute, the OF1 and the UF1 flow rates were varied as shown below:

Feed 90 gpm, OF 80 gpm, UF 10 gpm; % OF/gpm feed=88.9%

Feed 90 gpm, OF 70 gpm, OF 20 gpm; % OF/gpm feed=77.8%

Feed 90 gpm, OF 65 gpm, UF 25 gpm; % OF/gpm feed=66.7%

Feed 90 gpm, OF 45 gpm, UF 45 gpm; % OF/gpm feed=50%

The conditions were varied and run a number of times. A mass balance was created using the same methodology of Example 12. Some runs had samples taken for % protein purity and some runs were completed for mass balance and some runs had both protein purity determined and mass balance determined. Table 27 shows the results from the work. Graph 17 (FIG. 31) shows protein purity vs lbs per bushel, DMB yield of the OF decanter solids.

The results teach that varying the OF to feed ratio one can change the lbs of protein rich material recovered per bushel. The results teach that varying the OF to feed ratio one can change the % protein content, on a dry matter basis, of the protein rich material recovered.

TABLE 27

Mass balance vs % protein in OF decanter cake. Whole stillage from 100% corn plant.

| % OF | lb/bu Decanter OF solids DMB | protein DMB | % OF | lb/bu HP DMB | protein DMB |
|---|---|---|---|---|---|
| 50.0% | | 49.3% | 77.8% | 4.44 | |
| 50.0% | | 50.4% | 77.8% | 4.85 | |
| 50.0% | | 50.2% | 77.8% | 4.41 | |
| 50.0% | 2.53 | | 77.8% | 4.61 | |
| 50.0% | 2.46 | 50.3% | 77.8% | 4.44 | 45.2% |
| 50.0% | 2.09 | 51.0% | 77.8% | 4.85 | 48.1% |
| 50.0% | 3.10 | 51.0% | 77.8% | 4.41 | 47.9% |
| 66.7% | | 52.1% | 77.8% | 4.61 | 47.4% |
| 66.7% | 3.89 | 51.8% | 77.8% | 4.69 | |
| 66.7% | 3.58 | 49.8% | 77.8% | 5.12 | |
| 72.2% | | 50.2% | 77.8% | 5.66 | |
| 72.2% | 4.19 | 50.7% | 77.8% | | 46.1% |
| 72.2% | 3.91 | 49.1% | 77.8% | | 41.5% |
| 77.8% | | 48.0% | 77.8% | | 46.1% |
| 77.8% | 4.23 | 49.6% | 77.8% | | 41.4% |
| 77.8% | 4.27 | 48.1% | 88.9% | | 40.6% |
| 77.8% | 4.44 | 46.0% | 88.9% | | 38.6% |
| 77.8% | 4.85 | 46.8% | 88.9% | | 41.1% |
| 77.8% | 4.41 | 46.6% | 88.9% | | 38.0% |
| 77.8% | 4.61 | 46.5% | 88.9% | | 39.6% |
| 77.8% | 4.44 | | 88.9% | 6.86 | 39.8% |
| 77.8% | 4.85 | | 88.9% | 6.30 | 37.7% |
| 77.8% | 4.41 | | 88.9% | 6.36 | 39.7% |
| 77.8% | 4.61 | | | | |

Example 14

Over a period of several days a single bank hydrocyclone processed whole stillage at an ethanol plant in Kansas, USA running 70% corn and 30% sorghum as the raw material. The hydrocyclone was operated at approximately 200% the manufacturer's recommended flow rate and the manufacturer's recommended grit pot was removed. These changes in operation were contrary to the manufacturers recommendation but discovered by the inventor to provide the best purity of OF protein capture. For each run the feed flow rate measured, the OF flow rate was measured and the UF flow rate was measured.

The conditions were varied and run a number of times. A mass balance was created using the same methodology of Example 12. Some runs had samples taken for % protein purity. All runs were completed for mass balance. Some runs had both protein purity determined and mass balance determined. Table 28 shows the results from the work. Graph 18 (FIG. 32) shows protein purity vs lbs per bushel, DMB yield of the OF decanter solids.

The results teach that varying the OF to feed ratio one can change the lbs of protein rich material recovered per bushel. The results teach that varying the OF to feed ratio one can change the % protein content, on a dry matter basis, of the protein rich material recovered.

TABLE 28

Mass balance vs % protein in OF decanter cake. 70% sorghum and 30% corn whole stillage.

| feed rate gpm | Overflow gpm | UF flow gpm | % OF | output yield lb/bu | % protein DMB |
|---|---|---|---|---|---|
| 91.60 | 29.80 | 61.80 | 33% | 1.92 | 48.4% |
| 90.70 | 31.16 | 59.54 | 34% | 1.77 | |
| 89.50 | 38.44 | 51.06 | 43% | 1.74 | |
| 89.90 | 48.80 | 41.10 | 54% | 3.01 | |
| 89.70 | 54.76 | 34.94 | 61% | 3.94 | |
| 89.40 | 68.75 | 20.65 | 77% | 5.71 | |
| 90.80 | 78.93 | 11.87 | 87% | 7.59 | 37.7% |
| 90.60 | 44.74 | 45.86 | 49% | 2.62 | |
| 88.30 | 43.76 | 44.54 | 50% | 3.12 | 45.8% |
| 87.40 | 45.88 | 41.52 | 52% | 2.96 | |
| 87.40 | 43.80 | 43.60 | 50% | 2.77 | |
| 89.90 | 46.18 | 43.72 | 51% | 3.08 | |
| 88.50 | 45.48 | 43.02 | 51% | 2.83 | |
| 89.40 | 58.06 | 31.34 | 65% | 4.15 | |
| 89.70 | 59.25 | 30.45 | 66% | 4.56 | |
| 91.00 | 61.63 | 29.37 | 68% | 4.57 | |
| 90.30 | 59.20 | 31.10 | 66% | 4.26 | |
| 89.60 | 58.93 | 30.67 | 66% | 5.17 | 43.4% |
| 90.20 | 67.77 | 22.43 | 75% | 5.98 | |
| 90.30 | 76.30 | 14.00 | 84% | 5.53 | |
| 90.40 | 62.99 | 27.41 | 70% | 5.98 | |
| 90.10 | 69.63 | 20.47 | 77% | 6.15 | 41.3% |
| 90.50 | 78.03 | 12.47 | 86% | 7.79 | |
| 91.30 | 82.52 | 8.78 | 90% | 8.14 | |
| 81.43 | 81.43 | — | 100% | 8.33 | |
| 90.30 | 90.30 | — | 100% | 10.19 | |
| 90.50 | 90.50 | — | 100% | 10.34 | |
| 90.50 | 90.50 | — | 100% | 8.76 | |

Example 15

A ethanol plant running on corn (Zea maize) with a 2.81 anhydrous gallons of ethanol per bushel yield generally has about 14.5 lbs DMB unfermented material remaining for distiller's type products. The most common plant today splits this into approximately 9.4 lbs decanter cake, 4.3 lbs CCDS and 0.8 lbs oil.

Using the new methods and systems of this disclosure, a new high protein fraction can be recovered. This new higher protein fraction provided by the subject methods has a practical yield potential of 1 to 7.5 lbs per bushel, as examples 12, 13, 14 demonstrate. Table 29 shows the range of yield potential that can be obtained using the new methods of this disclosure at a facility getting 2.81 anhydrous gallons per bushel ethanol yield.

TABLE 29

Pounds per bushel produced on a dry matter basis of products produced using the subject methods versus prior art method. All materials are reported on a dry matter basis.

| | product(s) | lbs/bu (DMB) | |
|---|---|---|---|
| Prior art method | Decanter cake | 9.43 | |
| | condensed solubles (CCDS) | 4.28 | |
| | oil | 0.8 | |

| | | lbs/bushel DMB range | |
|---|---|---|---|
| New method of this disclosure | | low protein yield | high protein yield |
| | high protein fraction (40 to 60% protein) | 1 | 7.5 |
| | high fiber fraction (20 to 34% protein) | 8.43 | 1.93 |
| | oil | 0.7 | 1.3 |
| | solubles (CCDS) | 4.38 | 3.78 |

Example 16

Over a period of several days whole stillage was processed at an ethanol plant in Iowa, USA running 100% corn (Zea maize) as the raw material. The hydrocyclone was operated at approximately 200% the manufacturer's recommended flow rate and the manufacturer's recommended grit pot was removed. These changes in operation were contrary to the manufacturer's recommendation but discovered by the inventor to provide the best purity of OF protein capture. The feed flow rate was measured every run and was approximately 90 gallons per minute. The OF flow rate was measured at approximately 60 gpm, and UF flow rate was measured at approximately 30 gpm. The testing was performed to reproduct the three hydroclone bank shown in FIG. 12.

Whole stillage processing. Whole stillage (FIG. 12, 100) was processed through the hydrocyclone (FIG. 12, 112), the OF1 (FIG. 12, 151) was captured in an empty vessel equipped with an agitator and UF1 (FIG. 12, 122) was captured in an empty vessel equipped with an agitator.

OF1 processing. After whole stillage processing was finished, the OF1 (FIG. 12, 151) material was continuously agitated and it was processed through the hydrocyclone to demonstrate HC2 performance (FIG. 12, 233). The resulting OF2 (FIG. 12, 158) and UF2 (FIG. 12, 124) were captured in empty vessels.

UF1 processing. After the OF1 processing was finished, the UF1 (FIG. 12, 122) material was continuously agitated and it was processed through the hydrocyclone to demonstrate HC3 performance (FIG. 12, 232). The resulting OF3 (FIG. 12, 125) and UF3 (FIG. 12, 123) were captured in empty vessels.

Sampling and analysis. During the operation of the hydrocyclone representative samples were taken from each of the streams (see Table 30). Samples were taken of 100, 151, 122, 158, 124, 125, and 123, as depicted in FIG. 12. These samples were taken from mid-stream processing after the hydrocyclone had reached steady-state operation. The samples were processed in bucket laboratory centrifuge spun at 3000 g for 5 minutes. The supernatant was discarded and the pellet recovered analyzed for protein, neutral detergent fiber, fat and ash by commercial laboratory. Results from the analysis are shown in Table 30.

TABLE 30

Composition of pellets recovered by laboratory centrifuge of different flows on a multiple hydrocyclone system processing Whole Stillage from 100% corn. Components reported on a dry matter basis.

| See FIG. 12 | % protein | % NDF | % fat | % ash |
|---|---|---|---|---|
| 158 lab pellet | 46.7% | 20.5% | 13.4% | 4.8% |
| 124 lab pellet | 36.1% | 30.4% | 15.5% | 3.3% |
| 151 lab pellet | 38.7% | 27.8% | 14.9% | 3.1% |
| 100 lab pellet | 33.8% | 39.8% | 12.4% | 3.0% |
| 122 lab pellet | 26.4% | 45.4% | 12.1% | 3.2% |
| 123 lab pellet | 25.0% | 49.5% | 10.7% | 2.7% |
| 125 lab pellet | 29.7% | 41.1% | 11.4% | 3.3% |

As can be seen from the testing, each OF material has higher protein and lower fiber than the feed to the HC. It is apparent that recycling UF2 (124) back into HC1 (112) allows the opportunity to capture protein through the HC1 (112) and transfer that protein preferentially into the 151 flow, further increasing the protein concentration and protein yield in 170. This recycling also offers the opportunity for the 112 unit to recover more fiber into the 122 flow further increasing the fiber concentration and quantity recovered in 160.

It is apparent that recycling OF3 (125) back into HC1 (112) allows the opportunity to capture protein through the HC1 (112) and transfer that protein preferentially into the 151 flow, further increasing the protein concentration and yield in 170. This recycling also offers the opportunity for the 112 unit to recover more fiber into the 122 flow further increasing the fiber concentration and quantity recovered in 160.

Example 17

Over a period of several days whole stillage was processed at an ethanol plant in Iowa, USA running 100% corn (*Zea maize*) as the raw material. The hydrocyclone was operated at approximately 200% the manufacturer's recommended flow rate and the manufacturer's recommended grit pot was removed. These changes in operation were contrary to the manufacturer's recommendation but discovered by the inventor to provide the best purity of OF protein capture. The feed flow rate was measured every run and was approximately 90 gallons per minute. The OF flow rate was measured at approximately 60 gpm, and UF flow rate was measured at approximately 30 gpm. The testing was performed to reproduct the three hydroclone bank with optional wash fluid addition as shown in FIG. 33.

Whole stillage processing. Whole stillage (FIG. 33, 100) was processed through the hydrocyclone (FIG. 33, 112), the OF1 (FIG. 33, 151) and UF1 (FIG. 33, 122) were captured in empty vessels with each vessel equipped with an agitator. Samples were taken from the whole stillage flow and from the well agitated vessels and processed through the laboratory centrifuge before being analyzed (see Table 31). These samples were taken before wash fluid was added.

OF1 processing. After whole stillage processing was finished, one mass unit of the ethanol plants evaporator process condensate (wash fluid) (FIG. 33, 300) was added per mass unit of the OF1 material (FIG. 33, 151). The combined material was continuously agitated as it was processed through the hydrocyclone to demonstrate HC2 performance under wash addition (FIG. 33, 233). The resulting OF2 (FIG. 33, 158) and UF2 (FIG. 33, 124) were captured in empty vessels and representative samples taken for laboratory centrifuge processing and analysis.

UF1 processing. After the OF1 processing was finished, one mass unit of the plants process condensate (wash fluid) (FIG. 33, 301) was added per mass of the UF1 material (FIG. 33, 122). The combined material was continuously agitated as it was processed through the hydrocyclone to demonstrate HC3 performance (FIG. 33, 232). The resulting OF3 (FIG. 33, 125) and UF3 (FIG. 33, 123) were captured in empty vessels. Representative samples were taken for laboratory centrifuge processing and analysis.

Sampling and analysis. During the operation of the hydrocyclone representative samples were taken from each of the streams (see Table 31). Samples were taken of 100, 151, 122, 158, 124, 125, and 123, as depicted in FIG. 33. These samples were taken from mid-stream processing after the hydrocyclone had reached steady-state operation or in well-agitated vessels after hydrocyclone processing had finished. The samples were processed in bucket laboratory centrifuge spun at 3000 g for 5 minutes. The supernatant was discarded and the pellet recovered analyzed for protein, neutral detergent fiber, fat and ash by external commercial laboratory. Results from the analysis are shown in Table 31.

TABLE 31

Composition of pellets recovered by laboratory centrifuge of different flows on a multiple hydrocyclone system using wash fluid processing Whole Stillage from 100% corn as depicted in FIG. 33. Components reported on a dry matter basis.

| See FIG. 33 | % protein | % NDF | % fat | % ash |
|---|---|---|---|---|
| 158 lab pellet | 51.8% | 32.2% | 10.5% | 3.3% |
| 124 lab pellet | 41.9% | 35.8% | 12.0% | 2.9% |
| 151 lab pellet | 42.7% | 24.9% | 13.5% | 3.4% |
| 100 lab pellet | 34.2% | 34.6% | 12.2% | 3.4% |
| 122 lab pellet | 26.7% | 47.9% | 11.2% | 3.3% |
| 123 lab pellet | 26.4% | 56.7% | 8.3% | 1.8% |
| 125 lab pellet | 50.0% | 20.7% | 12.0% | 3.6% |

As can be seen from the testing, each OF material has higher protein and lower fiber than the feed to the HC. The use of wash fluid further increases the protein concentration in the OF portion compared to the non-wash fluid process (Example 16, Table 30). It is apparent that recycling UF2 (124) back into HC1 (112) allows the opportunity to capture protein through the HC1 (112) and transfer that protein preferentially into the 151 flow, further increasing the protein concentration and protein yield in 170. This recycling also offers the opportunity for the 112 unit to recover more fiber into the 122 flow further increasing the fiber concentration and quantity recovered in 160.

It is apparent that recycling OF3 (125) back into HC1 (112) allows the opportunity to capture protein through the HC1 (112) and transfer that protein preferentially into the 151 flow, further increasing the protein concentration and yield in 170. This recycling also offers the opportunity for the 112 unit to recover more fiber into the 122 flow further increasing the fiber concentration and quantity recovered in 160.

Example 18

Over a period of several days whole stillage was processed at an ethanol plant in Kansas, USA running 100% grain sorghum as the raw material. The hydrocyclone was operated at approximately 200% the manufacturer's recommended flow rate and the manufacturer's recommended grit pot was removed. These changes in operation were contrary to the manufacturer's recommendation but discovered by the inventor to provide the best purity of OF protein capture. The feed flow rate was measured every run and was approximately 90 gallons per minute. The OF flow rate was measured at approximately 60 gpm, and UF flow rate was measured at approximately 30 gpm. The testing was performed to reproduct the three hydroclone bank shown in FIG. 12.

Whole stillage processing. Whole stillage (FIG. 12, 100) was processed through the hydrocyclone (FIG. 12, 112), the OF1 (FIG. 12, 151) was captured in an empty vessel equipped with an agitator and UF1 (FIG. 12, 122) was captured in an empty vessel equipped with an agitator.

OF1 processing. After whole stillage processing was finished, the OF1 (FIG. 12, 151) material was continuously agitated and it was processed through the hydrocyclone to demonstrate HC2 performance (FIG. 12, 233). The resulting OF2 (FIG. 12, 158) and UF2 (FIG. 12, 124) were captured in empty vessels.

UF1 processing. After the OF1 processing was finished, the UF1 (FIG. 12, 122) material was continuously agitated and it was processed through the hydrocyclone to demonstrate HC3 performance (FIG. 12, 232). The resulting OF3 (FIG. 12, 125) and UF3 (FIG. 12, 123) were captured in empty vessels.

Sampling and analysis. During the operation of the hydrocyclone representative samples were taken from each of the streams (see Table 30). Samples were taken of 100, 151, 122, 158, 124, 125, and 123, as depicted in FIG. 12. These samples were taken from mid-stream processing after the hydrocyclone had reached steady-state operation. The samples were processed in bucket laboratory centrifuge spun at 3000 g for 5 minutes. The supernatant was discarded and the pellet recovered analyzed for protein, neutral detergent fiber, fat and ash by commercial laboratory. Results from the analysis are shown in Table 32.

TABLE 32

Composition of pellets recovered by laboratory centrifuge of different flows on a multiple hydrocyclone system processing Whole Stillage from 100% grain sorghum as depicted in FIG. 12. Components reported on a dry matter basis.

| See FIG. 12 | % protein | % NDF | % fat |
|---|---|---|---|
| 158 lab pellet | 49.3% | 22.7% | 11.5% |
| 124 lab pellet | 40.2% | 37.6% | 6.2% |
| 151 lab pellet | 44.3% | 31.0% | 15.4% |
| 100 lab pellet | 40.0% | 36.1% | 9.8% |
| 122 lab pellet | 35.1% | 38.6% | 14.7% |
| 123 lab pellet | 33.2% | 42.6% | 11.7% |
| 125 lab pellet | 37.6% | 34.4% | 16.1% |

As can be seen from the testing, each OF material has higher protein and lower fiber than the feed to the HC. It is apparent that recycling UF2 (124) back into HC1 (112) allows the opportunity to capture protein through the HC1 (112) and transfer that protein preferentially into the 151 flow, further increasing the protein concentration and protein yield in 170. This recycling also offers the opportunity for the 112 unit to recover more fiber into the 122 flow further increasing the fiber concentration and quantity recovered in 160.

It is apparent that recycling OF3 (125) back into HC1 (112) allows the opportunity to capture protein through the HC1 (112) and transfer that protein preferentially into the 151 flow, further increasing the protein concentration and yield in 170. This recycling also offers the opportunity for the 112 unit to recover more fiber into the 122 flow further increasing the fiber concentration and quantity recovered in 160.

Example 19

Over a period of several days whole stillage was processed at an ethanol plant in Kansas, USA running grain sorghum as the raw material. The hydrocyclone was operated at approximately 200% the manufacturer's recommended flow rate and the manufacturer's recommended grit pot was removed. These changes in operation were contrary to the manufacturer's recommendation but discovered by the inventor to provide the best purity of OF protein capture. The feed flow rate was measured every run and was approximately 90 gallons per minute. The OF flow rate was measured at approximately 60 gpm, and UF flow rate was measured at approximately 30 gpm. The testing was performed to reproduce the three hydroclone bank with optional wash fluid addition as shown in FIG. 33.

Whole stillage processing. Whole stillage (FIG. 33, 100) was processed through the hydrocyclone (FIG. 33, 112), the OF1 (FIG. 33, 151) and UF1 (FIG. 33, 122) were captured in empty vessels with each vessel equipped with an agitator. Samples were taken from the whole stillage flow and from the well agitated vessels and processed through the laboratory centrifuge before being analyzed (see Table 33). These samples were taken before wash fluid was added.

OF1 processing. After whole stillage processing was finished, one mass unit of the ethanol plants evaporator process condensate (wash fluid) (FIG. 33, 300) was added per mass unit of the OF1 material (FIG. 33, 151). The combined material was continuously agitated as it was processed through the hydrocyclone to demonstrate HC2 performance under wash addition (FIG. 33, 233). The resulting OF2 (FIG. 33, 158) and UF2 (FIG. 33, 124) were captured in empty vessels and representative samples taken for laboratory centrifuge processing and analysis.

UF1 processing. After the OF1 processing was finished, one mass unit of the plants process condensate (wash fluid) (FIG. 33, 301) was added per mass of the UF1 material (FIG. 33, 122). The combined material was continuously agitated as it was processed through the hydrocyclone to demonstrate HC3 performance (FIG. 33, 232). The resulting OF3 (FIG. 33, 125) and UF3 (FIG. 33, 123) were captured in empty vessels. Representative samples were taken for laboratory centrifuge processing and analysis.

Sampling and analysis. During the operation of the hydrocyclone representative samples were taken from each of the streams (see Table 33). Samples were taken of 100, 151, 122, 158, 124, 125, and 123, as depicted in FIG. 33. These samples were taken from mid-stream processing after the hydrocyclone had reached steady-state operation or in well-agitated vessels after hydrocyclone processing had finished. The samples were processed in bucket laboratory centrifuge spun at 3000 g for 5 minutes. The supernatant was discarded and the pellet recovered analyzed for protein, neutral detergent fiber, fat and ash by external commercial laboratory. Results from the analysis are shown in Table 33.

TABLE 33

Composition of pellets recovered by laboratory centrifuge of different flows on a multiple hydrocyclone system using wash fluid processing Whole Stillage from 100% sorghum as depicted in FIG. 33. Components reported on a dry matter basis.

| See FIG. 33 | % protein | % NDF | % fat |
|---|---|---|---|
| 158 lab pellet | 51.4% | 30.7% | 14.5% |
| 124 lab pellet | 42.5% | 36.8% | 4.5% |
| 151 lab pellet | 43.6% | 33.4% | 14.4% |
| 100 lab pellet | 39.0% | 35.0% | 14.7% |
| 122 lab pellet | 35.1% | 38.6% | 14.7% |
| 123 lab pellet | 33.9% | 44.8% | 12.0% |
| 125 lab pellet | 52.3% | 25.8% | 9.2% |

As can be seen from the testing, each OF material has higher protein and lower fiber than the feed to the HC. The use of wash fluid further increases the protein concentration in the OF portion compared to the non-wash fluid process (Example 18, Table 32). It is apparent that recycling UF2 (124) back into HC1 (112) allows the opportunity to capture protein through the HC1 (112) and transfer that protein preferentially into the 151 flow, further increasing the protein concentration and protein yield in 170. This recycling also offers the opportunity for the 112 unit to recover more fiber into the 122 flow further increasing the fiber concentration and quantity recovered in 160.

It is apparent that recycling OF3 (125) back into HC1 (112) allows the opportunity to capture protein through the HC1 (112) and transfer that protein preferentially into the 151 flow, further increasing the protein concentration and yield in 170. This recycling also offers the opportunity for the 112 unit to recover more fiber into the 122 flow further increasing the fiber concentration and quantity recovered in 160.

Example 20

Over a period of several months whole stillage was processed from a variety of ethanol plants. These individual ethanol plants had different mixes of raw grain ingredients with 100% grain sorghum, a mix of grain sorghum and corn (*Zea maize*), and 100% corn (*Zea maize*) as the raw material. The whole stillage from these individual plants were processed with a hydrocyclone that was operated at approximately 200% the manufacturer's recommended flow rate and the manufacturer's recommended grit pot was removed. These changes in operation were contrary to the manufacturer's recommendation but discovered by the inventor to provide the best purity of OF protein capture.

The feed flow rate was measured every run and was approximately 90 gallons per minute. The OF flow rate was adjusted at each location to produce a protein purity in the OF of between 42% to 48% on a dry matter basis. The OF captured at each facility was put into a vessel with an agitator. That agitator was operated to keep the OF homogenized and the OF processed through a commercial, horizontal bowl decanter as described in Example 12. Thousands of pounds of wet decanter cake (Substantial quantities of material was recovered from each facility and dried at a commercial style drum dryer. This drum dryer was manufactured by ICM, Inc. and is a steam tube dryer with serial number 00000073. FIG. 34 shows the flow path demonstrated with this work. The dryer, 42, was operated by the pilot dryer staff and they reported no difficulty drying the high protein material and making dry product with good color and quality from the 170 material as shown in FIG. 34. After the first drying trial running OF1 from 100% corn the professional staff that operate the dryer reported "your material has shown excellent qualities of not fouling the tubes".

Results from protein from processing whole stillage with 100% corn (*Zea maize*) as the raw material is shown in Table 34.

TABLE 34

Commercial analysis of OF1 decanter cake (FIG. 34, 170) after it had been processed through a steam tube dryer (FIG. 34, 42).

| Raw Material Whole Stillage from 100% corn | dry basis | as received | Units |
|---|---|---|---|
| Moisture By Vacuum Oven | | 4.79 | % |
| Dry Matter | | 95.21 | % |
| Protein, Crude | 47.88 | 45.59 | % |
| Fiber, Crude | 6.41 | 6.1 | % |
| NEL: Net Energy-Lactation | 0.95 | 0.9 | Mcal/lb |
| NEG: Net Energy-Gain | 0.73 | 0.69 | Mcal/lb |
| NEM: Net Energy-Maintenance | 1.06 | 1 | Mcal/lb |
| TDN: Total Digestible Nutrients | 90.09 | 85.78 | % |
| Fat (EE) | 10.97 | 10.44 | % |
| Ash | 3.19 | 3.04 | % |
| NFE-Nitrogen Free Extract | 31.55 | 30.04 | % |
| Calcium | 0.03 | 0.03 | % |
| Phosphorus | 0.64 | 0.61 | % |
| Sulfur | 0.76 | 0.72 | % |
| Total Starch | 1.7 | 1.6 | % |
| Aflatoxin | | Less than 5 | ppb |
| Vomitoxin | | 0.8 | ppm |

Results from protein from processing whole stillage with 100% grain sorghum as the raw material is shown in Table 35.

TABLE 35

Commercial analysis of OF1 decanter cake (FIG. 34, 170) after it had been processed through a steam tube dryer (FIG. 34, 42).

| Raw Material Whole Stillage from 100% grain sorghum | dry basis | as received | Units |
|---|---|---|---|
| Moisture By Vacuum Oven | | 11.95 | % |
| Dry Matter | | 88.05 | % |
| Protein, Crude | 46.27 | 40.74 | % |
| Fiber, Crude | 9.2 | 8.1 | % |
| NEL: Net Energy-Lactation | 0.92 | 0.81 | Mcal/lb |
| NEG: Net Energy-Gain | 0.69 | 0.61 | Mcal/lb |
| NEM: Net Energy-Maintenance | 1.02 | 0.9 | Mcal/lb |
| TDN: Total Digestible Nutrients | 87.5 | 77.04 | % |
| Fat (EE) | 9.69 | 8.53 | % |
| Ash | 2.98 | 2.62 | % |
| NFE-Nitrogen Free Extract | 31.86 | 28.05 | % |
| Calcium | 0.04 | 0.04 | % |
| Phosphorus | 0.51 | 0.45 | % |
| Sulfur | 0.65 | 0.57 | % |
| Total Starch | 1.7 | 1.5 | % |
| Aflatoxin | | 8.4 | ppb |
| Vomitoxin | | Less than 0.5 | ppm |

Results from protein from processing whole stillage with 70% corn (*Zea maize*) and 30% grain sorghum as the raw material is shown in Table 36.

TABLE 36

Commercial analysis of OF1 decanter cake (FIG. 34, 170) after it had been processed through a steam tube dryer (FIG. 34, 42).

| Raw Material Whole Stillage from 70% corn 30% grain sorghum | dry basis | as received | Units |
|---|---|---|---|
| Moisture By Vacuum Oven | | 12.21 | % |
| Dry Matter | | 87.79 | % |
| Protein, Crude | 46.05 | 40.43 | % |
| Fiber, Crude | 7.97 | 7 | % |
| NEL: Net Energy-Lactation | 0.92 | 0.81 | Mcal/lb |
| NEG: Net Energy-Gain | 0.7 | 0.62 | Mcal/lb |
| NEM: Net Energy-Maintenance | 1.03 | 0.9 | Mcal/lb |
| TDN: Total Digestible Nutrients | 87.98 | 77.24 | % |
| Fat (EE) | 10.46 | 9.18 | % |
| Ash | 3.74 | 3.28 | % |
| NFE-Nitrogen Free Extract | 31.78 | 27.9 | % |
| Calcium | 0.03 | 0.03 | % |
| Phosphorus | 0.58 | 0.51 | % |
| Sulfur | 0.63 | 0.55 | % |
| Total Starch | 1.8 | 1.6 | % |
| Aflatoxin | | 7.4 | ppb |
| Vomitoxin | | Less than 0.5 | ppm |

Example 21

Protein produced from Example 20 using 100% corn (Table 34) was analyzed for digestibility using the precision-fed cecectomized rooster assay. This work was performed by professional university staff at the University of Illinois at Urbana-Champaign, Urbana Ill. research facility. The protein analyzed was a sample from the material represented by Table 34, Example 20. The assay conditions are detailed in Parsons, C. M. 1985. Influence of caecectomy of digestibility of amino acids by roosters fed distillers' dried grains with solubles. J. Agric. Sci. 104:469-472. During the assay the material was analyzed in duplicate and detailed in Tables 37 and 38.

Results from the assay show better than average digestibility of key amino acids, such as lysine. In addition to the protein concentration being substantially higher in the material recovered with the process the digestibility of key amino acids is higher than traditional DDGS (FIG. 1). Analysis by the university staff stated "lysine digestibility is approximately 85% which is quite a bit higher than the normal 65% typical DDGS". Table 37 shows the true amino acid digestibility of the material.

TABLE 37

True amino acid digestibility's (%) of dried distillers' sample. Material analyzed on an "as-is" basis. See Table 34 for chemical analysis of material.

| Amino Acid | Trial #1 | Trial #2 |
|---|---|---|
| ASP | 86.55 | 83.08 |
| THR | 87.71 | 84.74 |
| SER | 88.65 | 86.55 |
| GLU | 93.18 | 91.56 |
| PRO | 91 | 88.89 |
| ALA | 92.62 | 91.3 |
| CYS | 86.46 | 80.22 |
| VAL | 89.38 | 87.55 |
| MET | 93.11 | 92.17 |
| ILE | 91.85 | 90.37 |
| LEU | 94.52 | 93.25 |
| TYR | 93.15 | 91.93 |
| PHE | 93.09 | 91.83 |
| LYS | 85.17 | 83.39 |
| HIS | 89.55 | 87.89 |

TABLE 37-continued

True amino acid digestibility's (%) of dried distillers' sample. Material analyzed on an "as-is" basis. See Table 34 for chemical analysis of material.

| Amino Acid | Trial #1 | Trial #2 |
|---|---|---|
| ARG | 93.8 | 92.27 |
| TRP | 86.78 | 87.53 |

Table 38 shows the true metabolizable energy of the material.

TABLE 38

True metabolizable energy evaluation. See Table 34 for chemical analysis of material.

| Trial | Dry Matter % | Feed Gross Energy as-is (kcal/g) | $TME_n$ (kcal/g DM) |
|---|---|---|---|
| #1 | 93.7 | 5.677 | 3.699 |
| #2 | 89.5 | 5.281 | 3.631 |

LIST OF REFERENCE NUMERALS

The following reference numerals will be provided to facilitate an understanding and examination of the present disclosure and is not exhaustive. Provided it is possible to do so, elements identified list of by a numeral may be replaced or used in combination with any elements identified by a separate numeral. Additionally, numerals are not limited to the descriptors provided herein and include equivalent structures and other objects possessing the same function.

Modified hydrocyclone=hydrocyclone without a grit pot
NDF=Neutral Detergent Fiber
10 whole stillage tank
12 2-phase decanting centrifuge
14 32 to 42% solids (cake)
18 backset
19 thin stillage tank
20 Evaporator Feed
32 optional oil recovery process
34 oil for sale, expect 0.6 to 1.4 lb/bu
36 distillation process
37 syrup tank
38 evaporator condensate
40 DWGS/fiber enriched distillers for sale
42 optional drying for DDGS/fiber enriched
110 HC1
111 HC1
112 HC1
120 UF 1
121 UF 1
122 UF 1
123 UF 3
124 UF 2
125 OF 3
126 OF 4
128 UF 5
129 UF 4
130 2-phase decanting centrifuge(s)—fiber enriched
150 OF 1
151 OF 1
152 screen with optional washing device
140 2-phase decanting centrifuge(s)—protein enriched 154 higher protein, lower oil
156 lower protein, higher oil
158 OF 2
160 32% to 42% solids (cake)
170 25% to 25% solids (cake)
180 Centrate 1
200 Centrate 2
220 optional fluid wash source(s)
230 HC2
231 HC2
232 HC3
233 HC2
234 HC4
235 HC5
240 OF 2
241 OF 2
260 UF 2
261 UF 2
340 disc-style centrifuge The present disclosure is not to be limited to the particular embodiments described herein. The following claims set forth a number of the embodiments of the present disclosure with greater particularity.

What is claimed is:

1. A process for fractionating whole stillage, comprising:
    (a) separating whole stillage using one or more first pass hydrocyclones lacking a grit pot under conditions sufficient to produce a first protein enriched overflow stream and a first protein depleted underflow stream;
    conveying the first protein enriched overflow stream from the one or more first pass hydrocyclones to one or more second pass hydrocyclones of equal or smaller diameter to produce a second protein enriched overflow stream comprising concentrated protein particles that are smaller on average relative to particles of the first protein enriched overflow stream; optionally
    conveying the first protein depleted underflow stream from the one or more first pass hydrocyclones to one or more subsequent hydrocyclones of equal or smaller diameter to produce a second protein depleted underflow stream comprising concentrated fiber particles that are larger on average relative to fiber particles of the first protein depleted underflow stream; and the process comprising:
    (b) dewatering the second protein enriched overflow stream using a centrifuge to recover a first protein enriched fraction comprising 40% to 60% protein on a dry weight basis.

2. The process of claim 1, comprising conveying the first protein depleted underflow stream from the one or more first pass hydrocyclones to one or more subsequent hydrocyclones of equal or smaller diameter to produce a second protein depleted underflow stream comprising concentrated fiber particles that are larger on average relative to fiber particles of the first protein depleted underflow stream; and further comprising:
    dewatering the second protein depleted underflow stream using a centrifuge to recover a second protein depleted fraction comprising 20 to 34% protein on a dry weight basis,
    wherein the second protein enriched overflow stream and the second protein depleted underflow stream each comprise suspended solid particles.

3. The process of claim 2, wherein a centrate from the second protein enriched overflow stream is recovered by the centrifuge that is substantially reduced in suspended solids relative to a plant thin stillage.

4. The process of claim 2, wherein the process comprises a stillage clarification process that produces:
    between one and seven and one half pounds per bushel of the first protein enriched fraction;
    between two and eight and one half pounds per bushel of the second protein depleted fraction; and
    a third fraction of between 74% and 100% concentration of bio-oil and bio-oil degradation products recovered from streams passing through a further hydrocyclone and a further centrifuge; and/or
    a fourth fraction concentrated in solubles concentrated by a process evaporator.

5. The process of claim 1, wherein the one or more first pass hydrocyclones are operated at an overflow flow rate that is less than three times the underflow flow rate.

6. The process of claim 1, wherein the one or more first pass hydrocyclones are operated at an overflow flow rate that is greater than the underflow flow rate.

7. The process of claim 1, wherein the one or more first pass hydrocyclones are operated at a high feed pressure of 12 psig or more.

8. The process of claim 1, wherein the one or more first pass hydrocyclones form a single pass hydrocyclone bank.

9. The process of claim 1, wherein the separating step is performed using three hydrocyclones each lacking a grit pot that are fluidically configured together to produce the first and second protein enriched overflow streams and the first and second protein depleted underflow streams.

10. The process of claim 1, wherein the first protein enriched overflow stream and the first protein depleted underflow stream each comprise suspended solid particles, the method further comprising, after the separating step and before the dewatering steps, filtering the second protein enriched overflow stream.

11. The process of claim 10, wherein the filtering is performed under conditions sufficient to produce an at least partially clarified protein enriched overflow stream having an enriched protein concentration and/or increased protein yield relative to a protein enriched overflow stream that has not been filtered.

12. The process of claim 11, wherein the filtering is performed using a washing filtration system that washes the second protein enriched overflow stream.

13. The process of claim 12, wherein:
    the one or more first pass hydrocyclones and one or more second pass hydrocyclones are operative such that for each of the respective one or more first pass hydrocyclones and one or more second pass hydrocyclones; the first and second pass hydrocyclones operative such that decreasing the hydrocyclone overflow rate relative to the hydrocyclone underflow rate increases the protein content in the first or second protein enriched overflow stream and increases the amount of protein of the first protein enriched fraction; and
    the filtering reduces a fat content of the first protein enriched fraction.

14. The process of claim 1, wherein the centrifuge is a decanting centrifuge.

15. The process of claim 1, wherein the centrifuge is a disc-style centrifuge.

16. The process of claim 1, wherein before the dewatering of the second protein enriched overflow stream, filtering the second protein enriched overflow stream using a paddle screening device.

17. The process of claim 16, wherein filtering the second protein enriched overflow stream removes large particles from the second protein enriched overflow stream, and wherein the large particles are ground through a grinding device.

18. The process of claim 1, wherein the process further comprises, grinding the first or second protein depleted underflow stream or the first or second protein enriched overflow stream with a grinding device.

19. A process for fractionating whole stillage, comprising:
(a) separating whole stillage using one or more hydrocyclones lacking a grit pot under conditions sufficient to produce a protein enriched overflow stream and a protein depleted underflow stream;
(b) dewatering the protein enriched overflow stream using a centrifuge to recover a first protein enriched fraction comprising 40% to 60% protein on a dry weight basis;
(c) dewatering the protein depleted underflow stream using a centrifuge to recover a second protein depleted fraction comprising 20 to 34% protein on a dry weight basis, wherein the protein enriched overflow stream and the protein depleted underflow stream each comprise suspended solid particles; and
(d) removing, as a suspension or solution, water soluble components and/or water insoluble components from an enriched fiber feed stream separated from the protein depleted fraction, relative to the protein enriched fraction, using a process evaporator condensate,
wherein removing the water soluble components and/or the water insoluble components from the protein depleted fraction produces an animal feed that is higher in fiber purity relative to the protein depleted fraction before the removing step of the process.

20. The process of claim 19, further comprising moving the water soluble components and/or the water insoluble components removed from the enriched fiber feed stream separated from the protein depleted fraction, relative to the protein enriched fraction, into an oil recovery and high purity protein recovery process to produce fractions of oil and/or protein volume.

21. A process for fractionating whole stillage, comprising:
separating whole stillage using one or more first pass hydrocyclones lacking a grit pot under conditions sufficient to produce a first protein enriched overflow stream and a first protein depleted underflow stream;
wherein the separating step using one or more first pass hydrocyclones is followed by:
conveying the first protein enriched overflow stream from the one or more first pass hydrocyclones to one or more second pass hydrocyclones of equal or smaller diameter to produce a second protein enriched overflow stream comprising concentrated protein particles that are smaller on average relative to particles of the first protein enriched overflow stream; optionally,
conveying the first protein depleted underflow stream from the one or more first pass hydrocyclones to one or more subsequent hydrocyclones of equal or smaller diameter to produce a second protein depleted underflow stream comprising concentrated fiber particles that are larger on average relative to fiber particles of the first protein depleted underflow stream;
filtering the second protein enriched overflow stream; and
dewatering the filtered, second protein enriched overflow stream using a centrifuge equipped with three or more discs to recover a first protein enriched fraction comprising 40% to 60% protein on a dry weight basis.

22. A stillage fractionation and/or clarification system, comprising:
a grain ethanol plant operative for producing whole stillage from producing of ethanol and dried grains;
one or more first pass hydrocyclones each lacking a grit pot;
one or more second pass hydrocyclones of equal or smaller diameter than the one or more first pass hydrocyclones;
optionally one or more subsequent hydrocyclones of equal or smaller diameter than the one or more first pass hydrocyclones; and comprising
one or more centrifuges;
wherein the system is configured to fractionate the whole stillage from the grain ethanol plant into fractions by:
separating the whole stillage using the one or more first pass hydrocyclones under conditions sufficient to produce a first protein enriched overflow stream and a first protein depleted underflow stream, wherein the separating step using one or more first pass hydrocyclones further comprises:
conveying the first protein enriched overflow stream from the one or more first pass hydrocyclones to the one or more second pass hydrocyclones of equal or smaller diameter to produce a second protein enriched overflow stream comprising concentrated protein particles that are smaller on average relative to fiber particles of the first protein enriched overflow stream; optionally
conveying the first protein depleted underflow stream from a first pass hydrocyclone to one or more subsequent hydrocyclones of equal or smaller diameter to produce a second protein depleted underflow stream comprising concentrated fiber particles that are larger on average relative to particles of the first protein depleted underflow stream; and comprises,
dewatering the second protein enriched overflow stream using a centrifuge to recover a first protein enriched fraction comprising 40% to 60% protein on a dry weight basis.

23. The system of claim 22, further comprising a washing filtration system configured to filter at least one of the first or second protein enriched overflow streams to produce a clarified protein enriched overflow stream.

24. The system of claim 22, further comprising a rotary dryer capable of drying the first protein enriched fraction to less than 15% moisture content.

* * * * *